United States Patent
Cummings et al.

(10) Patent No.: US 7,551,610 B2
(45) Date of Patent: Jun. 23, 2009

(54) MINIMAC IMPLEMENTATION OF A DISTRIBUTED CABLE MODEM TERMINATION SYSTEM (CMTS) ARCHITECTURE

(75) Inventors: Scott A Cummings, Suwanee, GA (US); Joel I Danzig, Alpharetta, GA (US); Paul E Burrell, Duluth, GA (US)

(73) Assignee: Broadcom Corporation, Irvine, CA (US)

( * ) Notice: Subject to any disclaimer, the term of this patent is extended or adjusted under 35 U.S.C. 154(b) by 1518 days.

(21) Appl. No.: 10/228,194

(22) Filed: Aug. 27, 2002

(65) Prior Publication Data

US 2004/0045032 A1 Mar. 4, 2004

(51) Int. Cl.
*H04L 12/66* (2006.01)
(52) U.S. Cl. .................. 370/354; 370/352; 370/400; 370/469
(58) Field of Classification Search .................. 370/389, 370/390, 392, 400, 432, 465–468, 352–356; 375/138, 144, 147–149; 709/220, 223, 226
See application file for complete search history.

(56) References Cited

U.S. PATENT DOCUMENTS 5,953,844 A 9/1999 Harling et al.
6,137,793 A 10/2000 Gorman et al.

(Continued)

FOREIGN PATENT DOCUMENTS

EP 1187361 A1 * 3/2002

(Continued)

OTHER PUBLICATIONS

Droubi, M et al., "Dynamic Bandwidth Allocation for the HFC DOCSIS MAC Protocol," Ninth International Conference on Computer Communications and Networks, 2000. Oct. 2000, pp. 54-60.*

(Continued)

*Primary Examiner*—Donald L Mills
(74) *Attorney, Agent, or Firm*—Sterne, Kessler, Goldstein & Fox P.L.L.C.

(57) ABSTRACT

A miniMAC implementation of a distributed CMTS in a hybrid fiber/coaxial (HFC) plant. The distributed CMTS comprises at least one network layer, at least one media access layer, and one or more physical layers. The at least one media access layer includes one or more miniMAC layers. The one or more miniMAC layers are remotely located from a remaining part of the at least one media access layer. The at least one network layer, the remaining part of the at least one media access layer, the one or more miniMAC layers, and the one or more physical layers each function as separate modules, enabling each layer to be in separate component locations of the HFC plant, yet having the at least one network layer connected to the remaining part of the at least one media access layer, the at least one media access layer connected to each of the one or more miniMAC layers, and each of the one or more physical layers connected to each of the one or more miniMAC layers. The one or more miniMAC layers are located in close proximity to the one or more physical layers in the HFC plant. The one or more miniMAC layers convert digital bit streams into packets and maintain timing constraints between the one or more miniMAC layers and the one or more physical layers.

21 Claims, 64 Drawing Sheets

U.S. PATENT DOCUMENTS

| | | | |
|---|---|---|---|
| 6,490,727 | B1 | 12/2002 | Nazarathy et al. |
| 6,614,781 | B1 | 9/2003 | Elliott et al. |
| 6,650,624 | B1 | 11/2003 | Quigley et al. |
| 6,898,755 | B1 | 5/2005 | Hou |
| 7,085,287 | B1 * | 8/2006 | Chapman .................... 370/468 |
| 7,099,340 | B2 * | 8/2006 | Liva et al. .................... 370/401 |
| 7,149,223 | B2 * | 12/2006 | Liva et al. .................... 370/401 |
| 2001/0038690 | A1 | 11/2001 | Palmer et al. |
| 2002/0023160 | A1 * | 2/2002 | Garrett et al. ............... 709/229 |
| 2002/0038419 | A1 * | 3/2002 | Garrett et al. ............... 713/154 |
| 2002/0075865 | A1 | 6/2002 | Lazarus |
| 2002/0093970 | A1 | 7/2002 | Amit |
| 2002/0100056 | A1 | 7/2002 | Bortolini et al. |
| 2002/0136203 | A1 | 9/2002 | Liva et al. |
| 2003/0058837 | A1 * | 3/2003 | Denney et al. .............. 370/352 |
| 2003/0126614 | A1 | 7/2003 | Staiger |
| 2004/0045033 | A1 | 3/2004 | Cummings et al. |
| 2004/0045035 | A1 | 3/2004 | Cummings et al. |
| 2004/0045037 | A1 | 3/2004 | Cummings et al. |
| 2007/0050835 | A1 * | 3/2007 | Liva et al. ................... 725/129 |

FOREIGN PATENT DOCUMENTS

| | | |
|---|---|---|
| EP | 1 225 749 | 7/2002 |
| WO | 02/23853 | 3/2002 |
| WO | 02/41558 | 5/2002 |
| WO | WO 03030548 * | 4/2003 |
| WO | WO 03/091854 A2 | 11/2003 |

OTHER PUBLICATIONS

Cummings, Scott A. et al., U.S. Appl. No. 10/228,288, entitled "A Distributed Cable Modem Termination System (CMTS) Architecture," 80 pages, filed Aug. 27, 2002.

Cummings, Scott A. et al., U.S. Appl. No. 10/228,196, entitled "A Distributed Cable Modem Termination System (CMTS) Architecture Implementing a Media Access Control Chip," 83 pages, filed Aug. 27, 2002.

Cummings, Scott A. et al., U.S. Appl. No. 10/228,192, entitled "A Distributed Cable Modem Termination System (CMTS) Architecture Implementing a Media Access Control Chip," 83 pages, filed Aug. 27, 2002.

European Search Report dated Jan. 7, 2004, issued in Appl. No. 03019261.1, (3 pages).

European Search Report dated Jan. 7, 2004, issued in Appl. No. 03019264.5, (3 pages).

European Search Report dated Jan. 7, 2004, issued in Appl. No. 03019262.9, (3 pages).

European Search Report dated Jan. 7, 2004, issued in Appl. No. 03019263.7, (3 pages).

Song, Jun et al. "Improving the Performance of Asymmetric Data Application over the HFC Network," International Conference on Communication Technology Proceedings, ICCT 2003. Apr. 2003, vol. 2, pp. 1706-1710.

* cited by examiner

MINIMAC IMPLEMENTATION OF A DISTRIBUTED CABLE MODEM TERMINATION SYSTEM (CMTS) ARCHITECTURE

CROSS-REFERENCE TO RELATED APPLICATIONS

This application is related to the following non-provisional applications:

"Distributed Cable Modem Termination System (CMTS) Architecture," U.S. patent application Ser. No. 10/228,288, by Scott Cummings et al., filed Aug. 27, 2002 and incorporated by reference herein in its entirety.

"Distributed Cable Modem Termination System (CMTS) Architecture Implementing a Media Access Control Chip," U.S. patent application Ser. No. 10/228,196, by Scott Cummings et al., filed Aug. 27, 2002 and incorporated by reference herein in its entirety.

"Distributed Cable Modem Termination System (CMTS) Architecture Implementing a Media Access Control Chip," U.S. patent application Ser. No. 10/228,192, by Scott Cummings et al., filed Aug. 27, 2002 and incorporated by reference herein in its entirety.

BACKGROUND OF THE INVENTION

1. Field of the Invention

The present invention is generally related to broadband communications systems. More particularly, the present invention is related to a cable modem termination system (CMTS) in a broadband communications system.

2. Background Art

In broadband communications architectures, data is transferred between a central location and many remote subscribers. For broadband cable modem systems, the central location may be referred to as a headend and the remote subscriber equipment is referred to as a cable modem (CM). In cable modem systems, the communication path from the headend to the cable modem is called the downstream and the communication path from the cable modem to the headend is called the upstream.

As cable modem systems introduce new services, new ways to increase network capacity at a reasonable cost to the subscriber must be implemented. Thus, cable modem systems are constantly being reconfigured to provide adequate bandwidth to remote subscribers.

A cable modem system is typically housed in a hybrid fiber/coaxial (HFC) plant (also referred to as a HFC system). The hybrid fiber/coaxial plant consists of a fiber portion and a coaxial portion. The headend is housed in the fiber portion of the hybrid fiber/coaxial plant. A Cable Modem Termination System (CMTS), located within the headend, services a plurality of cable modems, located in the coaxial portion of the HFC plant via a plurality of fiber nodes in a point-to-multipoint topology. The network over which the CMTS and the cable modems communicate is referred to as a hybrid fiber/coaxial cable network.

Typically, bandwidth is available to transmit signals downstream from the headend to the cable modems. However, in the upstream, bandwidth is limited and must be arbitrated among the competing cable modems in the system. Cable modems request bandwidth from the CMTS prior to transmitting data to the headend. The CMTS allocates bandwidth to the cable modems based on availability and the competing demands from other cable modems in the system.

In the coaxial portion of the hybrid fiber/coaxial plant, problems may arise with the coaxial cable. Such problems may include loose connectors, poor shielding, and similar points of high impedance. These problems cause noise signals to develop from interference sources such as radio transmissions, electric motors, and other sources of electrical impulses. The point-to-multipoint topology of the cable modem system complicates upstream transmissions by exacerbating the noise. With the multipoint structure of the HFC system, noise is additive in the upstream. Thus, the noise problem is more intense in the upstream as signals approach the headend.

One method of providing additional bandwidth to any one cable modem in the hybrid fiber/coaxial plant requires the fiber node servicing that cable modem to be split. Depending on the frequency stacking in the HFC plant, more upconverters may be required to service the new fiber node resulting from the split. Since all of the signals are combined at the headend, there is a limit to the number of times fiber nodes can be split without causing additional noise sources to enter the system. This makes the CMTS in the headend architecture difficult to expand into available fiber bandwidths.

What is therefore needed is a system and method for maximizing bandwidth allocations to cable modems while minimizing system noise in a HFC plant.

BRIEF SUMMARY OF THE INVENTION

The present invention solves the above-mentioned problem by enabling additional bandwidth to be administered to any one cable modem in a cable modem system. The present invention accomplishes this by providing a miniMAC implementation of a distributed Cable Modem Termination System (CMTS) architecture in a hybrid fiber/coaxial plant. The miniMAC implementation of the distributed CMTS architecture enables a MAC layer to include a miniMAC layer. A miniMAC layer is separate from, yet attached to the MAC layer. MiniMAC layers contain the minimum amount of circuitry required to convert digital bit streams into packets and vice versa. MiniMAC layers also provide the circuitry required to maintain timing constraints for communications between the media access layer (MAC) layer and a physical (PHY) layer in a CMTS. MiniMAC layers enable physical layers of the CMTS to be distributed closer to the cable modems in the hybrid fiber/coaxial (HFC) plant. Distributing PHY layers throughout the HFC plant lessens the distance in which RF waves must travel through the system and increases the distance for digital transmissions. This minimizes system noise and maximizes HFC bandwidth.

Briefly stated, the present invention is directed to a miniMAC implementation of a distributed CMTS in a hybrid fiber/coaxial (HFC) plant. The distributed CMTS comprises at least one network layer, at least one media access layer, and one or more physical layers. The at least one media access layer includes one or more miniMAC layers. The one or more miniMAC layers are remotely located from a remaining part of the at least one media access layer. The at least one network layer, the remaining part of the at least one media access layer, the one or more miniMAC layers, and the one or more physical layers each function as separate modules, enabling each layer to be in separate component locations of the HFC plant, yet having the at least one network layer connected to the remaining part of the at least one media access layer, the at least one media access layer connected to each of the one or more miniMAC layers, and each of the one or more physical layers connected to each of the one or more miniMAC layers.

The one or more miniMAC layers are located in close proximity to the one or more physical layers in the HFC plant. The one or more miniMAC layers convert digital bit streams into packets and maintain timing constraints between the one or more miniMAC layers and the one or more physical layers.

Further embodiments, features, and advantages of the present invention, as well as the structure and operation of the various embodiments of the present invention, are described in detail below with reference to the accompanying drawings.

BRIEF DESCRIPTION OF THE DRAWINGS/FIGURES

The accompanying drawings, which are incorporated herein and form part of the specification, illustrate the present invention and, together with the description, further serve to explain the principles of the invention and to enable a person skilled in the pertinent art(s) to make and use the invention.

Figure 1:
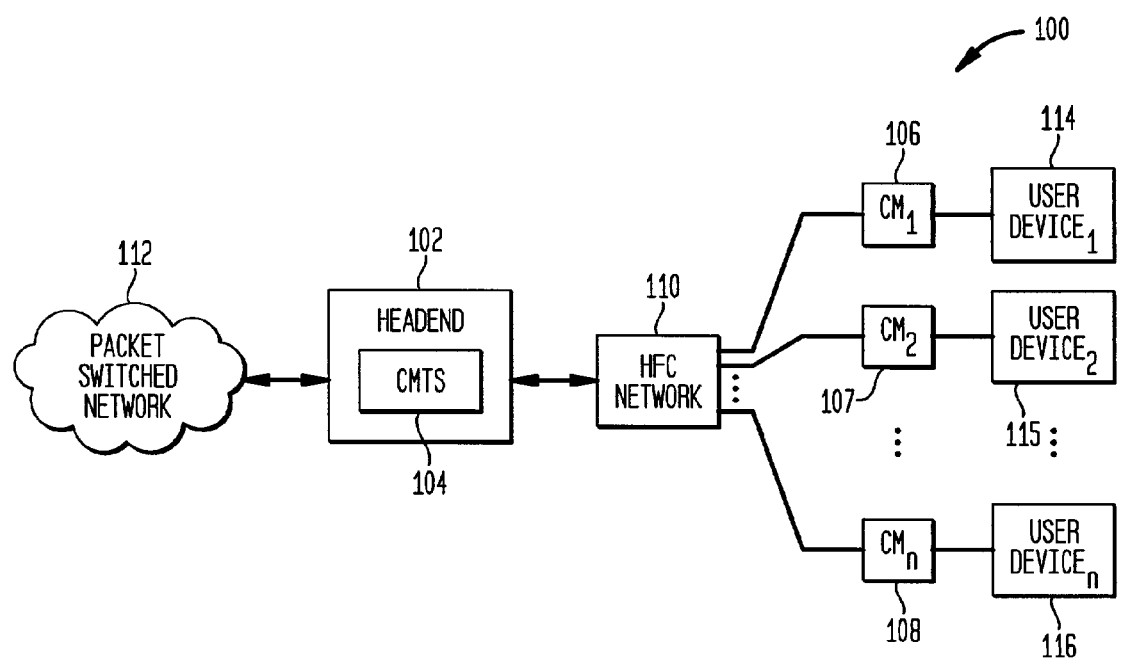
FIG. 1 is a high level block diagram of an exemplary cable modem system in accordance with embodiments of the present invention

The features and advantages of the present invention will become more apparent from the detailed description set forth below when taken in conjunction with the drawings in which like reference characters identify corresponding elements throughout. In the drawings, like reference numbers generally indicate identical, functionally similar, and/or structurally similar elements. The drawings in which an element first appears is indicated by the leftmost digit(s) in the corresponding reference number.

DETAILED DESCRIPTION OF THE INVENTION

While the present invention is described herein with reference to illustrative embodiments for particular applications, it should be understood that the invention is not limited thereto. Those skilled in the art(s) with access to the teachings provided herein will recognize additional modifications, applications, and embodiments within the scope thereof and additional fields in which the present invention would be of significant utility.

Overview of a Cable Modem System

FIG. 1 is a high level block diagram of an example cable modem system 100 in accordance with embodiments of the present invention. The cable modem system 100 enables voice communications, video and data services based on a bi-directional transfer of packet-based traffic, such as Internet protocol (IP) traffic, between a cable system headend 102 and a plurality of cable modems 106-108 over a hybrid fiber-coaxial (HFC) cable network 110. In general, any number of cable modems may be included in the cable modem system of the present invention.

Cable headend 102 is comprised of at least one cable modem termination system (CMTS) 104. CMTS 104 manages the upstream and downstream transfer of data between cable headend 102 and cable modems 106-108, which are located at the customer premises. CMTS 104 broadcasts information downstream to cable modems 106-108 as a continuous transmitted signal in accordance with a time division multiplexing (TDM) technique. Additionally, CMTS 104 controls the upstream transmission of data from cable modems 106-108 to CMTS 104 by assigning to each cable modem 106-108 short grants of time within which to transfer data. In accordance with this time domain multiple access (TDMA) technique, each cable modem 106-108 may only send information upstream as short burst signals during a transmission opportunity allocated to it by CMTS 104.

As shown in FIG. 1, CMTS 104 further serves as an interface between HFC network 110 and a packet-switched network 112, transferring IP packets received from cable modems 106-108 to packet-switched network 112 and transferring IP packets received from packet-switched network 112 to cable modems 106-108 when appropriate. In embodiments, packet-switched network 112 may comprise the Internet, the Intranet, a public switched telephone network, etc.

In addition to CMTS 104, cable headend 102 may also include one or more Internet routers (not shown) to facilitate the connection between CMTS 104 and packet-switched network 112, as well as one or more servers (not shown) for performing necessary network management tasks.

HFC network 110 provides a point-to-multipoint topology for the high-speed, reliable, and secure transport of data between cable headend 102 and cable modems 106-108 at the customer premises. As will be appreciated by persons skilled in the relevant art(s), HFC network 110 may comprise coaxial cable, fiberoptic cable, or a combination of coaxial cable and fiberoptic cable linked via one or more fiber nodes.

Each of cable modems 106-108 operates as an interface between HFC network 110 and at least one attached user device. In particular, cable modems 106-108 perform the functions necessary to convert downstream signals received over HFC network 110 into IP data packets for receipt by an attached user device. Additionally, cable modems 106-108 perform the functions necessary to convert IP data packets received from the attached user device into upstream burst signals suitable for transfer over HFC network 110. In example cable modem system 100, each cable modem 106-108 is shown supporting only a single user device 114-116, respectively, for clarity. In general, each cable modem 106-108 is capable of supporting a plurality of user devices for communication over cable modem system 100. User devices may include personal computers, data terminal equipment, telephony devices, broadband media players, network-controlled appliances, or any other device capable of transmitting or receiving data over a packet-switched network.

In example cable modem system 100, any one or more of cable modems 106-108 may represent a conventional DOCSIS-compliant cable modem. In other words, any one or more of cable modems 106-108 may transmit data packets to CMTS 104 in formats that adhere to the protocols set forth in the DOCSIS specification. Also, any one or more of cable modems 106-108 may be likewise capable of transmitting data packets to CMTS 104 in standard DOCSIS formats. However, in accordance with embodiments of the present invention, any one or more of cable modems 106-108 may also be configured to transmit data packets to CMTS 104 using proprietary protocols that extend beyond the DOCSIS specification. Nevertheless, such cable modems are fully interoperable with the DOCSIS-compliant cable modems and with DOCSIS-compliant CMTS equipment.

Furthermore, in example cable modem system 100, CMTS 104 operates to receive and process data packets transmitted to it in accordance with the protocols set forth in the DOCSIS specification. However, in accordance with embodiments of the present invention, CMTS 104 can also operate to receive and process data packets that are formatted using proprietary protocols that extend beyond those provided by the DOCSIS specification. The manner in which CMTS 104 operates to receive and process data will be described in further detail herein.

Hybrid Fiber/Coaxial Architecture

A hybrid fiber/coaxial (HFC) system (also referred to as a HFC plant) is a bi-directional shared-media transmission system having a configuration that combines both fiber-optic and coaxial cables for handling broadband services. HFC systems use fiber-optic cables between a headend and a plurality of fiber nodes and coaxial cables from the plurality of fiber nodes to a plurality of cable modems or other types of remote subscriber equipment. Such systems are far less expensive than full fiber-to-the-curb (FTTC) or switched digital video (SDV) systems. HFC systems offer increased bandwidth capabilities needed for handling broadband interactive services. Such broadband interactive services may include, but are not limited to, interactive multimedia, telephony, wide-area computer networking, video-on-demand (digital), distance learning, etc. HFC systems also support simultaneous analog and digital transmission with minimal impact on existing plants.

An exemplary HFC system has three main components: (1) network elements, (2) a HFC infrastructure or network, such as HFC network 110 and (3) subscriber access. Network elements are service-specific devices that connect a cable operator to both service origination points and other equipment that places services onto the network. Network elements may include, but are not limited to, local and wide area networks, such as the Intranet and Internet, respectively, IP backbone networks (such as packet switched network 112), Public Switched Telephone Networks (PSTN), other remote servers, etc. HFC infrastructure may include, but is not limited to, fiber and coaxial cable, fiber transmitters, fiber nodes, RF amplifiers, taps, and passives. Subscriber access equipment may include, but is not limited to, cable modems, set-top terminals, and units to integrate telephony services.

Figure 2A:
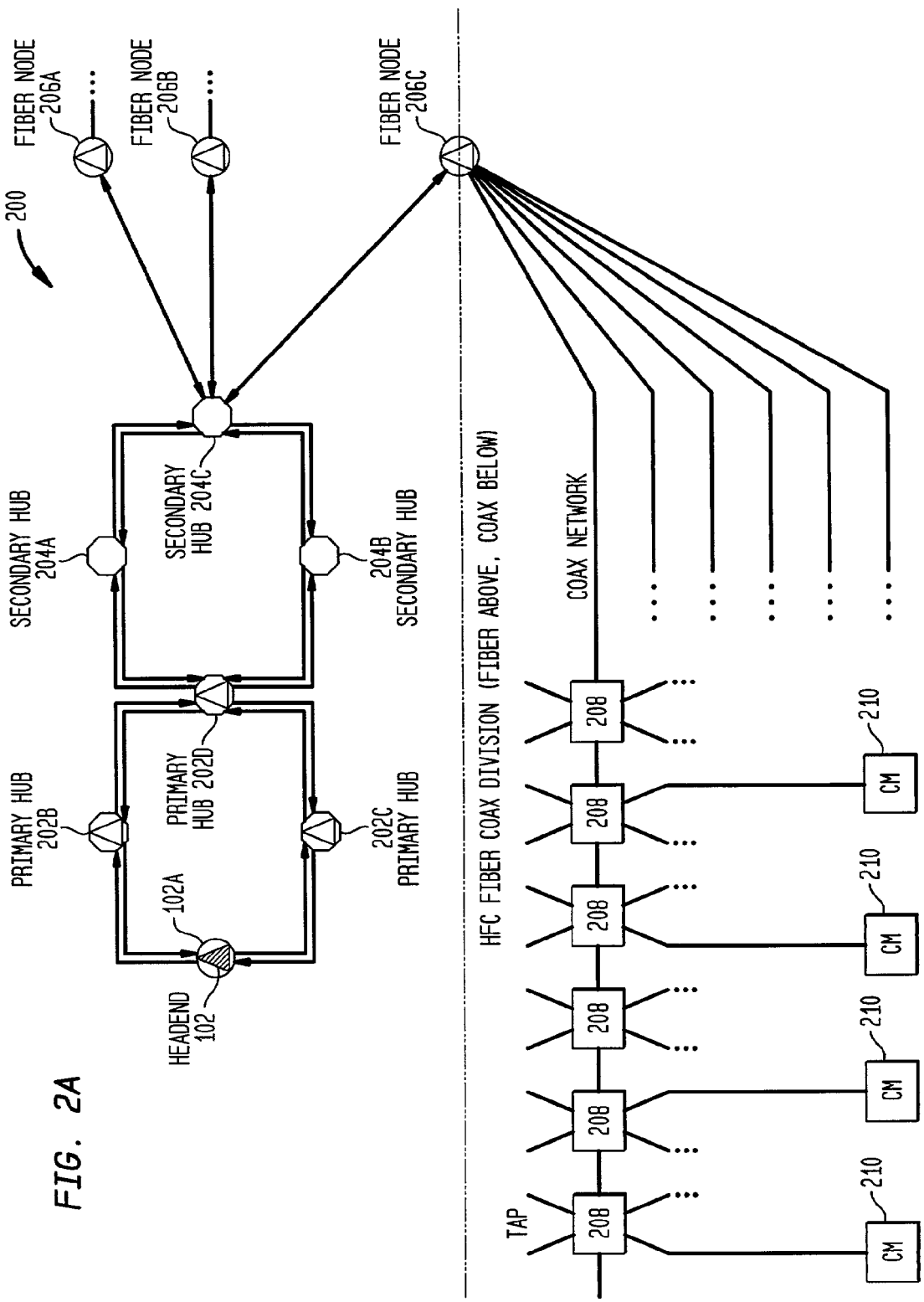
FIG. 2A is a high level block diagram of an exemplary hybrid fiber/coaxial (HFC) plant in accordance with embodiments of the present invention.

FIG. 2A illustrates an exemplary high level block diagram of a hybrid fiber/coaxial (HFC) system 200. HFC system 200 comprises, inter alia, a plurality of primary hubs 202 (A-D), a plurality of secondary hubs 204 (A-C), a plurality of fiber nodes 206 (A-C), a plurality of taps 208 (A-F) and a plurality of cable modems 210 (A-D). Primary hubs 202 are coupled to each other and to secondary hubs 204. Secondary hubs 204 are coupled to primary hub 202D, other secondary hubs 204, and fiber nodes 206. Fiber node 206C is coupled to taps 208. Taps 208 are coupled to cable modems 210. Although FIG. 2A only illustrates a single branching structure from fiber node 206C, similar branching structures exist for fiber nodes 206A and 206B that service other cable modems in other areas of system 200. Although not shown, similar coax network branching structures also exist for each connection from fiber node 206C.

Headend 102 is shown located in one of primary hubs 202. Headend 102, primary hubs 202, secondary hubs 204, and fiber nodes 206 are interconnected via fiber-optic cables, and therefore represent the fiber portion of HFC system 200. Everything below fiber nodes 206, such as taps 208 and modems 210, are interconnected via coaxial cables, and therefore represent the coaxial portion of HFC system 200.

Although not shown in FIG. 2A, RF amplifiers may be located between taps 208 and cable modems 210. In one embodiment, RF amplifiers are bidirectional, requiring only one path between taps 208 and any one cable modem 210 for downstream and upstream transmissions. In an alternative embodiment, RF amplifiers are unidirectional, thereby requiring two paths between taps 208 and any one cable modem 210 to allow for downstream and upstream transmissions, respectively.

Hubs 202 and 204 are communications infrastructure devices to which nodes on a loop are physically connected to improve the manageability of physical cables. Hubs 202 and 204 maintain the logical loop topology of HFC system 200. In the downstream, hubs 202 and 204 are used to manage the distribution of signals into the plant for delivery to customers at the customer premises. In the upstream, hubs 202 and 204 are used to aggregate signals from the various cable modems 210 for delivery to headend 102. Hubs 202 and 204 also support the addition or removal of nodes from the loop while in operation. Primary hubs 202 are differentiated from secondary hubs 204 in that all primary hubs 202 are connected together to form a circle. A link from that circle connects primary hubs 202 to a secondary hub 204. Secondary hubs 204 may be connected to each other, but not all of secondary hubs 204 need be connected together.

In the topology shown in FIG. 2A, fiber nodes 206 are used to convert optical transmissions into electrical signals for distribution over the coaxial portion of HFC system 200 for downstream transmissions. For upstream transmissions, fiber nodes 206 are used to convert electrical signals into optical signals for transmission over the fiber portion of HFC system 200.

HFC system 200 originates in headend 102. Headend 102 obtains information from network sources, such as, for example, packet switched network 112. Headend 102 distributes the information to hubs 202, 204, and nodes 206 for further distribution to customers that subscribe to such services as CATV, cable phones, Internet via cable, ATM, set top applications, etc. The HFC architecture of system 200 uses fiber to carry voice communications, video and data from headend 102 to fiber nodes 206 for servicing a particular area. At fiber nodes 206, downstream optical signals are converted to electrical signals and carried via coax to individual subscribers via taps 208. The carrying capacity of fiber is much higher than that of coax, therefore, a single fiber node 206 may typically support a number of coaxial distribution feeds via taps 208. Taps 208 allow multiple modems 210 to connect to a single trunk of coax.

Figure 2B:
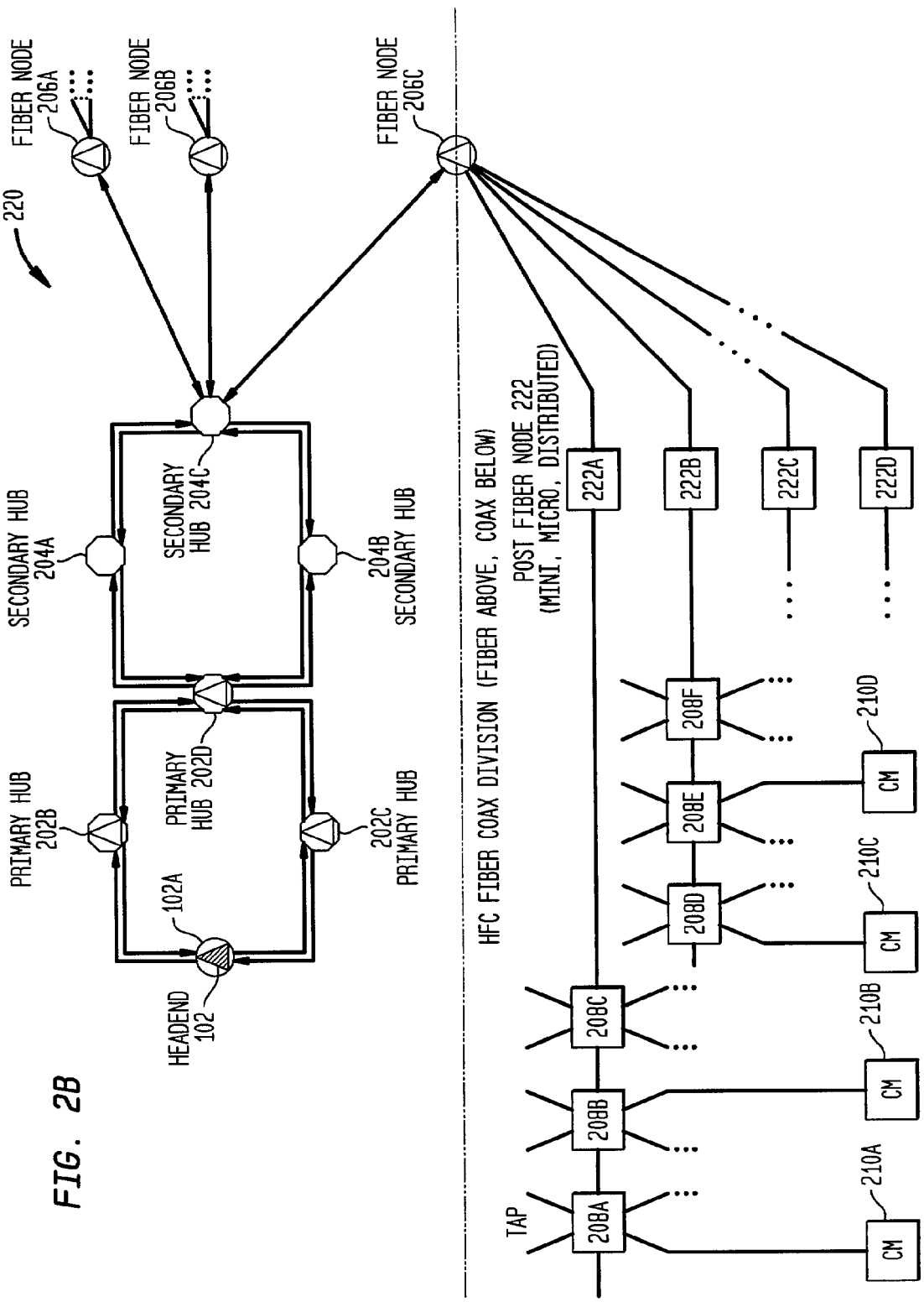
FIG. 2B is another high level block diagram of an exemplary hybrid fiber/coaxial (HFC) plant in accordance with embodiments of the present invention.

When cable operators need additional bandwidth to service cable modems 210 for upstream transmissions, often times they may split fiber nodes 206 to provide increased bandwidth. In other instances they may replicate fiber nodes 206. The splitting of a fiber node or the replication of a fiber node results in what is termed a post-fiber node. Other terms for post-fiber nodes include, but are not limited to, mini-fiber nodes, micro-fiber nodes, and distributed fiber nodes. FIG. 2B illustrates another exemplary high level block diagram of a HFC system 220. HFC system 220 in FIG. 2B is similar to HFC system 200 in FIG. 2A, except for the addition of post-fiber nodes 222. In FIG. 2B, post-fiber nodes 222 are shown coupled to one of fiber nodes 206 and one of taps 208. As illustrated, the addition of post fiber nodes 222 provides additional bandwidth by lessening the number of cable modems 210 serviced by any one post fiber node 222. Post fiber node 222A and 222B now services the half of cable modems 210 previously serviced by fiber node 206C.

CMTS

Figure 3:
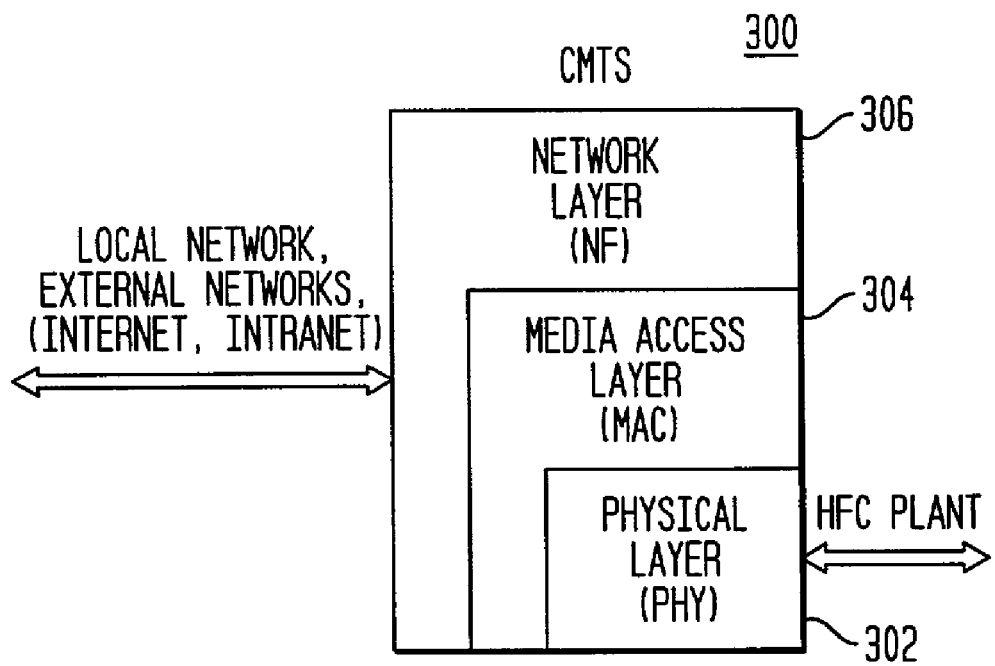
FIG. 3 is a high level block diagram of a traditional CMTS.

Currently, CMTS units are single units that perform three layers of functions that often overlap. FIG. 3 is a high level block diagram illustrating the three layers of functions in a single CMTS unit 300. The three layers of functions in CMTS unit 300 include a physical (PHY) layer 302, a media access control (MAC) layer 304, and a network layer 306.

PHY layer 302 enables CMTS unit 300 to physically communicate with subscriber access equipment, such as cable modems 210. PHY layer 302 transmits and receives signals to and from cable modems 210, respectively. PHY layer 302 converts electronic signals into digital bits for upstream transmissions to MAC layer 304 and converts digital bits from MAC layer 304 into electronic signals for downstream transmissions.

Media access control layer (MAC layer) 304 is the messaging layer of CMTS 300. MAC layer 304 decodes the bits from physical layer 302 into packets. If the packets are to be communicated to networks outside HFC system 200 or 220 or are for use in aiding network layer 306 in the performance of its functions, MAC layer 304 will send the packets to network layer 306. MAC layer 304 also acts as a control mechanism for cable modems 210 communicating with CMTS 300. Packets that are not communicated to network layer 306 are control packets. Control packets are used to: (1) perform ranging to compensate for different cable losses and cable delays to make sure that bursts coming from different cable modems 210 line up in the right time-slots and are received at the same power level at the CMTS; (2) assign frequencies to cable modems 210; and (3) allocate time-slots for upstream transmission.

Network layer 306 interfaces external network devices and internal packet sources. Network layer 306 establishes, maintains, and terminates logical and physical connections between interconnected networks, such as packet switched network 112. Network layer 306 receives packets from MAC layer 304 for transmission to external network devices. Network layer 306 also receives packets from external network devices for transmission to cable modems 210 via MAC and PHY layers 304 and 302, respectively. Network layer 306 prioritizes packets, maintains packet rates and controls packet flow. Network layer 306 also performs network functions, such as, but not limited to, routing, bridging, quality of service (QoS), etc.

Conventional CMTS units, such as CMTS unit 300, may not be split according to functionality. In other words, CMTS units 300 are not modularized according to functionality and, therefore, must contain all three functional layers (i.e., physical, MAC, and network layers) in a single unit. There is some modularity in current CMTS units 300, but this modularity allows features to be added to CMTS 300.

Current HFC plants provide a centralized location for conventional CMTS units 300. This centralized location is typically in headend 102, as shown in FIGS. 2A and 2B. With the location of CMTS 300 in headend 102, upstream signals are not converted into digital bits until they reach headend 102. Thus, RF signals are transmitted from cable modems 210 to fiber nodes 206 and optical signals are transmitted from fiber nodes 206 to headend 102.

Other centralized locations for CMTS units may include primary hub 202 or secondary hub 204. If CMTS 300 is located in a primary hub 202, upstream signals are converted into digital bits in primary hub 202. Thus, RF signals are transmitted from cable modems 210 to fiber nodes 206, optical signals are transmitted from fiber nodes 206 to primary hub 202, and digital signals are transmitted thereafter. If CMTS 300 is located in a secondary hub 204, upstream signals are converted into digital bits in secondary hub 204. Thus, RF signals are transmitted from cable modems 210 to fiber nodes 206, optical signals are transmitted from fiber nodes 206 to secondary hub 204, and digital signals are transmitted thereafter.

Distributed CMTS

The present invention provides functional modularity to CMTS units, and enables the functional units of the CMTS to be dispersed throughout an HFC plant in a modular fashion to provide additional bandwidth to subscriber access equipment, such as cable modems 210. Distributing the CMTS away from the headend and further into the HFC network provides improved data throughput. For example, a PHY layer converts electronic signals into digital bits during upstream transmissions. Moving the PHY layer away from the headend, deeper into the HFC plant enables more traffic to be sent in digital streams over the fiber portion of the plant. After the PHY layer converts the signals into digital bits, the bits can be sent in a digital format that is far more tolerant to noise. These digital streams may be aggregated to maximize the throughput of any given link in the HFC plant. Having digital traffic on the fiber links provides improved fiber efficiency by enabling more of the fiber to be used to carry traffic. It also allows many different digital transmission techniques to be used. Digital transmission techniques can be used to optimize the cost of the network and therefore make the fiber more cost efficient. Also, moving the PHY layer closer to the subscriber equipment (e.g., modems) reduces analog noise between the CMTS and the subscriber equipment (e.g., cable modems).

Figure 4:
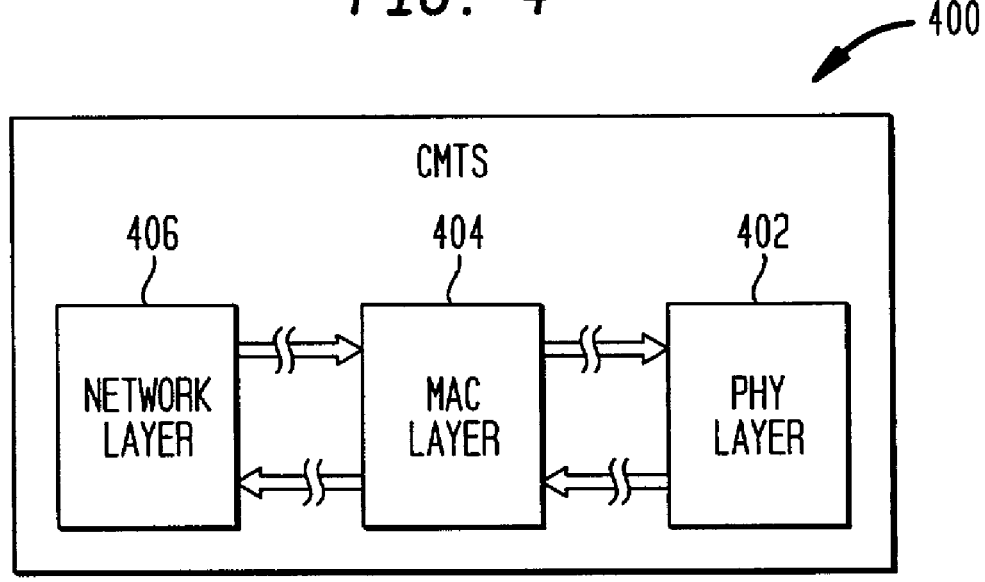
FIG. 4 is a high level block diagram of a distributed CMTS in accordance with embodiments of the present invention.

FIG. 4 is a block diagram illustrating a distributed CMTS according to an embodiment of the present invention. Distributed CMTS 400 comprises a physical (PHY) layer 402, a media access control (MAC) layer 404, and a network layer (NF) 406. PHY layer 402, MAC layer 404, and network layer 406 are each separate modules, capable of performing their respective functions (as described above with reference to FIG. 3). PHY layer 402 is coupled to MAC layer 404, and MAC layer 404 is coupled to NF layer 406. The individual functionality of each of layers 402, 404, and 406 combine to perform the total functionality of a traditional CMTS unit, such as CMTS unit 300. The difference being that each of layers 402, 404, and 406 are not restricted to one location, but may be distributed throughout HFC plants, such as exemplary HFC plants 200 and 220.

In one embodiment of the present invention, a CMTS MAC chip may be implemented to enable distributed CMTS 400.

The CMTS MAC chip may be a BCM3212 CMTS MAC chip, a BCM3210 CMTS MAC chip, both of which are manufactured by Broadcom Corporation in Irvine, Calif., or any other CMTS MAC chip that includes DOCSIS MAC functionality as well as the capability of operating in a distributed CMTS environment. DOCSIS has the ability to split packets, fragment and concatenate packets, perform header suppression, etc. The CMTS MAC chip performs these DOCSIS functions automatically. For example, if a packet is fragmented, the CMTS MAC chip will wait for all the pieces of the packet to arrive, construct the packet, and send the packet to a control mechanism for further processing. The CMTS MAC chip also has a set of features that enable it to be put in a distributed CMTS. Thus, the CMTS MAC chip eliminates the need for MAC layer 404 to be co-located with PHY layer 402 or network layer 406. In other words, the CMTS MAC chip enables MAC layer 404 to be miles away from either PHY layer 402 and/or network layer 406.

Figure 5:
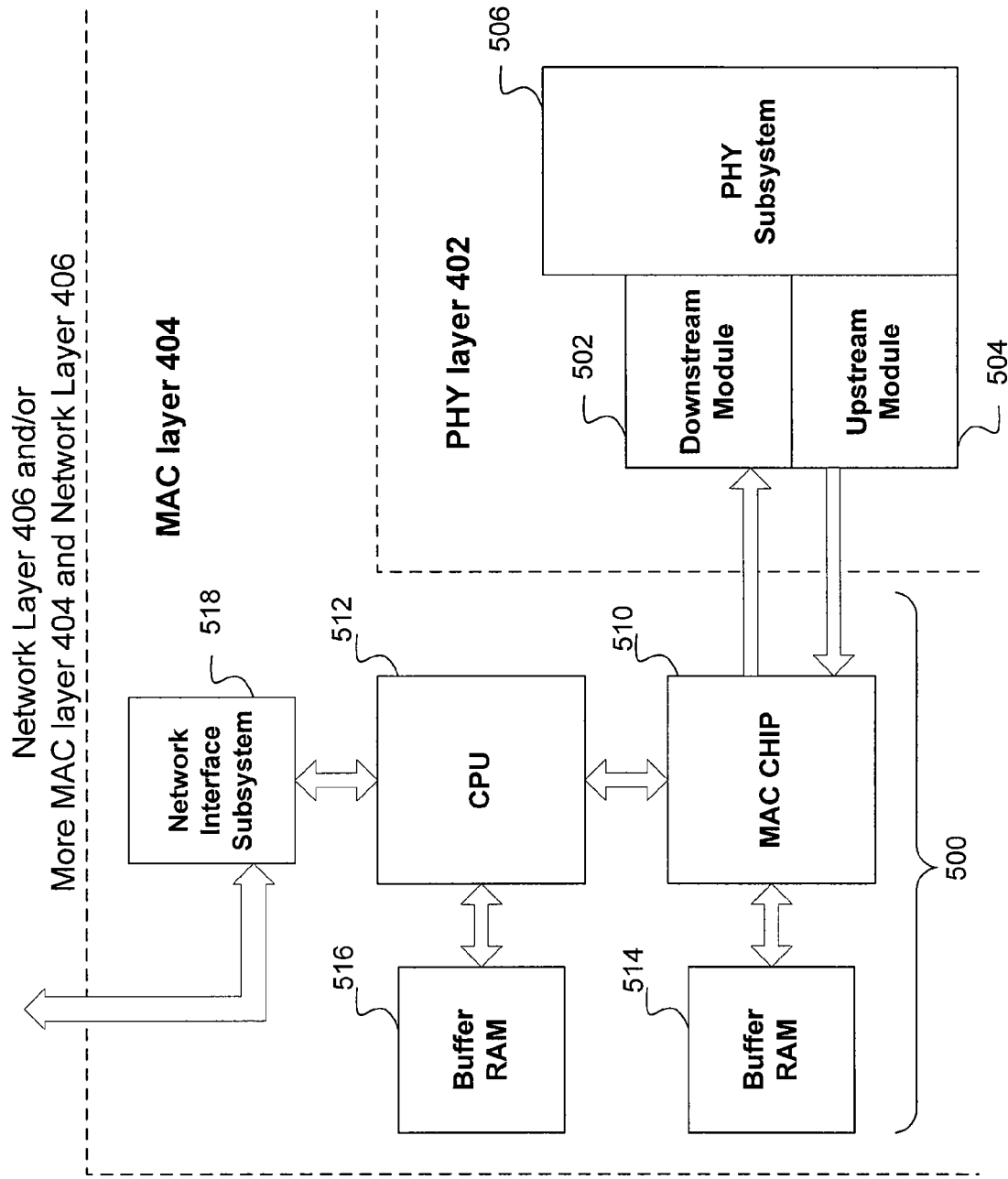
FIG. 5 is a block diagram illustrating a configuration for a MAC layer implementing a CMTS MAC chip according to an embodiment of the present invention.

FIG. 5 is a block diagram illustrating a distributed CMTS 400 implementation using a CMTS MAC chip. FIG. 5 focuses on PHY layer 402 and a configuration 500 of MAC layer 404 in which a CMTS MAC chip 510 is implemented.

PHY layer 402 includes a downstream module 502, an upstream module 504, and a PHY subsystem 506. Downstream module 502 forms the physical interface between CMTS 400 and the downstream channel(s) of HFC system 200 or 220. Hence, voice, data (including television or radio signals) and/or control messages that are destined for one or more cable modems 210 are collected at downstream module 502 and transmitted to the respective cable modem 210. Thus, downstream module 502 compresses and/or formats all information for downstream transmission. Upstream module 504 forms the physical interface between CMTS 400 and the upstream channel(s) of cable modems 210. All bursts from cable modems 210 are received at upstream module 504. Upstream module 504 processes the bursts to decompress and/or extract voice, video, data, and/or the like from cable modems 210. PHY subsystem 506 interacts with both upstream module 504 and downstream module 502 to convert electrical signals into digital bits and vice versa.

MAC layer 404 includes CMTS MAC chip 510, a CPU 512, buffer RAMs 514 and 516, and a network interface subsystem 518. CMTS MAC chip 510 is coupled to CPU 512 and buffer RAM 514. CPU 512 is coupled to buffer RAM 516 and network interface subsystem 518. CMTS MAC chip 510 interfaces with PHY layer 402 and provides the timing to maintain the components of PHY layer 402. All data coming in to CMTS MAC chip 510 from PHY layer 402 goes through CPU 512. CMTS MAC chip 510 processes and buffers upstream packets. CPU 512, in operation with CMTS MAC chip 510, extracts the buffered upstream packets from memory. CPU 512 then transmits the packets to network layer 406 via network interface subsystem 518. In embodiments, a few of the network functions performed by network layer 406 may be performed in CPU 512 to make for easier digital transport. Network interface subsystem 518 interfaces to network layer 406 and/or other portions of MAC layer 404 and network layer 406.

With this implementation of CMTS MAC chip 510 described above, CMTS MAC chip 510 does not require packet level MAC functions to be implemented in the same physical location as CMTS MAC chip 510. CMTS MAC chip 510 is also not required to be local to network layer 406. This enables implementation of MAC chip 510 in a distributed CMTS. Note that timing interface constraints between MAC chip 510 and PHY layer 402 components 502, 504, and 506 require CMTS MAC chip 510 to be implemented in closer proximity to PHY layer 402 when implementing a BCM3210 MAC chip vs. a BCM3212 MAC chip.

Figure 6:
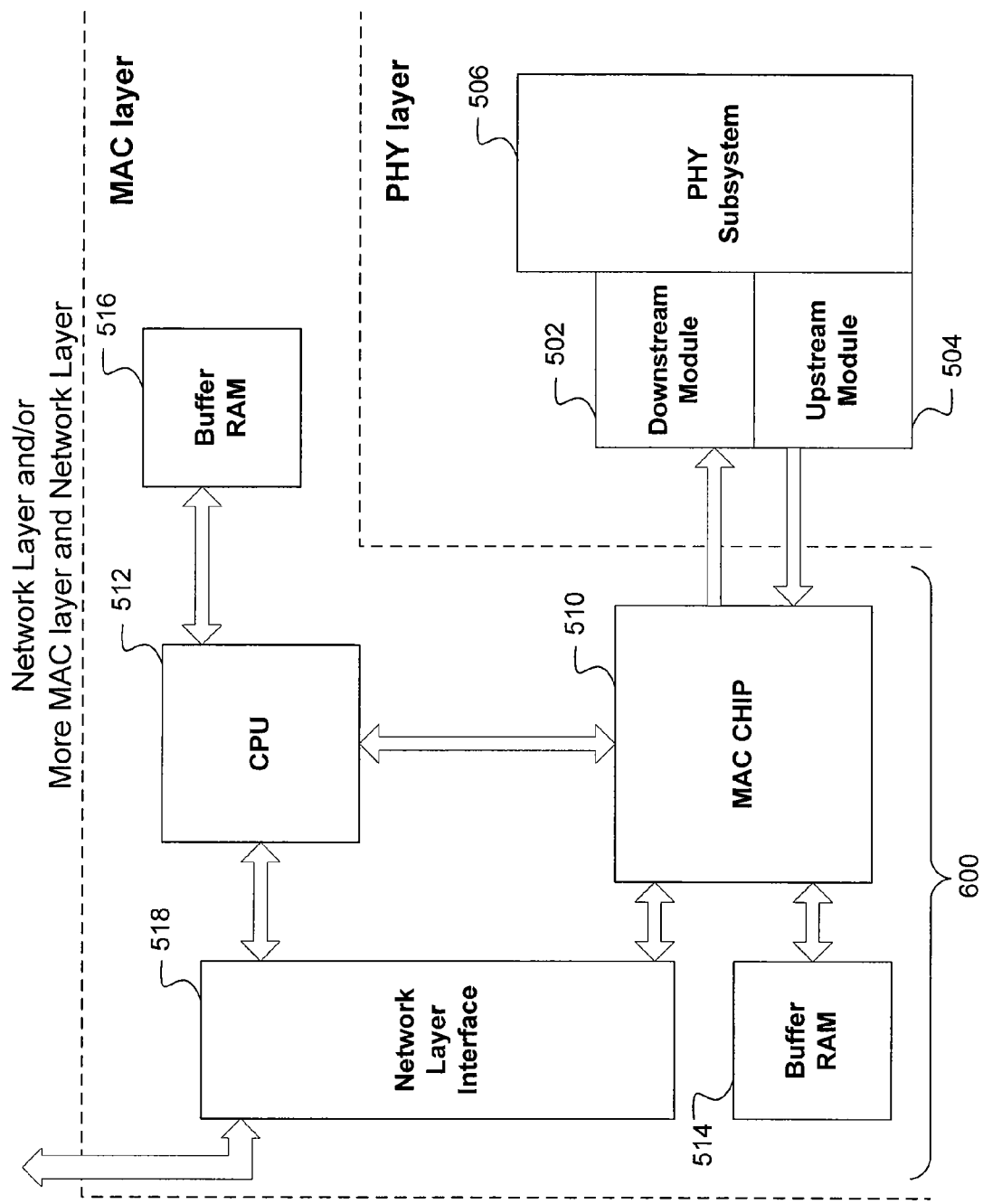
FIG. 6 is a block diagram illustrating an alternative configuration for a MAC layer implementing a CMTS MAC chip according to an embodiment of the present invention.

An alternative configuration 600 for MAC layer 404 is shown in FIG. 6. MAC layer configuration 600 is similar to MAC layer configuration 500 except that CMTS MAC chip 510 is also coupled to network layer interface 518. In this embodiment, CMTS MAC chip 510 includes a packet portal feature that enables CMTS MAC chip 510 to process all packets destined for network layer 406 and send them directly to network layer interface 518 without burdening CPU 512. Bypassing CPU 512 results in a faster throughput, but prevents conditioning of the packets that would ordinarily be performed by CPU 512. This embodiment therefore requires the conditioning normally performed by CPU 512 to be performed by network layer 406. In this embodiment, CMTS MAC chip 510 may be a BCM3212 or any other CMTS MAC chip that provides an extra layer of encapsulation to allow a packet to pass to a traditional packet network.

With the CMTS MAC chip 510 implementation shown in FIG. 6, network functions are not required to be local, thereby allowing CMTS MAC chip 510 to be implemented in distributed CMTS 400. CMTS MAC chip 510 also offers a timing offset feature that enables it to handle timing delays between itself and PHY layer 402. This enables PHY layer 402 to be remotely located from MAC layer 404.

As previously stated, the present invention modularizes functional layers 402, 404, and 406 of CMTS 400 (as described in FIG. 4) and distributes functional layers 402, 404, and 406 of CMTS 400 throughout an HFC system, such as HFC system 200 or 220. Moving distributed CMTS 400 closer to the subscriber access equipment, such as, for example, cable modems 210, reduces analog noise that exists between the CMTS and the subscriber access equipment. Also, more traffic can be sent in digital streams. The digital streams may be aggregated to maximize the throughput of any given link in HFC system 200 or 220. By having digital traffic on the fiber links, more of the fiber can be used to carry traffic. Also, many different digital transmission techniques may be used.

Determining the best distributed CMTS for a given cable plant is a function of the existing equipment and/or new equipment that will be added to the existing plant. The most beneficial layer to move is PHY layer 402. PHY layer 402 is bounded in its throughput by the DOCSIS specification. DOCSIS specifies a given set of bandwidth, modulation techniques, and other physical parameters that limit the amount of bandwidth in an upstream spectrum. For example, the North American version of DOCSIS limits the upstream spectrum to 5-42 MHz. A cable plant operator must divide the 5-42 MHz spectrum into upstream channels. Each upstream channel has a fixed bandwidth. DOCSIS specifies that the symbol rate of an upstream channel may be one of 160K, 320K, 640K, 1280K, 2560K, and 5120K symbols per second. The cable plant operator will assign these symbol rates to the spectrum in an efficient manner. The symbol rate defines the total number of channels in the set of spectrum. The symbol rate does not affect the total throughput. For example, a symbol rate of 160K symbols per second requires 200 KHz. A symbol rate of 320K symbols per second requires 400 KHz. Therefore, in 400 KHz a cable operator could have a single 320K symbol per second channel or two (2) 160K symbols per second channels. The total symbols per second would be 320K in either case.

Throughput is a function of symbols per second as well as bits per symbol. DOCSIS allows for several modulation types: QAM4, QAM8, QAM16, QAM32, QAM64. Each modulation type provides a different number of bits per symbol, as shown below in Table 1.

TABLE 1

| Modulation Type | Bits per Symbol |
|---|---|
| QAM4 | 2 |
| QAM8 | 3 |
| QAM16 | 4 |
| QAM32 | 5 |
| QAM64 | 6 |

Any given set of spectrum may not have enough noise immunity to allow the higher orders of modulation (e.g., QAM32 and QAM64). The cable plant operator will divide the spectrum into upstream channels and try to maximize the modulation type per channel. The cable plant operator will then assign cable modems to upstream channels. Using a traditional CMTS, such as CMTS unit 300, the entire system shown in FIGS. 2A and/or 2B would have to be contained in a 5-42 MHz spectrum. As PHY layer 402 moves closer to modems 210 in HFC network 110, each PHY layer 402 supports fewer modems 210. Once PHY layer 402 is moved from headend 102 out to fiber node 206 and beyond, the number of PHY layers 402 increases, thereby increasing the system bandwidth. If PHY layer capacity exceeds what a single MAC layer 404 can handle, then MAC layer 404 will also be moved to accommodate the additional MAC layers 404 needed to handle the PHY layer capacity.

Figure 7:
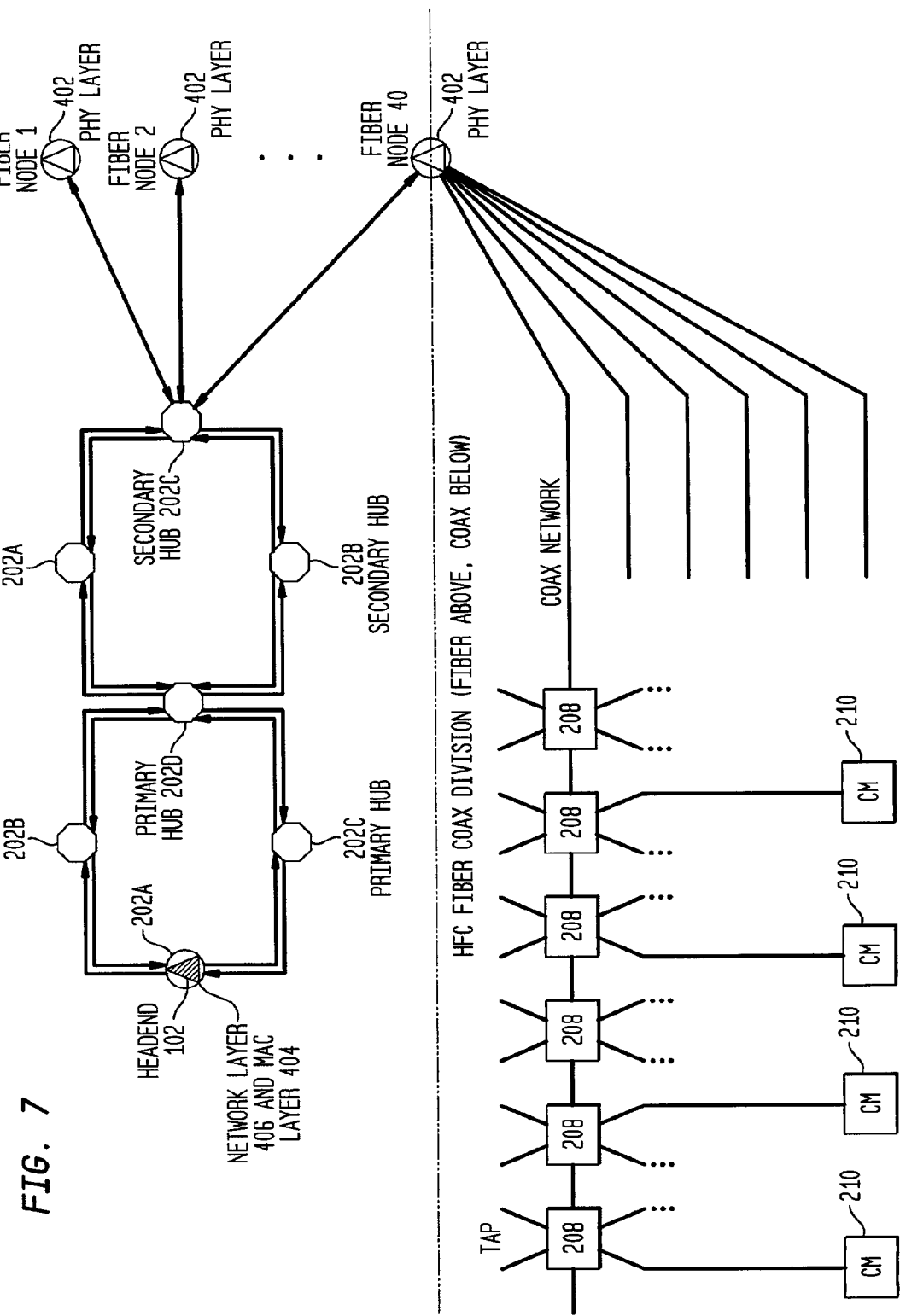
FIG. 7 is a block diagram illustrating an exemplary embodiment of a distributed CMTS in a hybrid fiber/coaxial (HFC) plant according to an embodiment of the present invention.

For example, an embodiment of distributed CMTS 400, shown in FIG. 7, may place network layer 406 and MAC layer 404 in headend 102 and a PHY layer 402 in each of fiber nodes 206. A cable system comprising 40 fiber nodes 206 would require 40 PHY layers 402. Only one network layer 406 and one MAC layer 404 would be required. The total amount of bandwidth on the cable modem side of fiber nodes 206 would be increased by a factor of 40, yet the total cost would not increase by a factor of 40. PHY layer 402 increased by a factor of 40, but MAC layer 404 and network layer 406 did not increase.

As previously stated, PHY layer 402 sends a stream of bits to MAC layer 404. This stream of bits must not be delayed in arriving at MAC layer 404. Any artificial delay between PHY layer 402 and MAC layer 404 may cause the system to be incompatible with DOCSIS. Therefore, MAC layer 404 must be placed in a location that enables signals from PHY layer 402 to be received by MAC layer 404 in a timely fashion. The communication channel between PHY layer 402 and MAC layer 404 needs to be a dedicated worst-case bandwidth channel. This may also be a factor in determining where to place MAC layer(s) 404. Also, the number of PHY layers 402 to be serviced by MAC layer(s) 404 is another factor that may dictate the number of MAC layer(s) 404 needed and where each MAC layer 404 must be placed.

For instance, in the above example, increasing PHY layer capacity by a factor of 40 may be too much for a single MAC layer 404 to handle. The cable operator will then have to decide how far out into HFC system 200 or 220 to move MAC layer 404. Depending on the MAC layer components, there may be a fixed MAC to PHY ratio that must be supported. If this is the case, this will dictate how many MAC layers 404 are required. The cable plant operator may then move MAC layer 404 into HFC system 200 or 220 to support the PHY layer bandwidth requirements.

The channel between MAC layer 404 and network layer 406 is not nearly as constrained. There are limits as to how latent this channel can be, but packet buffering is acceptable in this channel. The channel between MAC layer 404 and network layer 406 resembles an Internet channel. Multiple links between network layer 406 and MAC layer 404 can be aggregated to make the most of the channel's bandwidth. To leverage digital channel technology, other optical components may be required. If the optical components are in place deeper in the HFC system, the operator may push MAC layer 404 and network layer 406 deeper into HFC system 200 or 220. If the optical components do not exist and there is a budget to improve the HFC system, then the operator may pull these layers back toward the headend. The cost of bandwidth space is vast. This allows for many versions of distributed CMTS 400 in a HFC system.

Figure 8:
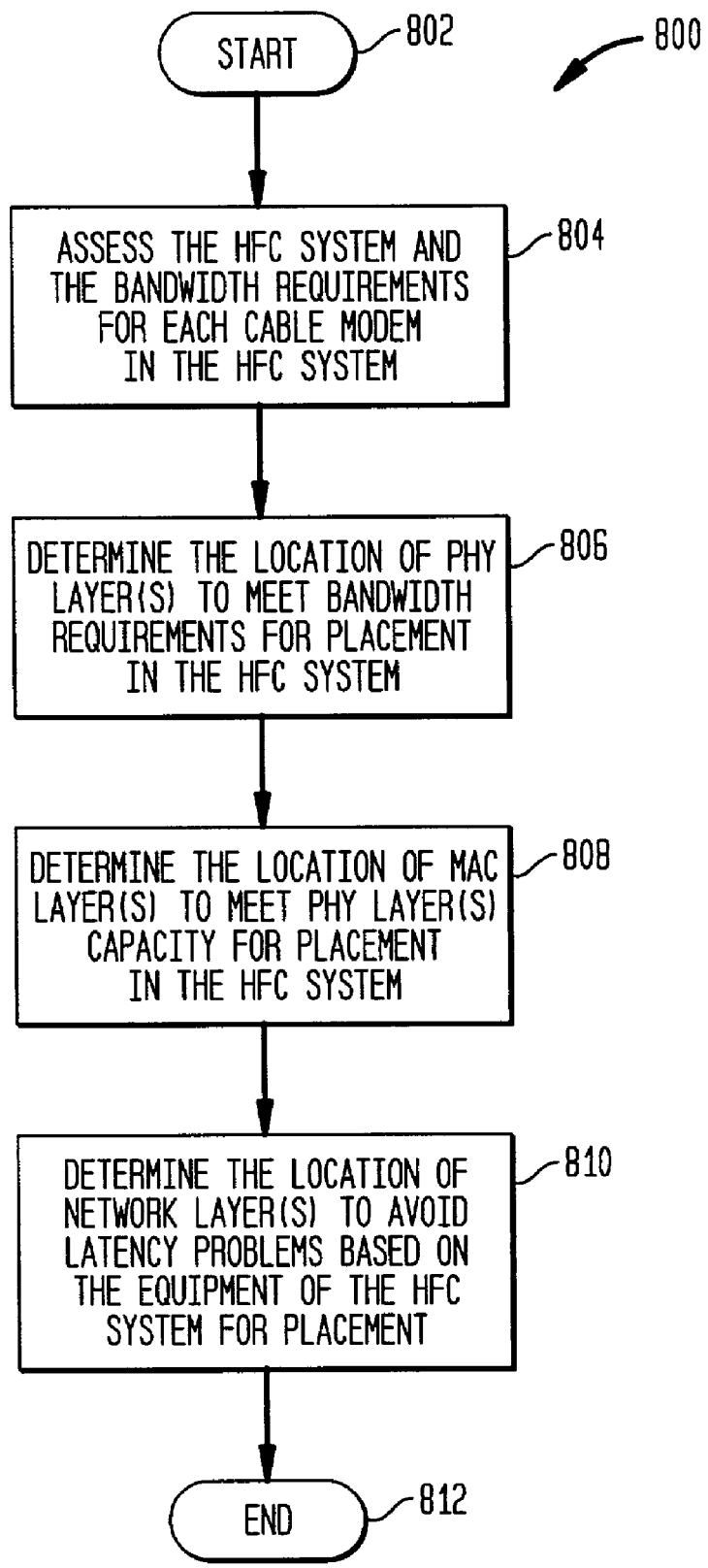
FIG. 8 is a flow diagram illustrating a method for determining the placement of a distributed CMTS in a hybrid fiber/coaxial (HFC) plant according to an embodiment of the present invention.

FIG. 8 is a flow diagram 800 illustrating a method for determining the placement of distributed CMTS 400 in a hybrid fiber/coax plant according to an embodiment of the present invention. The invention, however, is not limited to the description provided by flow diagram 800. Rather, it will be apparent to persons skilled in the relevant art(s) from the teachings provided herein that other functional flows are within the scope and spirit of the present invention. The process begins in step 802, where the process immediately proceeds to step 804.

In step 804, an assessment of the system is made. The assessment includes a determination of customer bandwidth requirements and a review of the current system configuration. The assessment may also include a review of any new equipment that will be added to the existing plant. The process then proceeds to step 806.

In step 806, a determination is made as to where to place PHY layer 402 in HFC system 200 or 220 to satisfy customer bandwidth requirements. The placement of PHY layer 402 will also determine the number of PHY layers 402 needed to provide adequate bandwidth to cable modems 210. For example, if PHY layer 402 is placed within a first or second hub, then only one PHY layer 402 is needed. Alternatively, if it is determined that PHY layer 402 needs to be placed in fiber node 206, then multiple PHY layers will be needed, one for each fiber node in the system. The process then proceeds to step 808.

In step 808, a determination is made as to where to place MAC layer 404. As previously stated, transmission delays between PHY layer 402 and MAC layer 404 must be nonexistent. Thus, the location of PHY layer(s) 402 is used to determine the maximum distance allowable to place MAC layer 404 without causing transmission delays. Also, the number of PHY layers placed in step 806 is used to determine the number of MAC layers needed. For example, if 10 PHY layers 402 are placed in step 806 and a single MAC layer 404 can only service 2 PHY layers 402, then at least 5 MAC layers 404 will be needed, and depending on the location of PHY layers 402, possibly 10 MAC layers 404 will be needed due to the point-to-multipoint configuration of the network.

In step 810, network layer 406 is placed. Although the constraints on the location of network layer 406 with respect to the location of MAC layer 404 are minimal, latency limits must be adhered to in order that distributed CMTS 400 operate according to DOCSIS specifications. The process then proceeds to step 812, where the process ends.

Hybrid fiber/coaxial (HFC) systems may be arranged using a plurality of configurations. Thus, numerous embodiments of distributed CMTS 400 may exist for each cable network. Whether any given embodiment of distributed CMTS 400 will work with any given HFC system will depend on the configuration of the HFC system and the distance between various components of the HFC system. Various embodiments of distributed CMTS 400 will now be described with reference to exemplary HFC systems 200 and 220 (described above with reference to FIGS. 2A and 2B). Although HFC systems 200 and 220 are used to provide a plurality of distributed CMTS configurations, the distributed CMTS configurations presented are not to be limited by HFC systems 200 and 220. One skilled in the art would know that other distributed CMTS configurations are possible depending on the configuration of the HFC system in which the distributed CMTS is to implemented.

Figure 9:
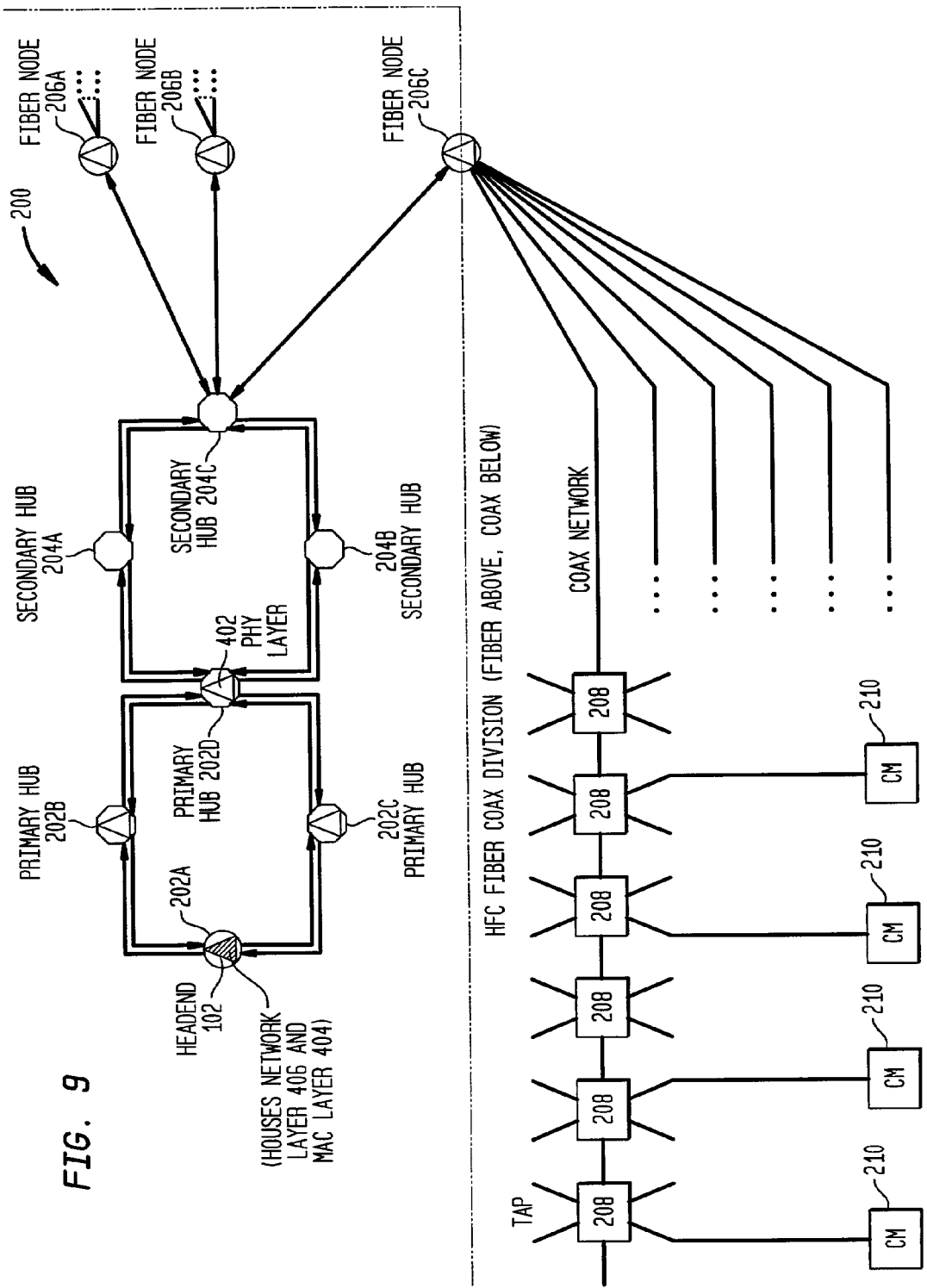
FIGS. 9-39 are block diagrams illustrating exemplary embodiments of distributed CMTS configurations in a hybrid fiber/coaxial (HFC) plant.

FIGS. 9-12 illustrate distributed CMTS configurations in which network and MAC layers 406 and 404 reside in headend 102, and PHY layer 402 is distributed across the fiber portion of HFC systems 200 and 220. In FIG. 9, PHY layer 402 resides in primary hub 202D. In this configuration of distributed CMTS 400, one network layer 406, one MAC layer 404, and one PHY layer 402 are used. This configuration enables digital transmissions in the upstream to begin at primary hub 202D. Although PHY layer 402 services all cable modems 210 attached to each of fiber nodes 206A-C in system 200, enabling digital transmission to begin further out from headend 102 will lessen the noise. Thus, in the upstream, RF signals are transmitted from cable modems 210 to fiber nodes 206, optical signals are transmitted from fiber nodes 206 to primary hub 202D, and digital signals are transmitted thereafter.

Figure 10:
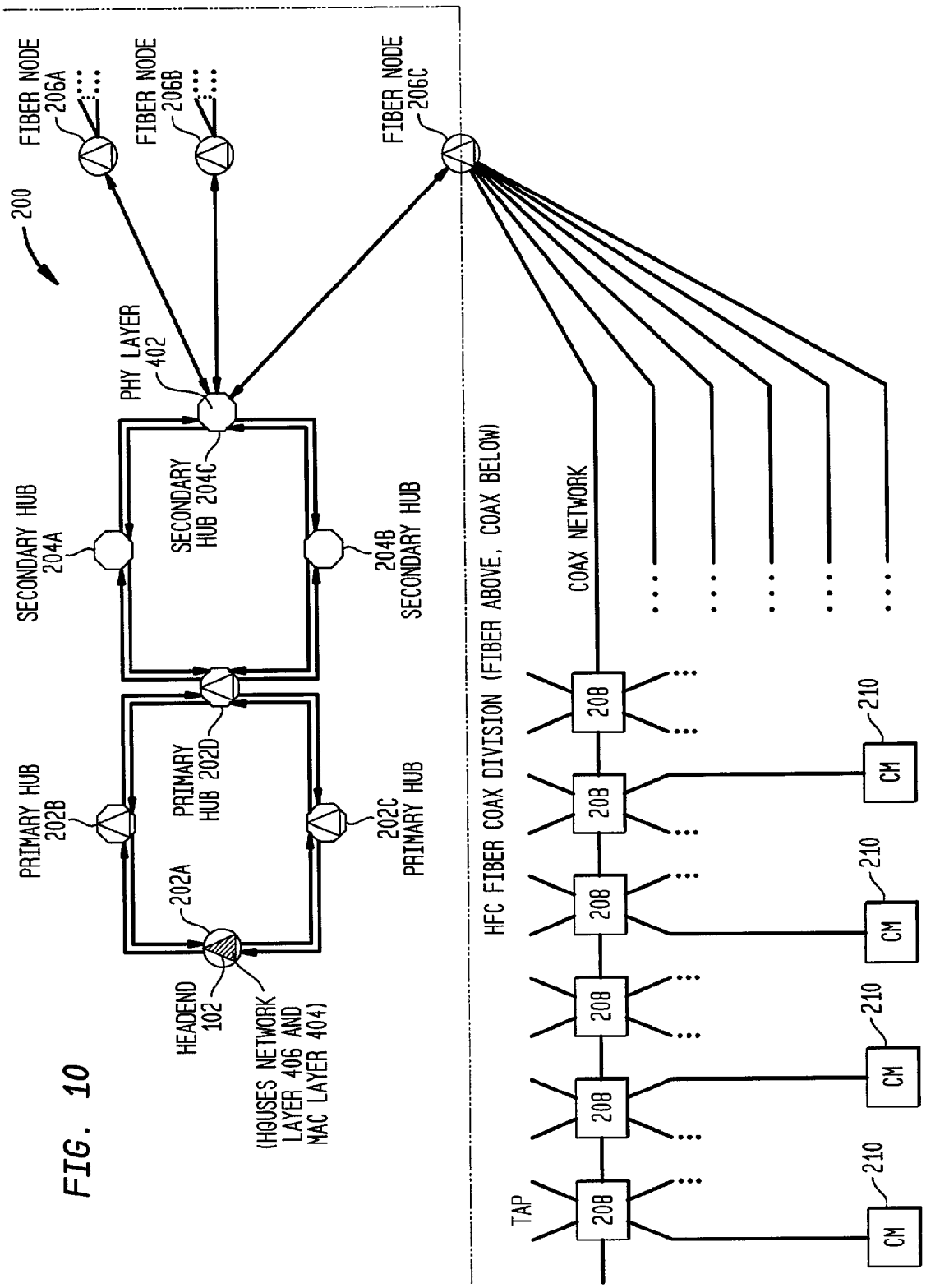

In FIG. 10, PHY layer 402 resides in secondary hub 204. This configuration of distributed CMTS 400 also uses one network layer 406, one MAC layer 404, and one PHY layer 402. In this embodiment, upstream digital transmission begins at secondary hub 204C. With this embodiment, PHY layer 402 services all cable modems 210 attached to each of fiber nodes 206A-C in system 200, but lessens the analog noise level by enabling digital transmissions in the upstream to occur at an earlier time within the network. Thus, in the upstream, RF signals are transmitted from cable modems 210 to fiber nodes 206, optical signals are transmitted from fiber nodes 206 to secondary hub 204C, and digital signals are transmitted thereafter.

Figure 11:
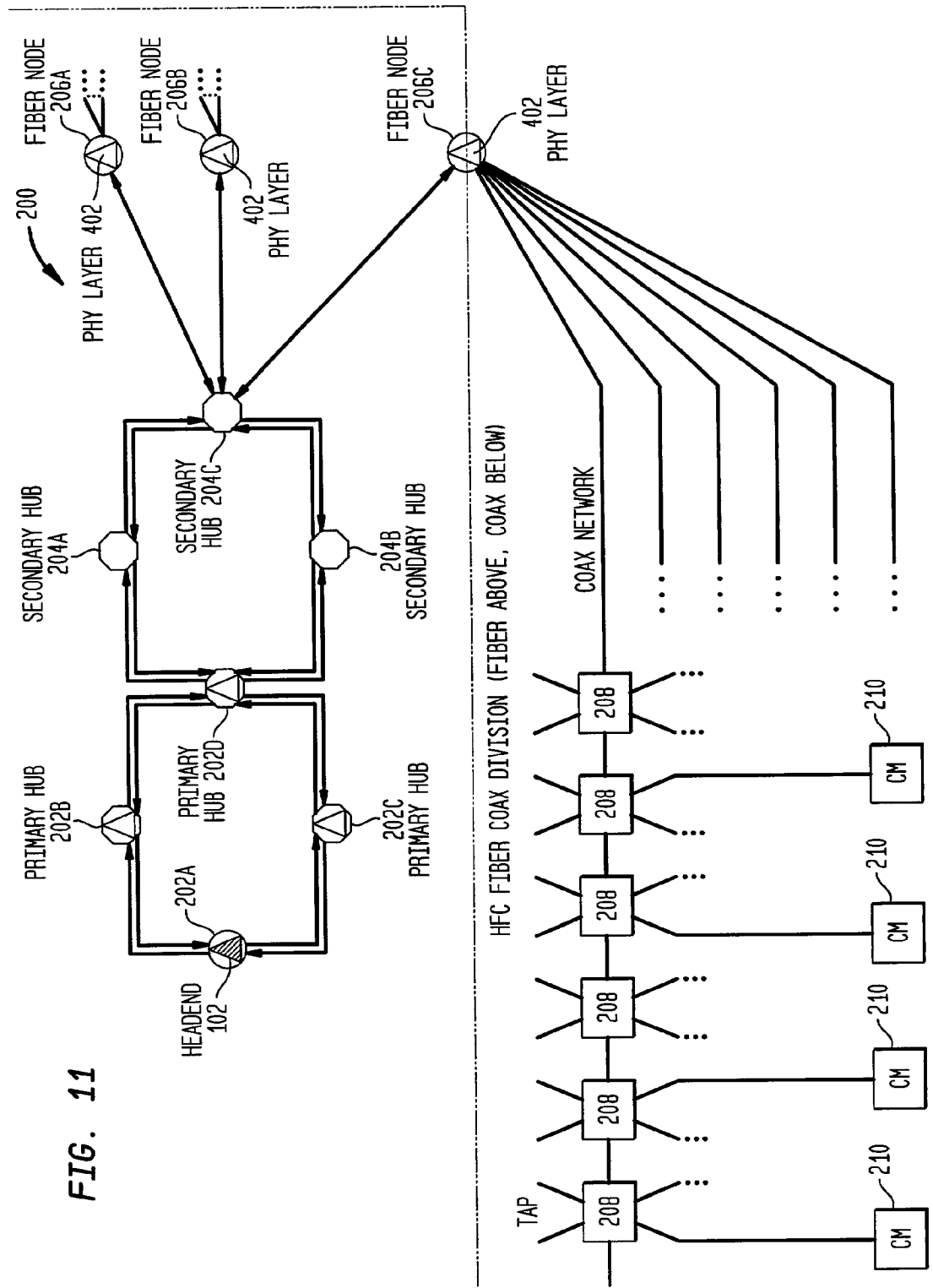

In FIG. 11, PHY layer 402 resides in fiber nodes 206. In this configuration of distributed CMTS 400, a PHY layer 402 is needed for each fiber node 206 in HFC system 200. This configuration requires one network layer 406, one MAC layer 404, and a PHY layer 402 for each fiber node in the system. As the number of PHY layers 402 increases, each PHY layer 402 supports fewer cable modems 210, causing the system bandwidth to increase and the analog noise level to decrease. For example, each PHY layer 402 shown in FIG. 11 services cable modems 210 attached to one of fiber nodes 206A, 206B, or 206C. Digital transmissions now begin at fiber nodes 206. In the upstream, RF signals are transmitted from cable modems 210 to fiber nodes 206 and digital signals are transmitted thereafter.

Figure 12:
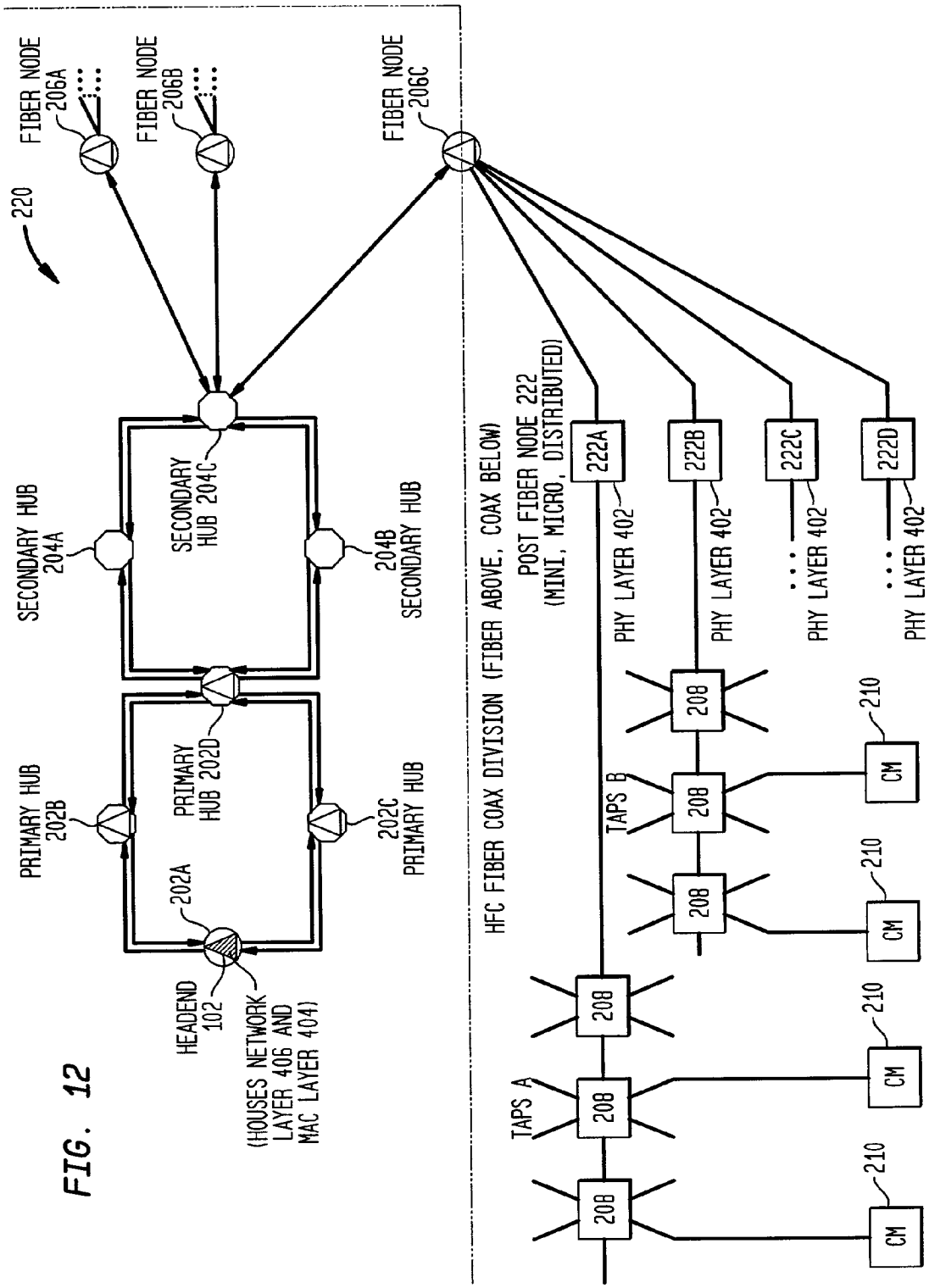

In FIG. 12, PHY layer 402 resides in post fiber node 222. In this configuration of distributed CMTS 400, a PHY layer 402 is needed for each post fiber node 222 that connects to fiber nodes 206A-C. This configuration requires one network layer 406, one MAC layer 404, and a plurality of PHY layers 402, one for each post fiber node 222 in the system. The configuration shown in FIG. 12 moves PHY layers 402 closer to cable modems 210, thereby enabling each PHY layer to support fewer cable modems 210. For example, each PHY layer 402 shown in FIG. 12 services cable modems 210 attached to one of post fiber nodes 222A, 222B, 222C or 222D. This also causes the system bandwidth to increase. In the upstream, digital transmission begins at post fiber nodes 222, thereby decreasing any analog noise resulting from interference sources in the coaxial cables. RF signals are transmitted from cable modems 210 to post fiber nodes 222 and digital signals are transmitted thereafter.

Figure 13:
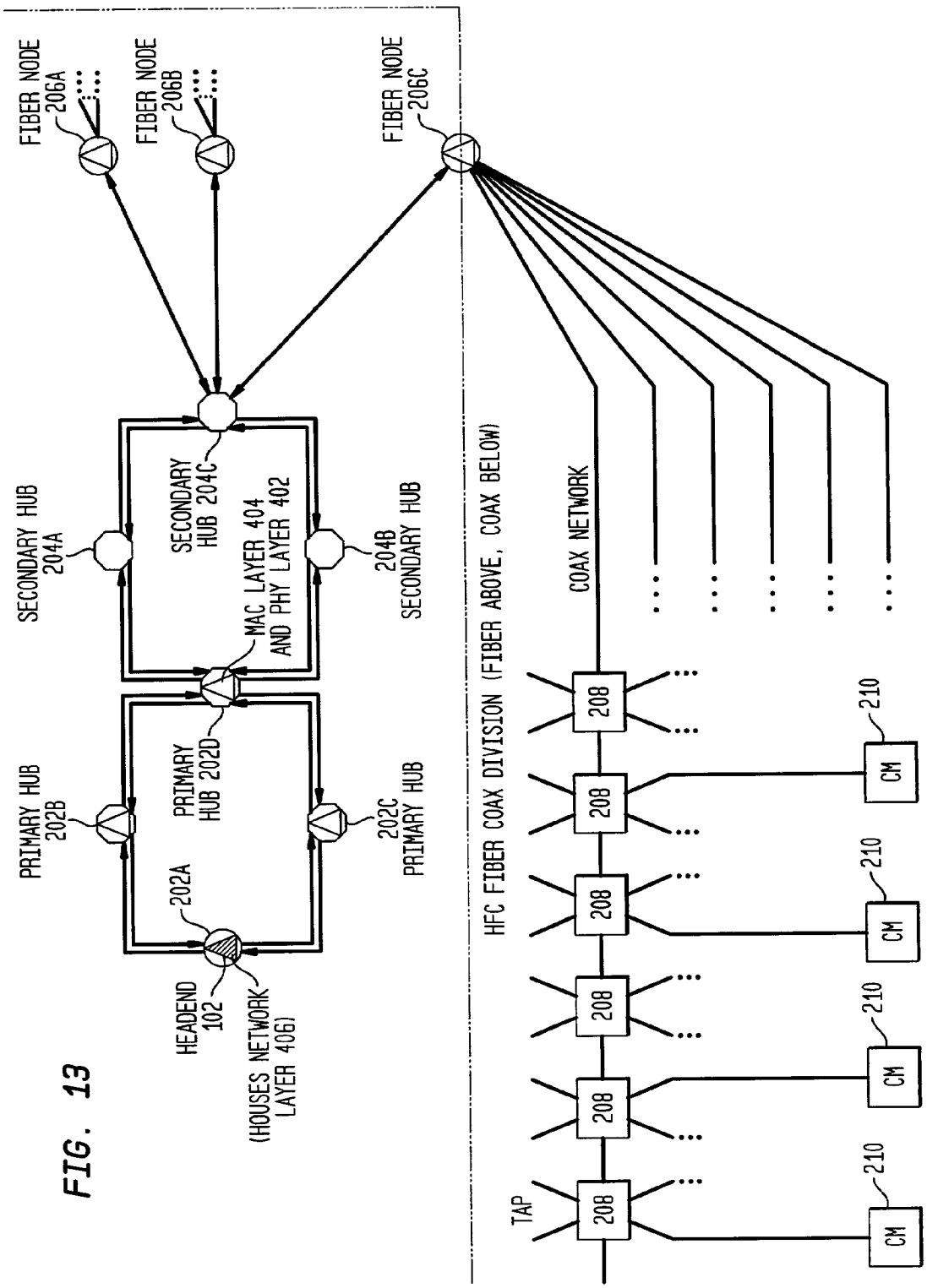

FIGS. 13-16 illustrate distributed CMTS configurations in which network layer 406 resides in headend 102, MAC layer 404 resides in primary hub 202D, and PHY layer 402 is distributed across the fiber portion of hybrid fiber/coaxial system 200 or 220. In FIG. 13, PHY layer 402 resides in primary hub 202D. In this configuration of distributed CMTS 400, one network layer 406, one MAC layer 404, and one PHY layer 402 are used. This configuration enables digital transmissions in the upstream to begin at primary hub 202D. Although PHY layer 402 services all cable modems 210 attached to each of fiber nodes 206A-C in system 200, enabling digital transmission to begin further out from headend 102 will lessen the noise. Thus, in the upstream, RF signals are transmitted from cable modems 210 to fiber nodes 206, optical signals are transmitted from fiber nodes 206 to primary hub 202D, and digital signals are transmitted thereafter.

Figure 14:
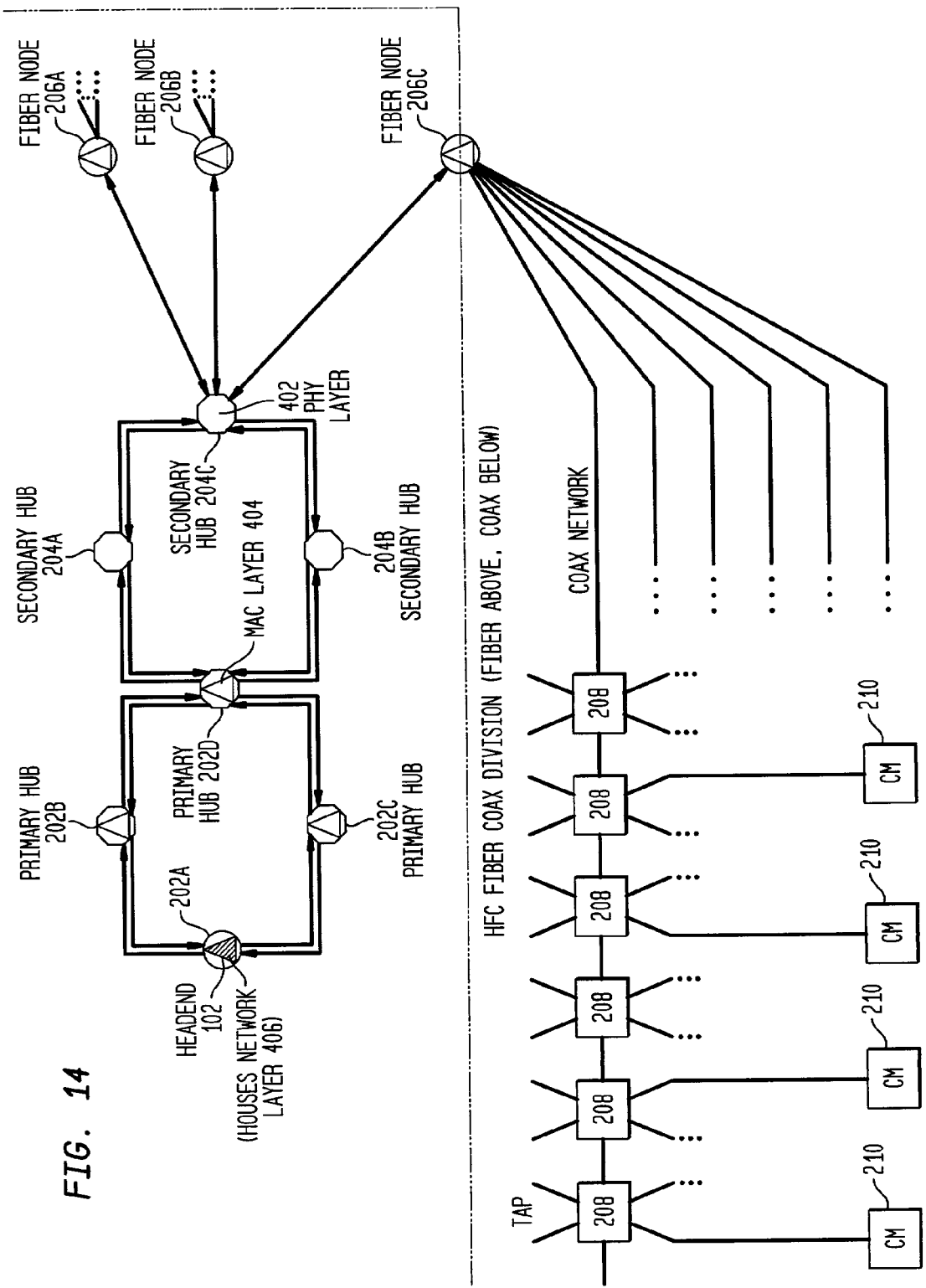

In FIG. 14, PHY layer 402 is located in secondary hub 204C. This configuration of distributed CMTS 400 also uses one network layer 406, one MAC layer 404, and one PHY layer 402. With this embodiment, PHY layer 402 services all cable modems 210 attached to each of fiber nodes 206A-C in system 200, but lessens the analog noise level by enabling digital transmissions in the upstream to occur at an earlier time within the network. Thus, in the upstream, RF signals are transmitted from cable modems 210 to fiber nodes 206, optical signals are transmitted from fiber nodes 206 to secondary hub 204C, and digital signals are transmitted thereafter.

Figure 15:
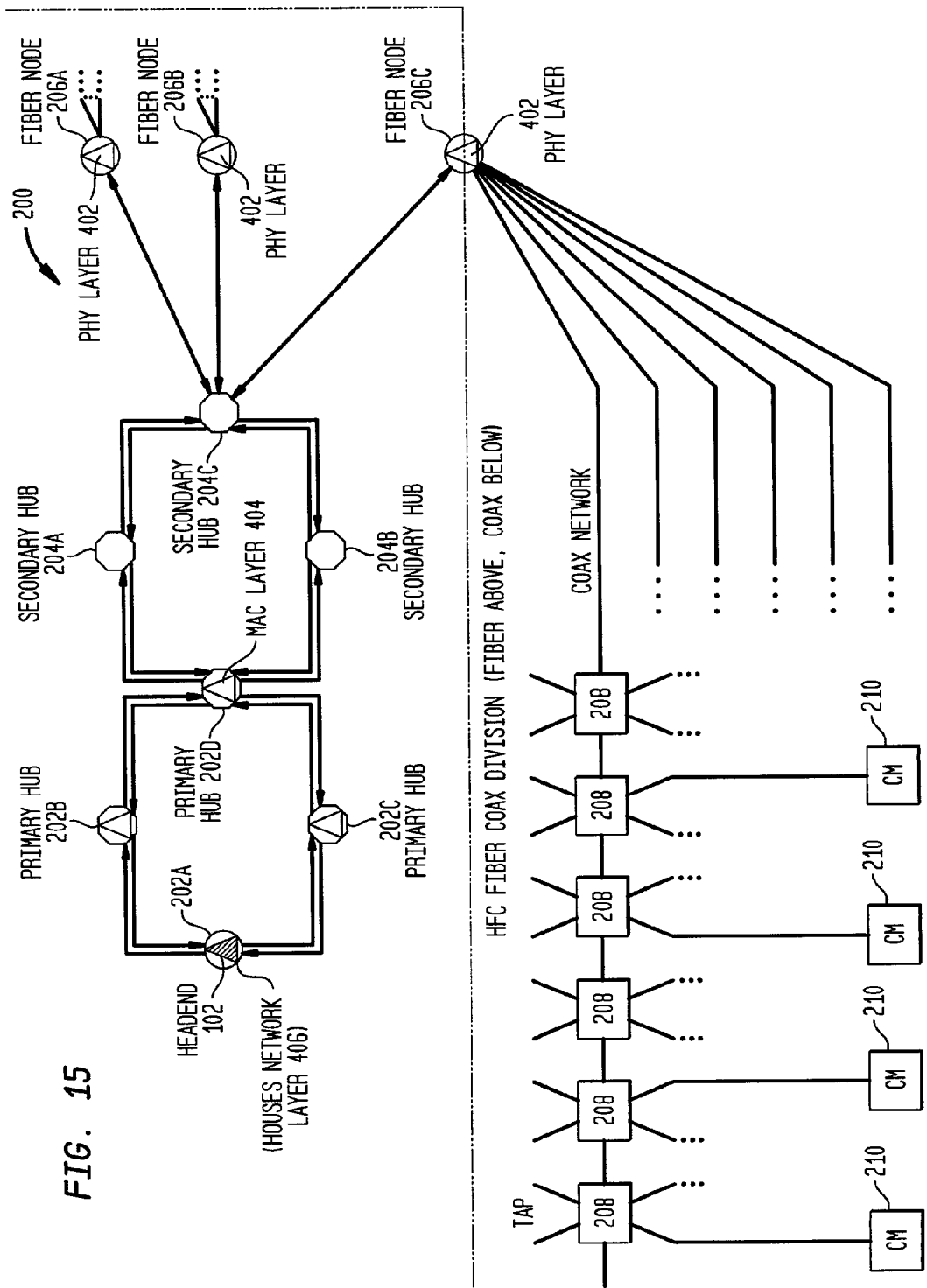

In FIG. 15, PHY layer 402 is located in fiber nodes 206. In this configuration of distributed CMTS 400, a PHY layer 402 is needed for each fiber node 206 in HFC system 200. This configuration requires one network layer 406, one MAC layer 404, and a PHY layer 402 for each fiber node in the system. As the number of PHY layers 402 increases, each PHY layer 402 supports fewer modems, causing the system bandwidth to increase and the analog noise level to decrease. For example, each PHY layer 402 shown in FIG. 15 services cable modems 210 attached to one of fiber nodes 206A, 206B, or 206C. Digital transmissions now begin at fiber nodes 206. In the upstream, RF signals are transmitted from cable modems 210 to fiber nodes 206 and digital signals are transmitted thereafter.

Figure 16:
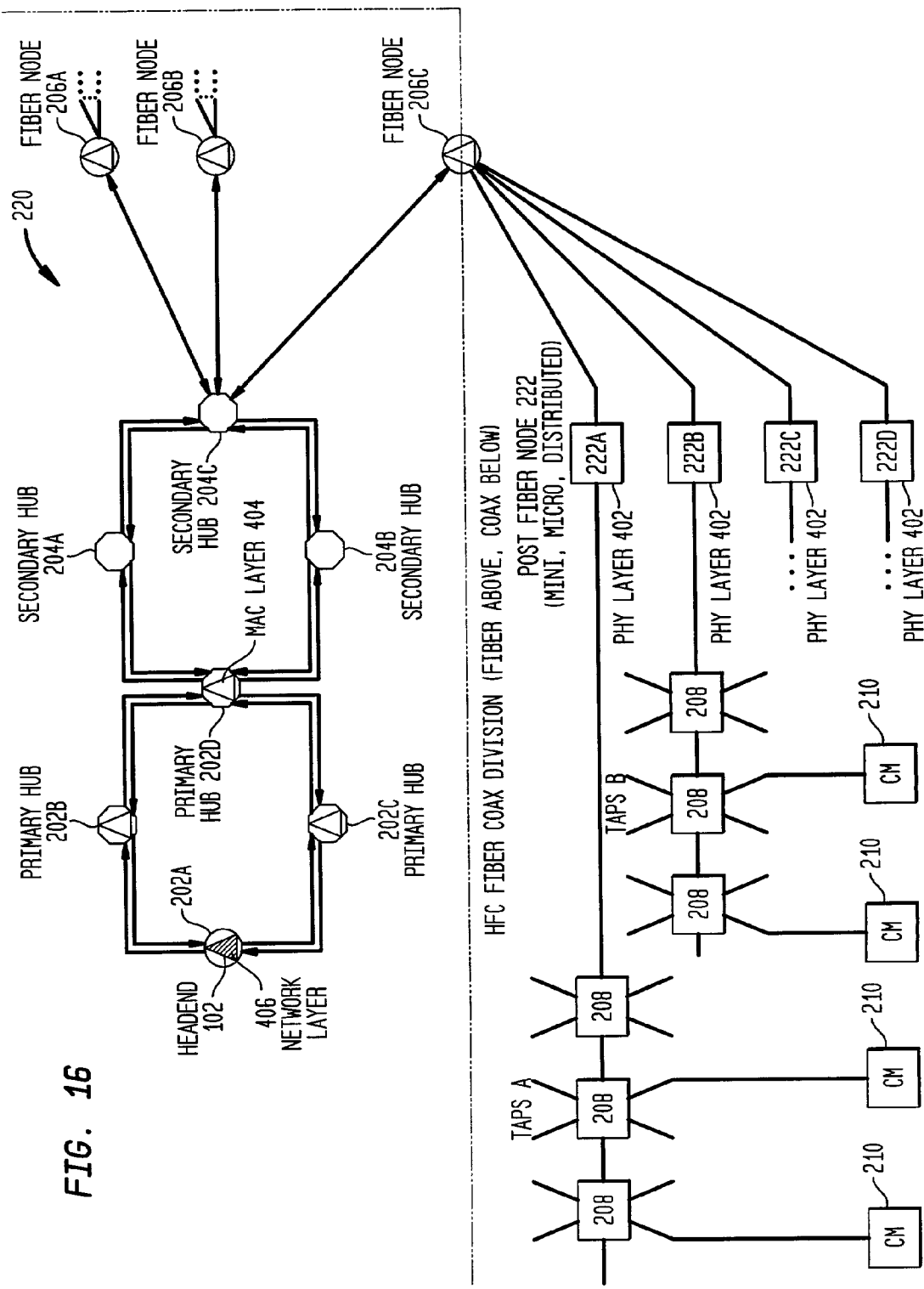

In FIG. 16, PHY layer 402 is placed in post fiber nodes 222. In this configuration of distributed CMTS 400, a PHY layer 402 is needed for each post fiber node 222 that connects to fiber nodes 206A-C. This configuration requires one network layer 406, one MAC layer 404, and a plurality of PHY layers 402, one for each post fiber node 222 in the system. The configuration shown in FIG. 16 moves PHY layers 402 closer to modems 210, thereby enabling each PHY layer to support fewer cable modems 210. For example, each PHY layer 402 shown in FIG. 16 services cable modems 210 attached to one of post fiber nodes 222A, 222B, 222C or 222D. This also causes the system bandwidth to increase. In the upstream, digital transmission begins at post fiber nodes 222, thereby decreasing any analog noise resulting from interference sources in the coaxial cables. RF signals are transmitted from cable modems 210 to post fiber nodes 222 and digital signals are transmitted thereafter.

Figure 17:
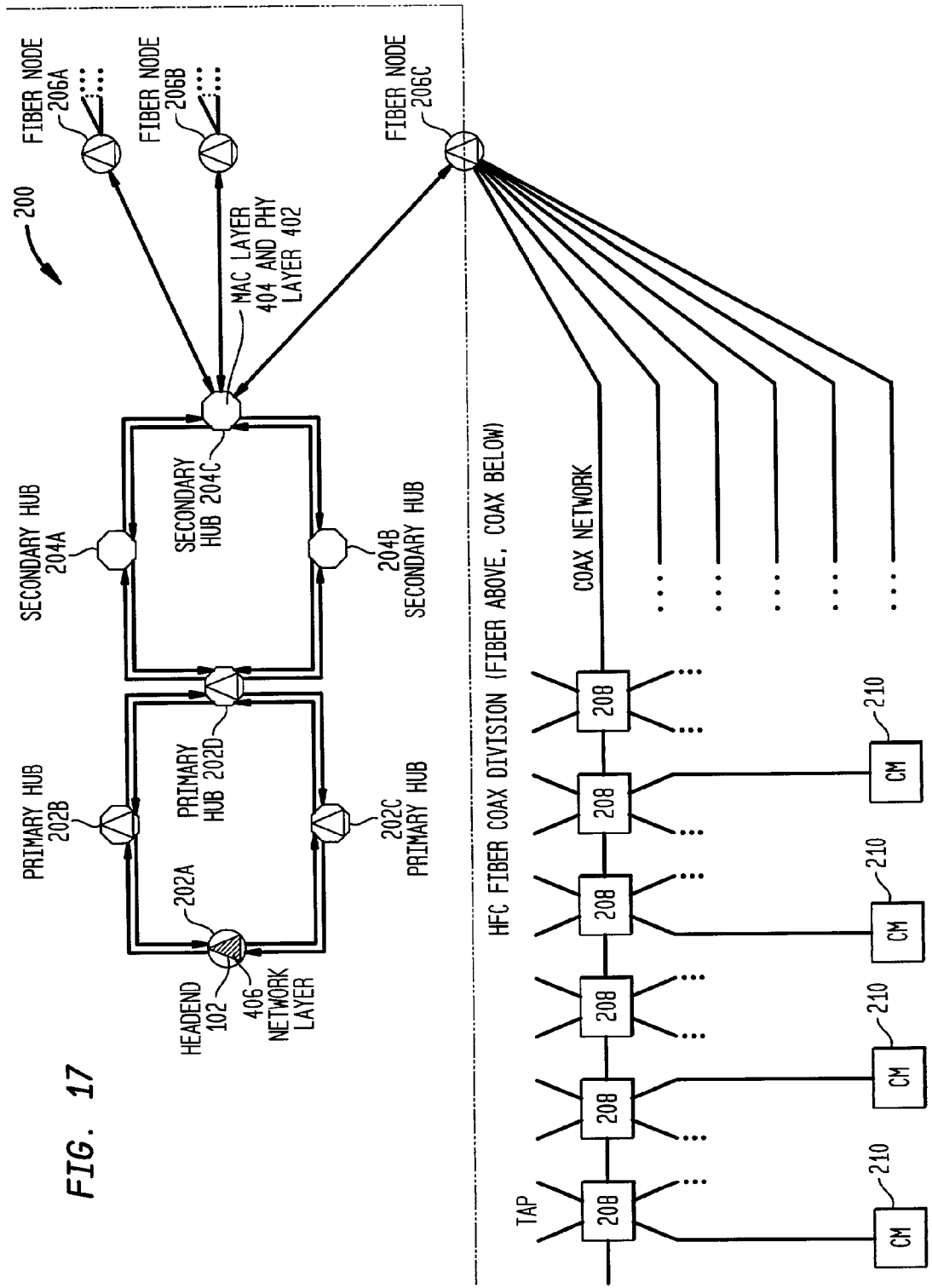
Figure 18:
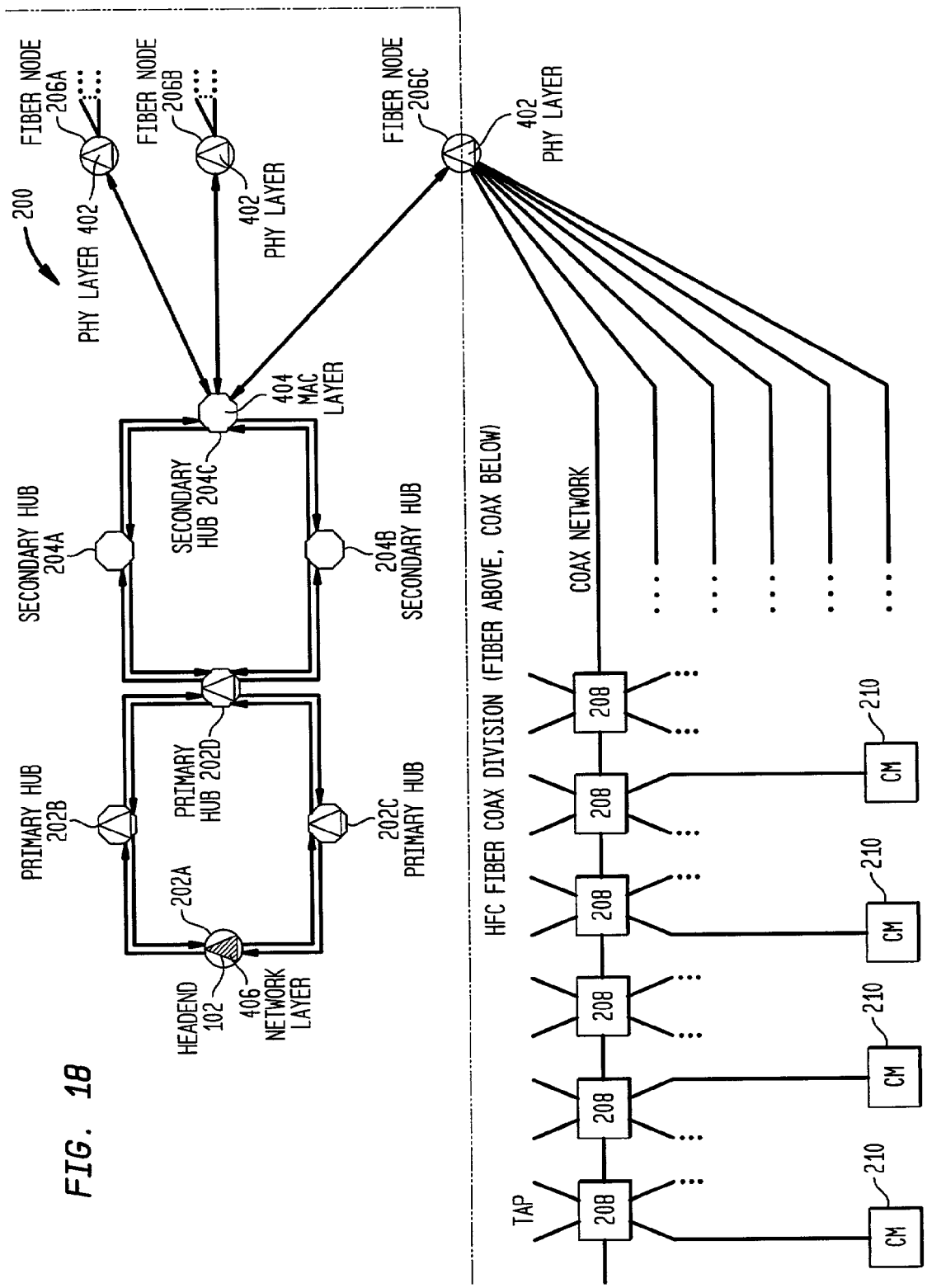
Figure 19:
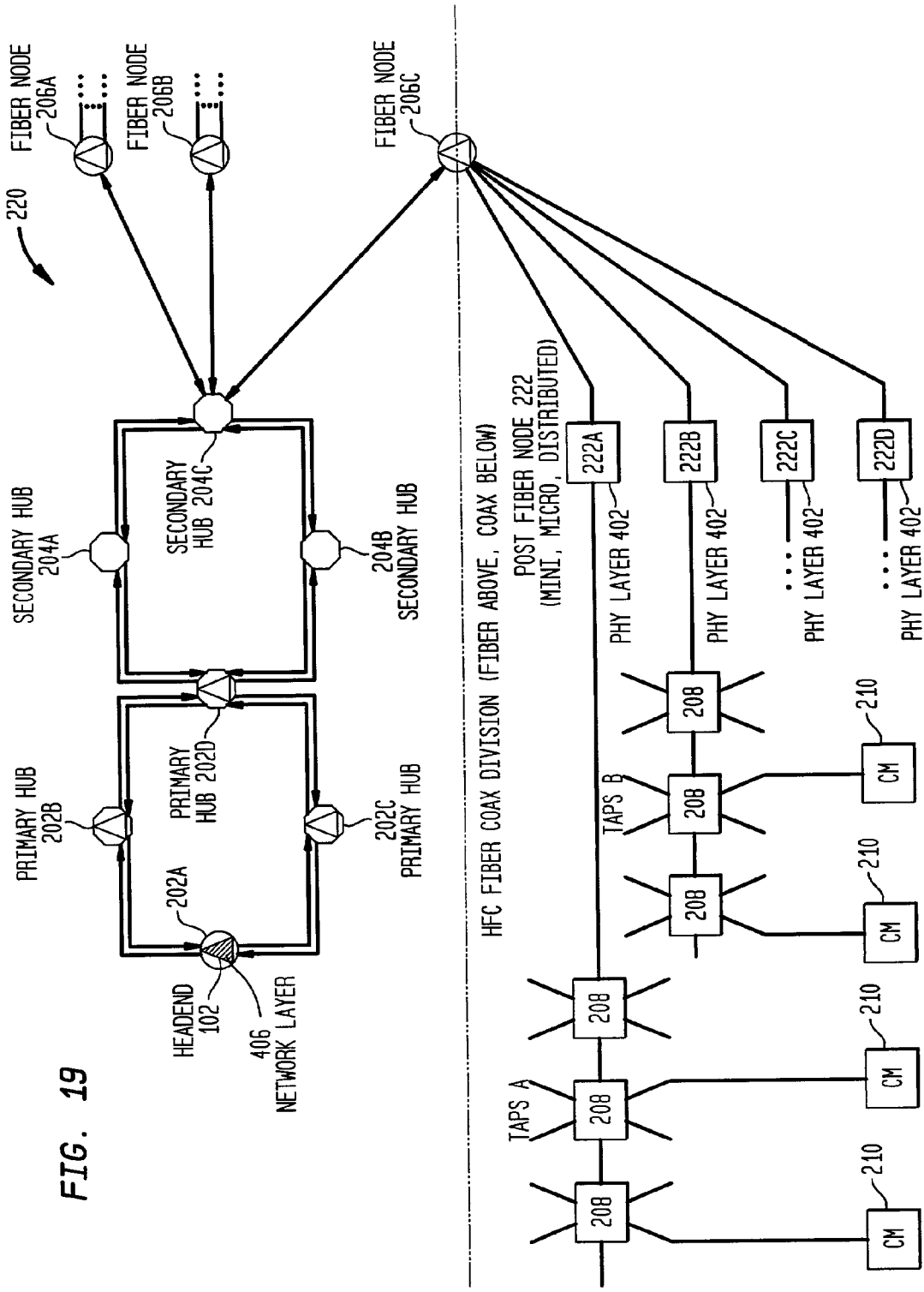

FIGS. 17-19 illustrate distributed CMTS configurations in which network layer 406 resides in headend 102, MAC layer 404 resides in secondary hub 202D, and PHY layer 402 is distributed further into the fiber portion of hybrid fiber/coaxial system 200 and 220. In FIG. 17, PHY layer 402 is co-located with MAC layer 404 in secondary hub 202C. This configuration of distributed CMTS 400 uses one network layer 406, one MAC layer 404, and one PHY layer 402. In this embodiment, upstream digital transmission begins at secondary hub 204C. PHY layer 402 services all cable modems 210 attached to each of fiber nodes 206A-C, but lessens the analog noise level by enabling digital transmissions in the upstream to occur at an earlier time within the network. In the upstream, RF signals are transmitted from cable modems 210 to fiber nodes 206, optical signals are transmitted from fiber nodes 206 to secondary hub 204C, and digital signals are transmitted thereafter.

In FIG. 18, PHY layer 402 is located in fiber nodes 206. In this configuration of distributed CMTS 400, a PHY layer 402 is needed for each fiber node 206 in HFC system 200. This configuration requires one network layer 406, one MAC layer 404, and a PHY layer 402 for each fiber node in the system. As the number of PHY layers 402 increases, each PHY layer 402 supports fewer cable modems 210, causing the system bandwidth to increase and the analog noise level to decrease. For example, each PHY layer 402 shown in FIG. 18 services cable modems 210 attached to one of fiber nodes 206A, 206B, or 206C. Digital transmissions now begin at fiber nodes 206. In the upstream, RF signals are transmitted from cable modems 210 to fiber nodes 206 and digital signals are transmitted thereafter.

In FIG. 19, PHY layer 402 is located in post fiber nodes 212. In this configuration of distributed CMTS 400, a PHY layer 402 is needed for each post fiber node 222 that connects to fiber nodes 206A-C. This configuration requires one network layer 406, one MAC layer 404, and a plurality of PHY layers 402, one for each post fiber node 222 in the system. The configuration shown in FIG. 19 moves PHY layers 402 closer to modems 210, thereby enabling each PHY layer to support fewer cable modems 210. For example, each PHY layer 402 shown in FIG. 19 services cable modems 210 attached to one of post fiber nodes 222A, 222B, 222C or 222D. This also causes the system bandwidth to increase. In the upstream, digital transmission begins at post fiber nodes 222, thereby decreasing any analog noise resulting from interference sources in the coaxial cables. RF signals are transmitted from cable modems 210 to post fiber nodes 222 and digital signals are transmitted thereafter.

Figure 20:
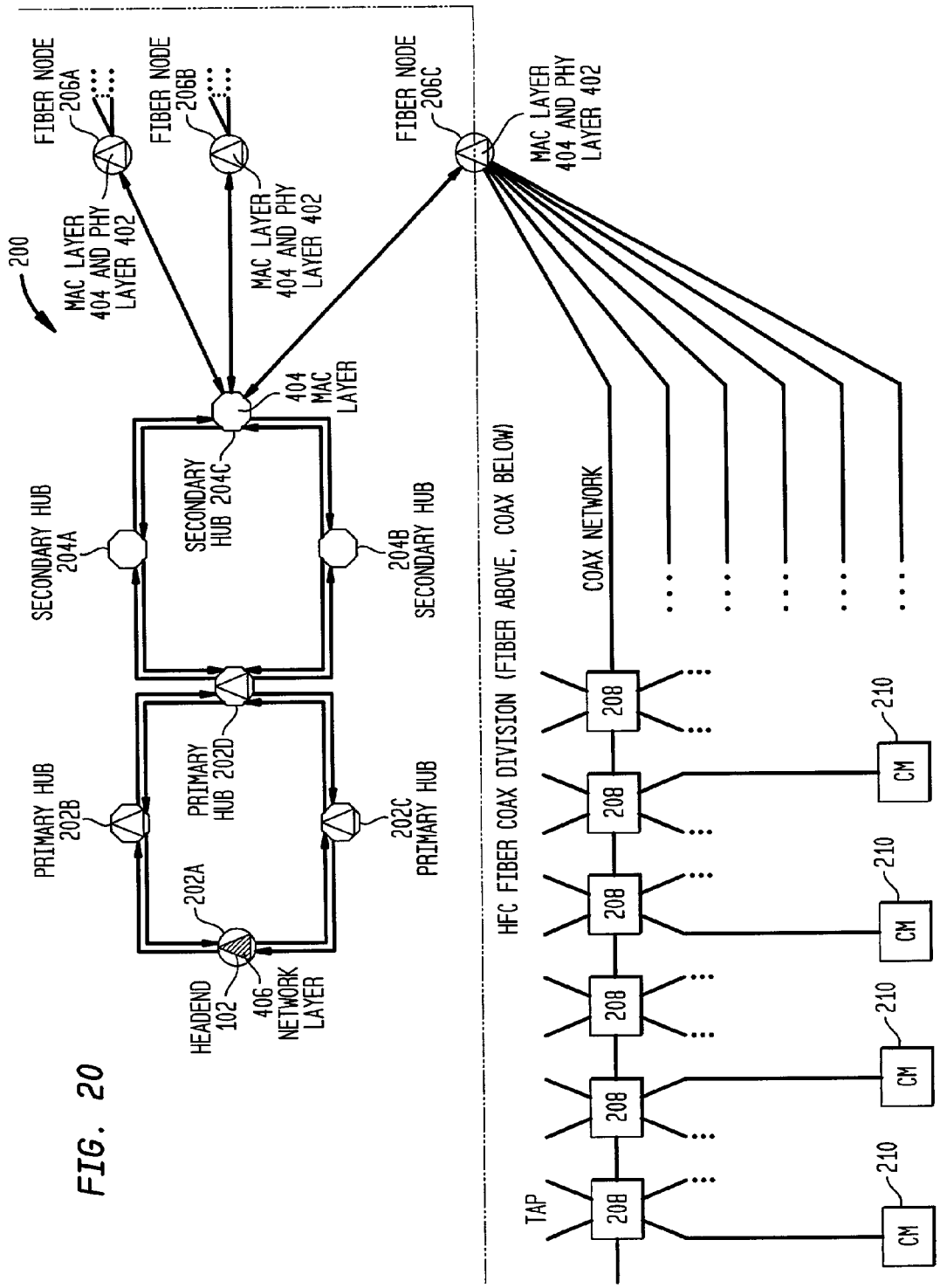
Figure 21:
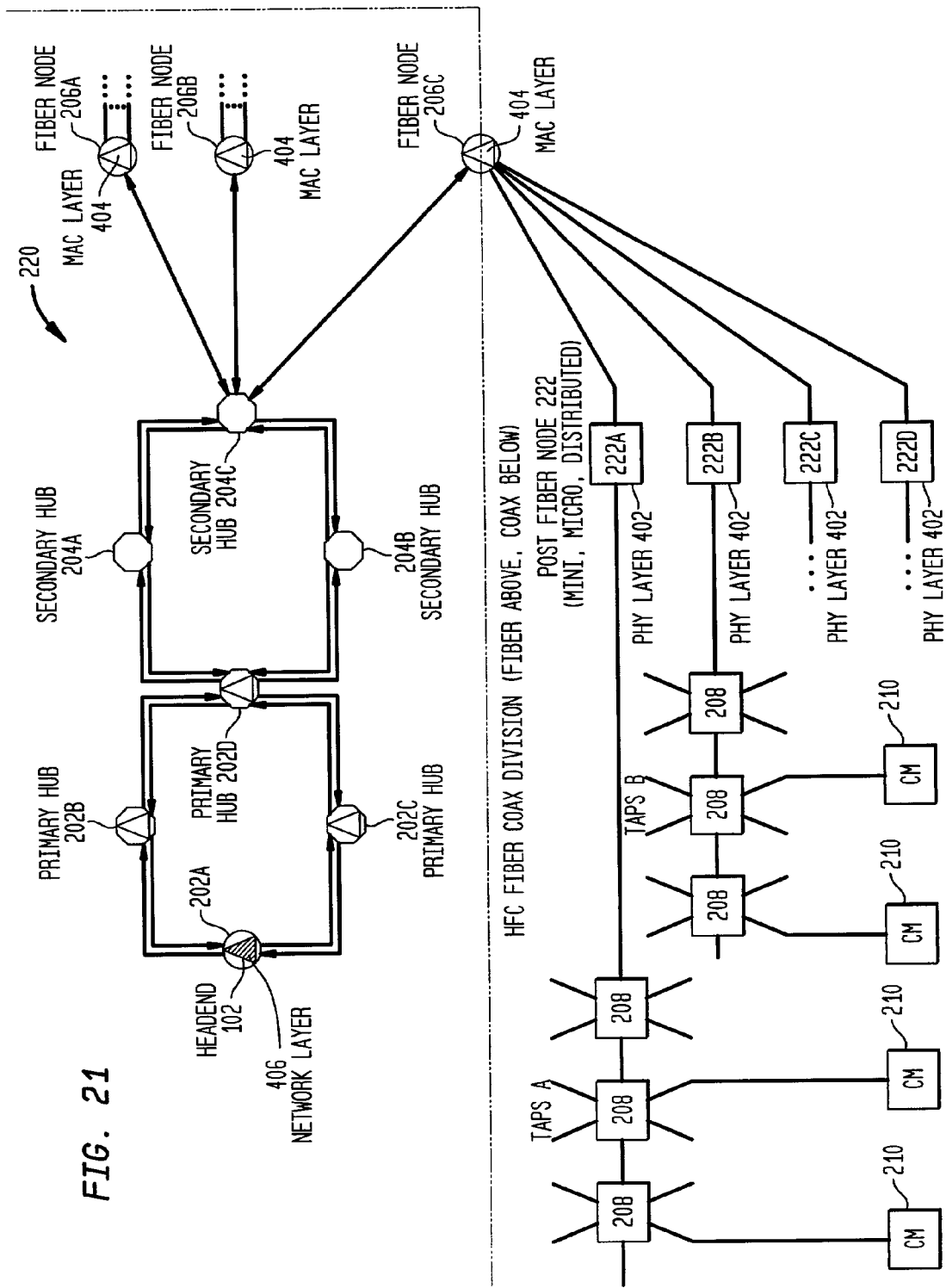

FIGS. 20 and 21 illustrate distributed CMTS configurations in which network layer 406 resides in headend 102, MAC layer 404 resides in fiber nodes 206, and PHY layer 402 is distributed in the fiber portion of hybrid fiber/coaxial systems 200 and 220. In FIG. 20, PHY layer 402 is co-located with MAC layer 404 in fiber node 206C. In this embodiment, one network layer 406 is implemented, and multiple MAC and PHY layers 404 and 402 are implemented, one MAC layer 404 and one PHY layer 402 for each fiber node 206. This configuration is utilized when one MAC layer 404 cannot adequately handle the number of PHY layers 402 required. Using a plurality of PHY layers 402 at fiber nodes 206 requires each PHY layer 402 to support fewer cable modems 210. For example, each PHY layer 402 shown in FIG. 20 services cable modems 210 attached to one of fiber nodes 206A, 206B, or 206C. This increases system bandwidth and decreases analog noise levels. Digital transmissions in the upstream now begin at fiber nodes 206. This configuration enables RF signals to be transmitted from cable modems 210 to fiber nodes 206 and digital signals to be transmitted therefrom.

In FIG. 21, PHY layer 402 is located in post fiber node 222. In this embodiment, one network layer 406 is implemented and multiple MAC and PHY layers 404 and 402, respectively, are implemented. A MAC layer 404 is placed in each fiber node 206 and a PHY layer 402 is placed in each post fiber node 222. In this embodiment, a single MAC layer would be unable to handle the requirements of the required number of PHY layers. Therefore, MAC layers 404 are placed at each fiber node 206 to handle the number of PHY layers 402 placed at each post fiber node 222. This configuration moves PHY layers 402 closer to cable modems 210, thereby enabling each PHY layer 402 to support fewer cable modems 210. For example, each PHY layer 402 shown in FIG. 21 services cable modems 210 attached to one of post fiber nodes 222A, 222B, 222C or 222D. This implementation causes the system bandwidth to increase. Digital transmission in the upstream begins at post fiber node 222, thereby decreasing any analog noise signals resulting from interference sources in the coaxial cables. RF signals are transmitted from cable modems 210 to post fiber nodes 222 and digital signals are transmitted therefrom.

Figure 22:
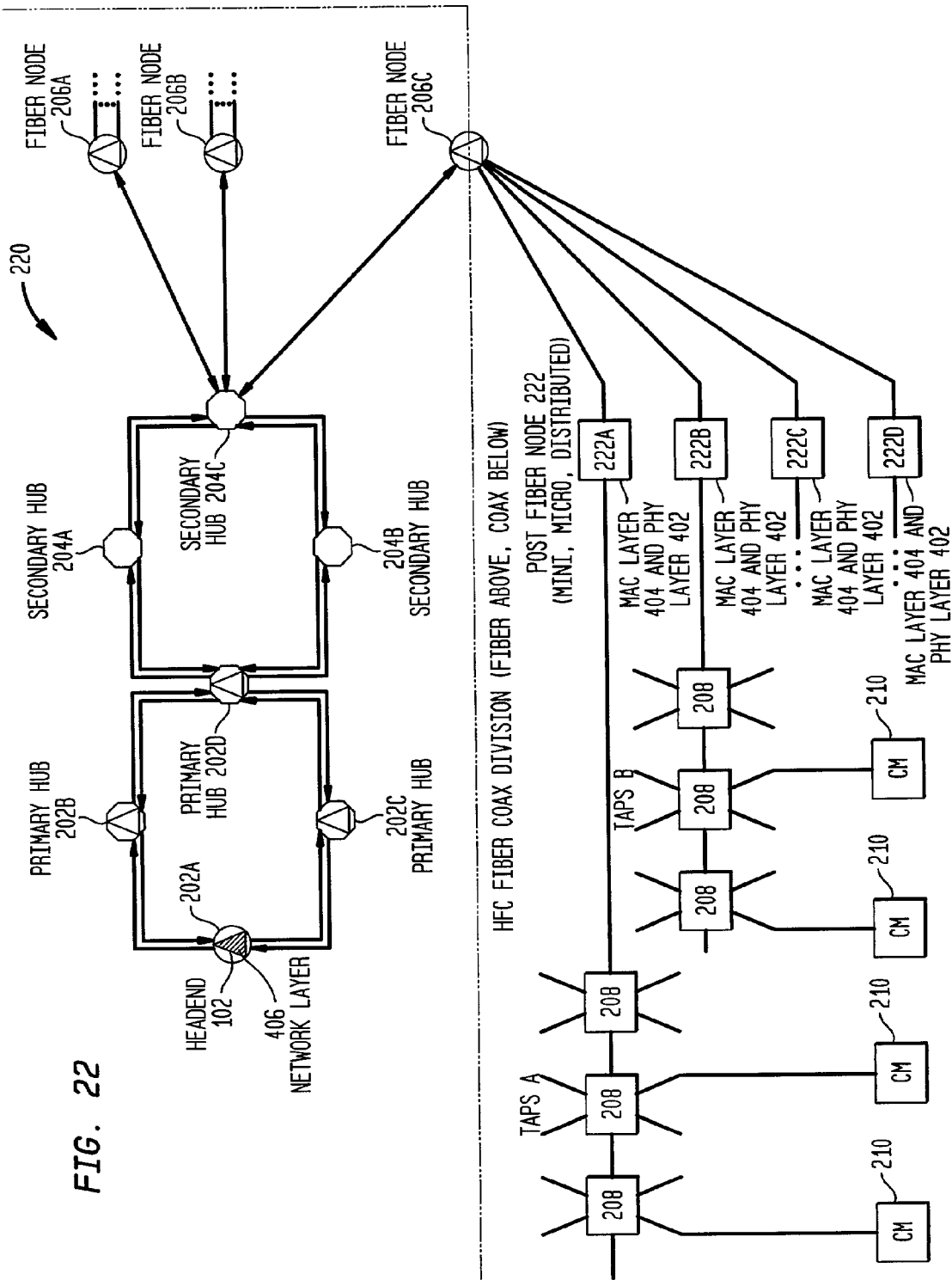

FIG. 22 illustrates distributed CMTS 400 wherein network layer 406 resides in headend 102 and MAC layers 404 and PHY layers 402 reside in post fiber nodes 222. In this configuration, one MAC layer 404 and one PHY layer 402 are needed for each post fiber node 222. In this embodiment, a single MAC layer would be unable to handle the requirements of the required number of PHY layers. Therefore, MAC layers 404 are placed at each post fiber node 222 to handle each PHY layer 402 placed at each post fiber node 222. This configuration moves PHY layers 402 closer to cable modems 210, thereby enabling each PHY layer 402 to support fewer cable modems 210. For example, each PHY layer 402 shown in FIG. 22 services cable modems 210 attached to one of post fiber nodes 222A, 222B, 222C or 222D. This implementation causes the system bandwidth to increase. Digital transmission in the upstream begins at post fiber node 222, thereby decreasing any analog noise signals resulting from interference sources in the coaxial cables. RF signals are transmitted from cable modems 210 to post fiber nodes 222 and digital signals are transmitted therefrom.

The previous examples of distributed CMTS configurations described above all had at least one distributed CMTS layer residing in headend 102. The remaining examples of distributed CMTS configurations have pushed all layers 402, 404, and 406 of distributed CMTS 400 away from headend 102.

Figure 23:
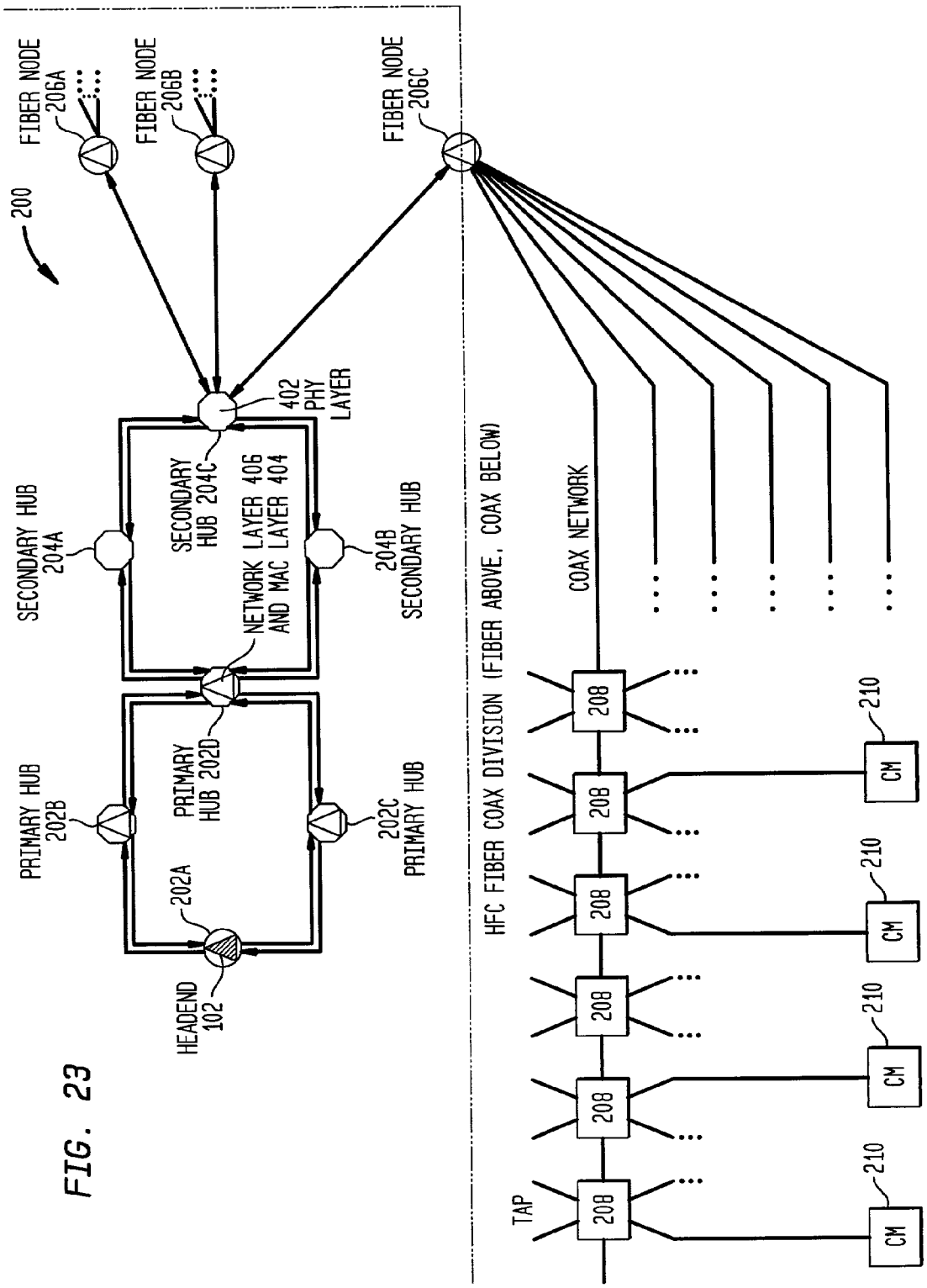
Figure 24:
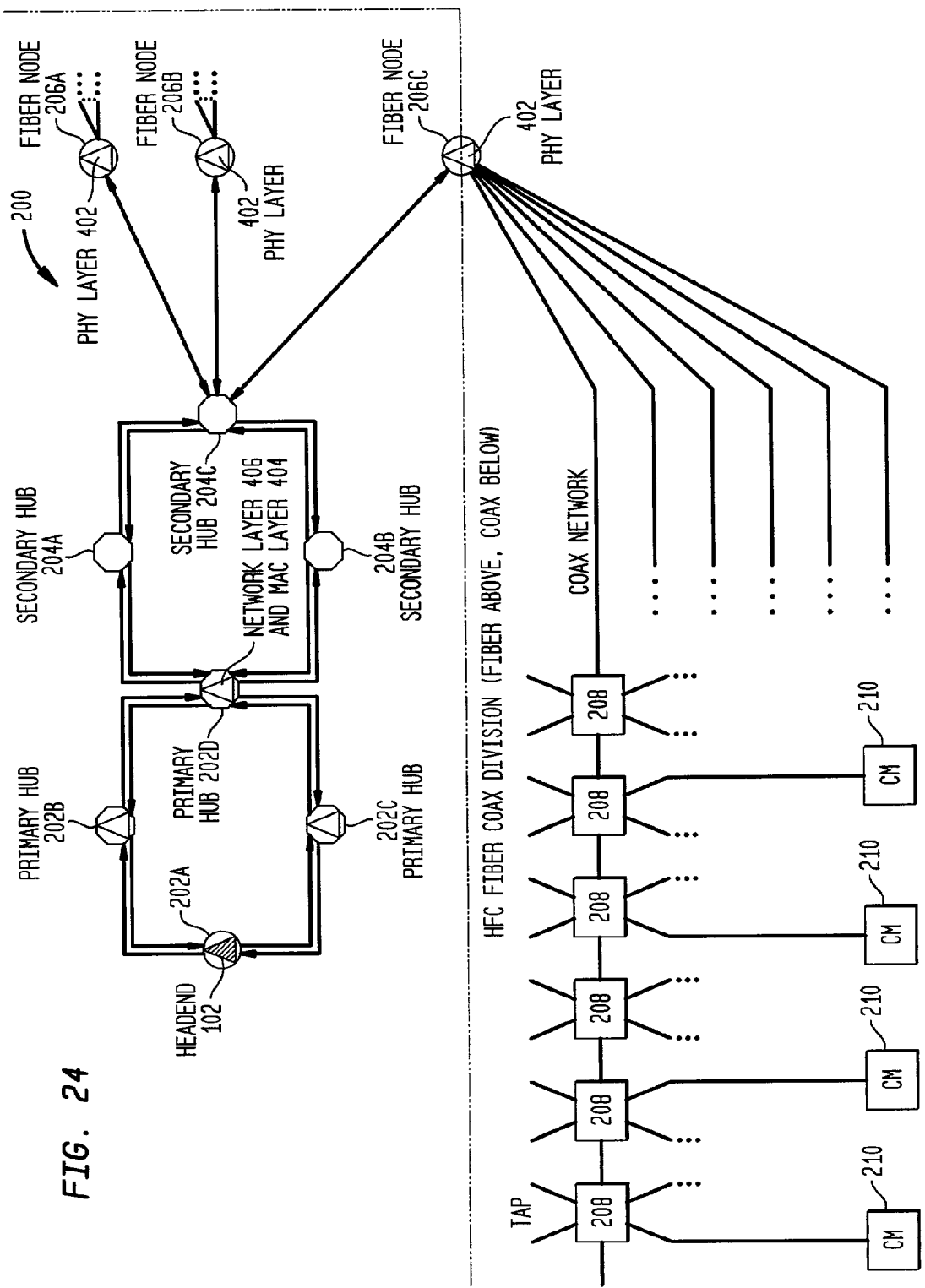
Figure 25:
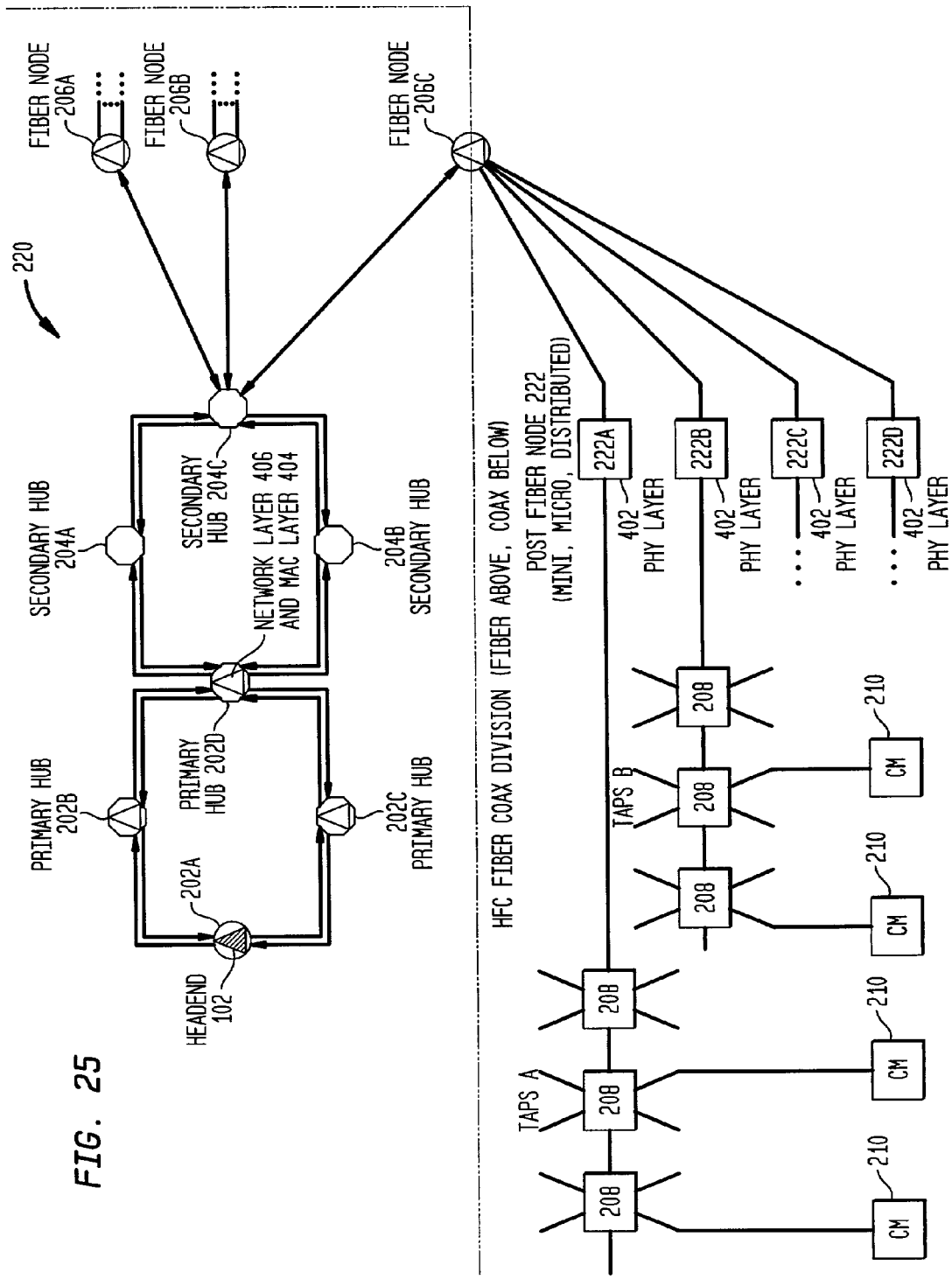

FIGS. 23-25 illustrate distributed CMTS configurations in which network and MAC layers 406 and 404, respectively, reside in primary hub 202D and PHY layer 402 is distributed across the fiber portion of hybrid fiber/coaxial systems 200 and 220. In FIG. 23, PHY layer 402 resides in secondary hub 204C. In this configuration of distributed CMTS 400, one network layer 406, one MAC layer 404, and one PHY layer 402 are used. With this embodiment, PHY layer 402 services all cable modems 210 attached to each of fiber nodes 206A-C in system 200, but lessens the analog noise level by enabling digital transmissions in the upstream to occur at an earlier time within the network. Thus, in the upstream, RF signals are transmitted from cable modems 210 to fiber nodes 206, optical signals are transmitted from fiber nodes 206 to secondary hub 204C, and digital signals are transmitted thereafter.

In FIG. 24, PHY layer 402 resides in each of fiber nodes 206. In this configuration of distributed CMTS 400, a PHY layer 402 is needed for each fiber node 206 in HFC system 200. This configuration requires one network layer 406, one MAC layer 404, and a PHY layer 402 for each fiber node in the system. As the number of PHY layers 402 increases, each PHY layer 402 supports fewer cable modems 210, causing the system bandwidth to increase and the analog noise level to decrease. For example, each PHY layer 402 shown in FIG. 24 services cable modems 210 attached to one of fiber nodes 206A, 206B, or 206C. Digital transmissions now begin at fiber nodes 206. In the upstream, RF signals are transmitted from cable modems 210 to fiber nodes 206 and digital signals are transmitted thereafter.

In FIG. 25, PHY layer 402 resides in post fiber nodes 222. In this configuration of distributed CMTS 400, a PHY layer 402 is needed for each post fiber node 222 that connects to fiber nodes 206A-C. This configuration requires one network layer 406, one MAC layer 404, and a plurality of PHY layers 402, one for each post fiber node 222 in the system. The configuration shown in FIG. 25 moves PHY layers 402 closer to cable modems 210, thereby enabling each PHY layer 402 to support fewer cable modems 210. For example, each PHY layer 402 shown in FIG. 25 services cable modems 210 attached to one of post fiber nodes 222A, 222B, 222C or 222D. This also causes the system bandwidth to increase. In the upstream, digital transmission begins at post fiber nodes 222, thereby decreasing any analog noise resulting from interference sources in the coaxial cables. RF signals are transmitted from cable modems 210 to post fiber nodes 222 and digital signals are transmitted thereafter.

Figure 26:
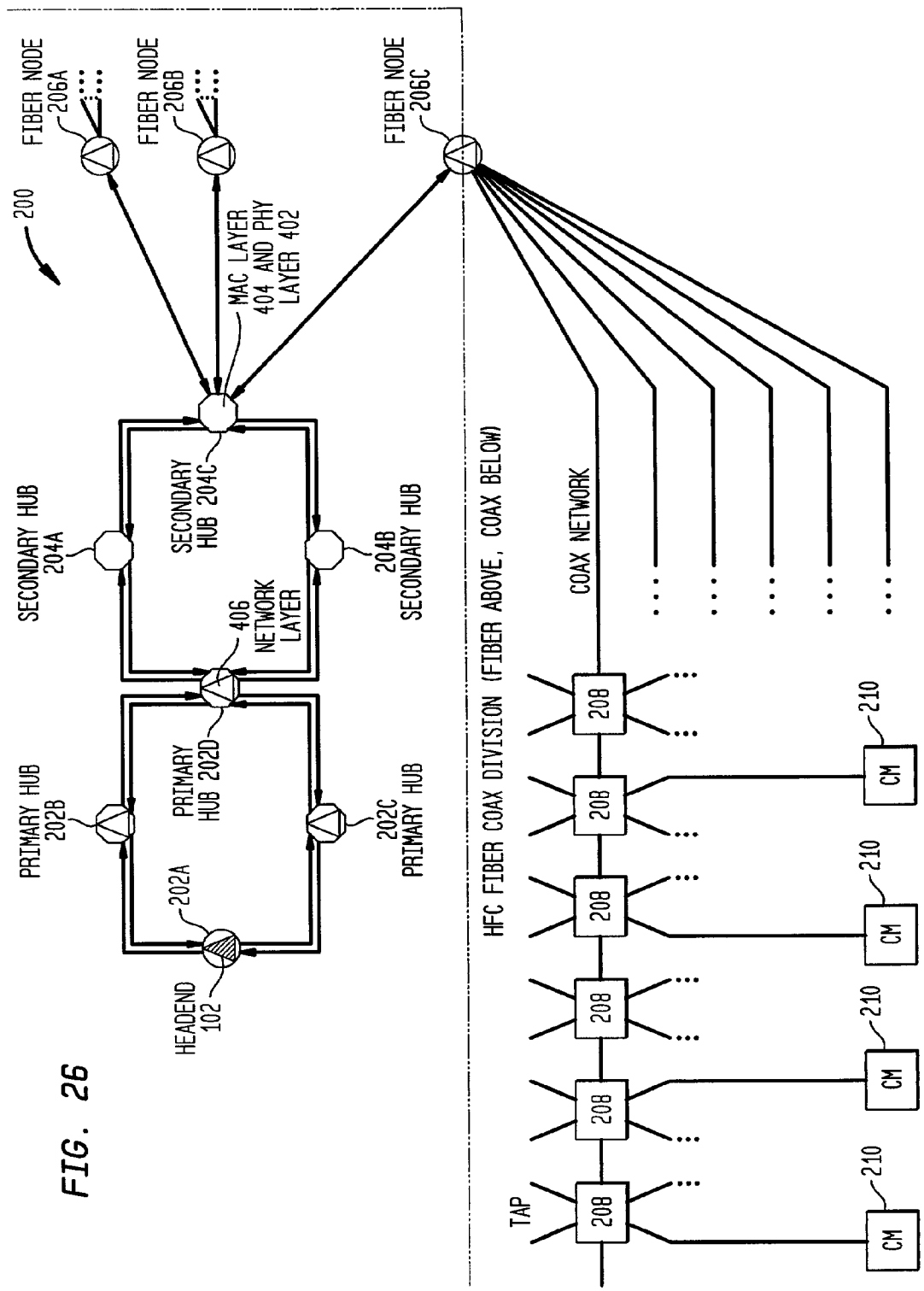
Figure 27:
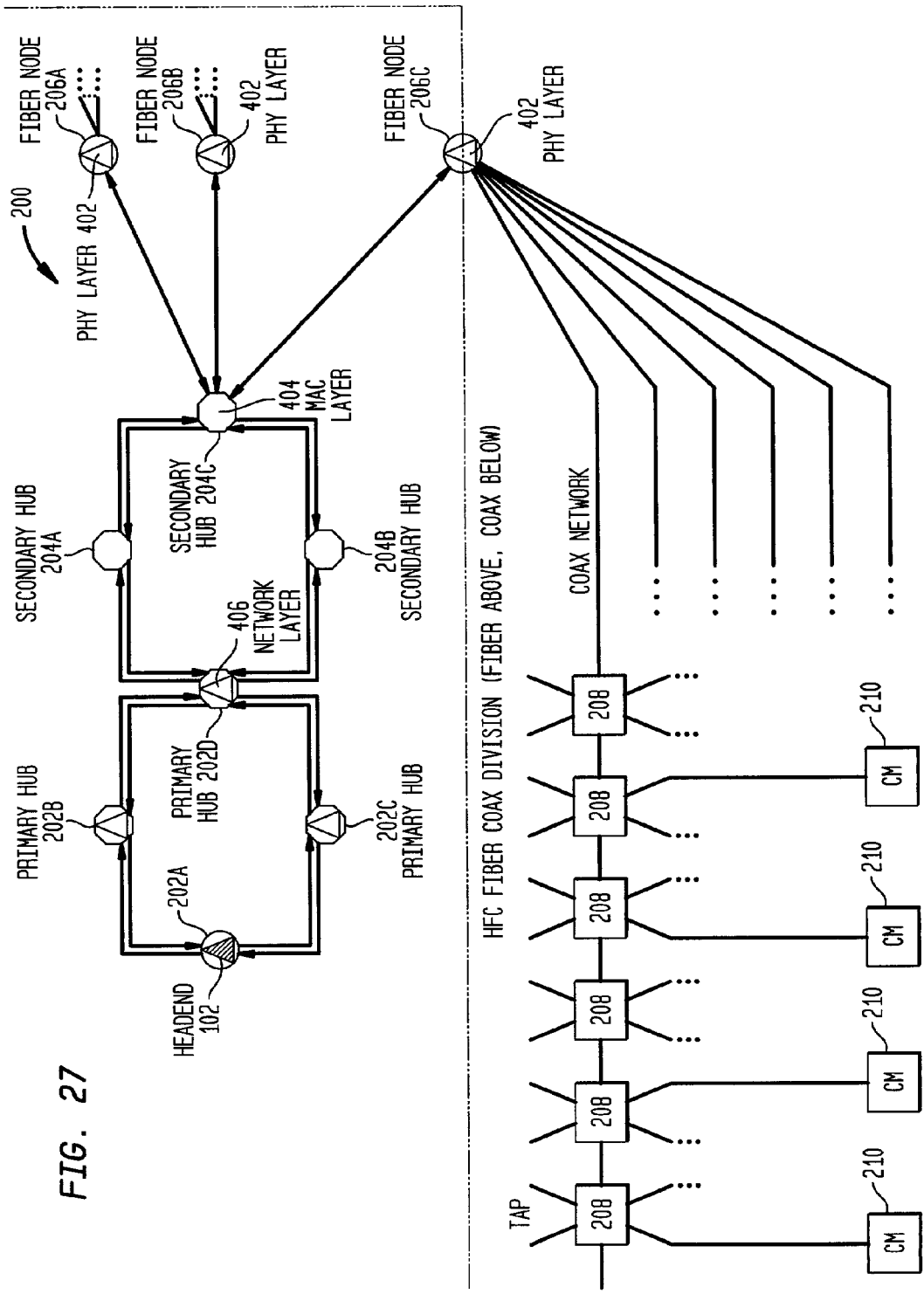
Figure 28:
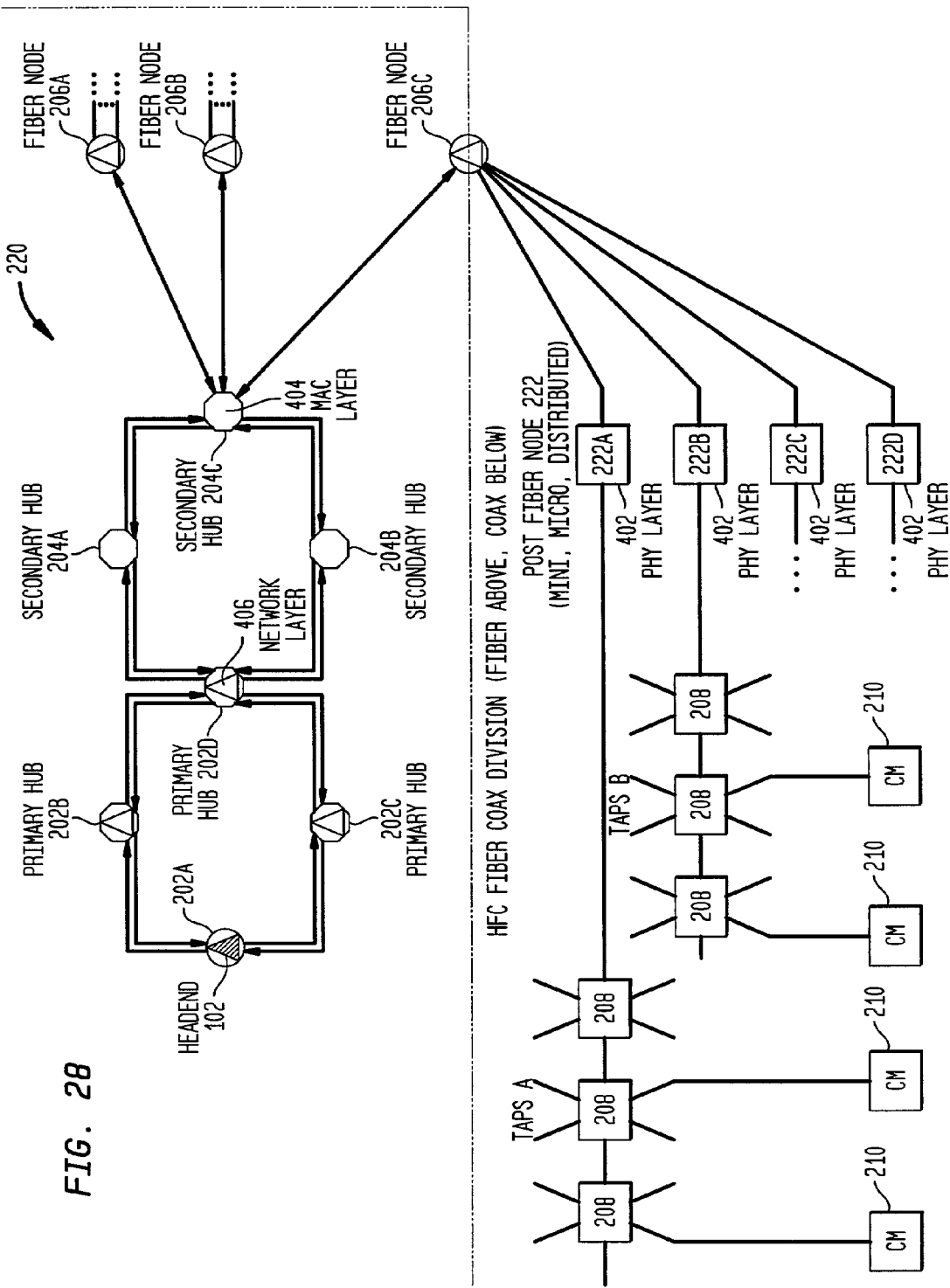

FIGS. 26-28, illustrate distributed CMTS configurations in which network layer 406 resides in primary hub 202D, MAC layer 404 resides in secondary hub 204C, and PHY layer 406 is distributed across the fiber portion of hybrid fiber/coaxial system 220. In FIG. 26, PHY layer 402 is placed in secondary hub 204C. This configuration of distributed CMTS 400 uses one network layer 406, one MAC layer 404, and one PHY layer 402. With this embodiment, PHY layer 402 services all cable modems 210 attached to fiber nodes 206A-C in system 200, but lessens the analog noise level by enabling digital transmissions in the upstream to occur at an earlier time within the network. Thus, in the upstream, RF signals are transmitted from cable modems 210 to fiber nodes 206, optical signals are transmitted from fiber nodes 206 to secondary hub 204C, and digital signals are transmitted thereafter.

In FIG. 27, PHY layer 402 is located in each of fiber nodes 206. In this configuration of distributed CMTS 400, a PHY layer 402 is needed for each fiber node 206 in HFC system 200. This configuration requires one network layer 406, one MAC layer 404, and a PHY layer 402 for each fiber node in the system. As the number of PHY layers 402 increases, each PHY layer 402 supports fewer cable modems 210, causing the system bandwidth to increase and the analog noise level to decrease. For example, each PHY layer 402 shown in FIG. 27 services cable modems 210 attached to one of fiber nodes 206A, 206B, or 206C. Digital transmissions now begin at fiber nodes 206. In the upstream, RF signals are transmitted from cable modems 210 to fiber nodes 206 and digital signals are transmitted thereafter.

In FIG. 28, a PHY layer 402 is placed in each post fiber node 222. In this configuration of distributed CMTS 400, a PHY layer 402 is needed for each post fiber node 222 that connects to fiber nodes 206A-C. This configuration requires one network layer 406, one MAC layer 404, and a plurality of PHY layers 402, one for each post fiber node 222 in the system. The configuration shown in FIG. 25 moves PHY layers 402 closer to cable modems 210, thereby enabling each PHY layer 402 to support fewer cable modems 210. For example, each PHY layer 402 shown in FIG. 28 services cable modems 210 attached to one of post fiber nodes 222A, 222B, 222C or 222D. This also causes the system bandwidth to increase. In the upstream, digital transmission begins at post fiber nodes 222, thereby decreasing any analog noise resulting from interference sources in the coaxial cables. RF signals are transmitted from cable modems 210 to post fiber nodes 222 and digital signals are transmitted thereafter.

Figure 29:
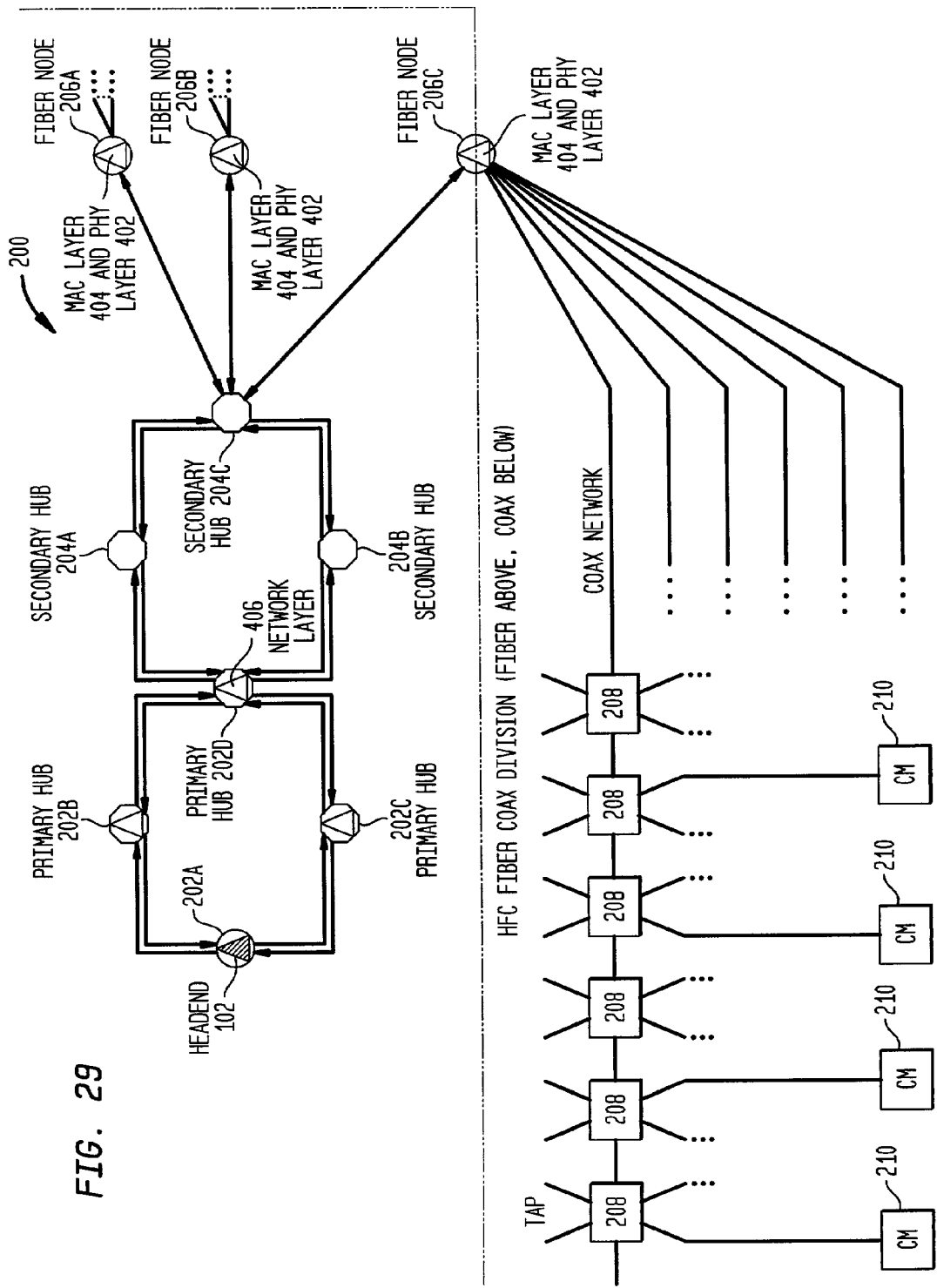
Figure 30:
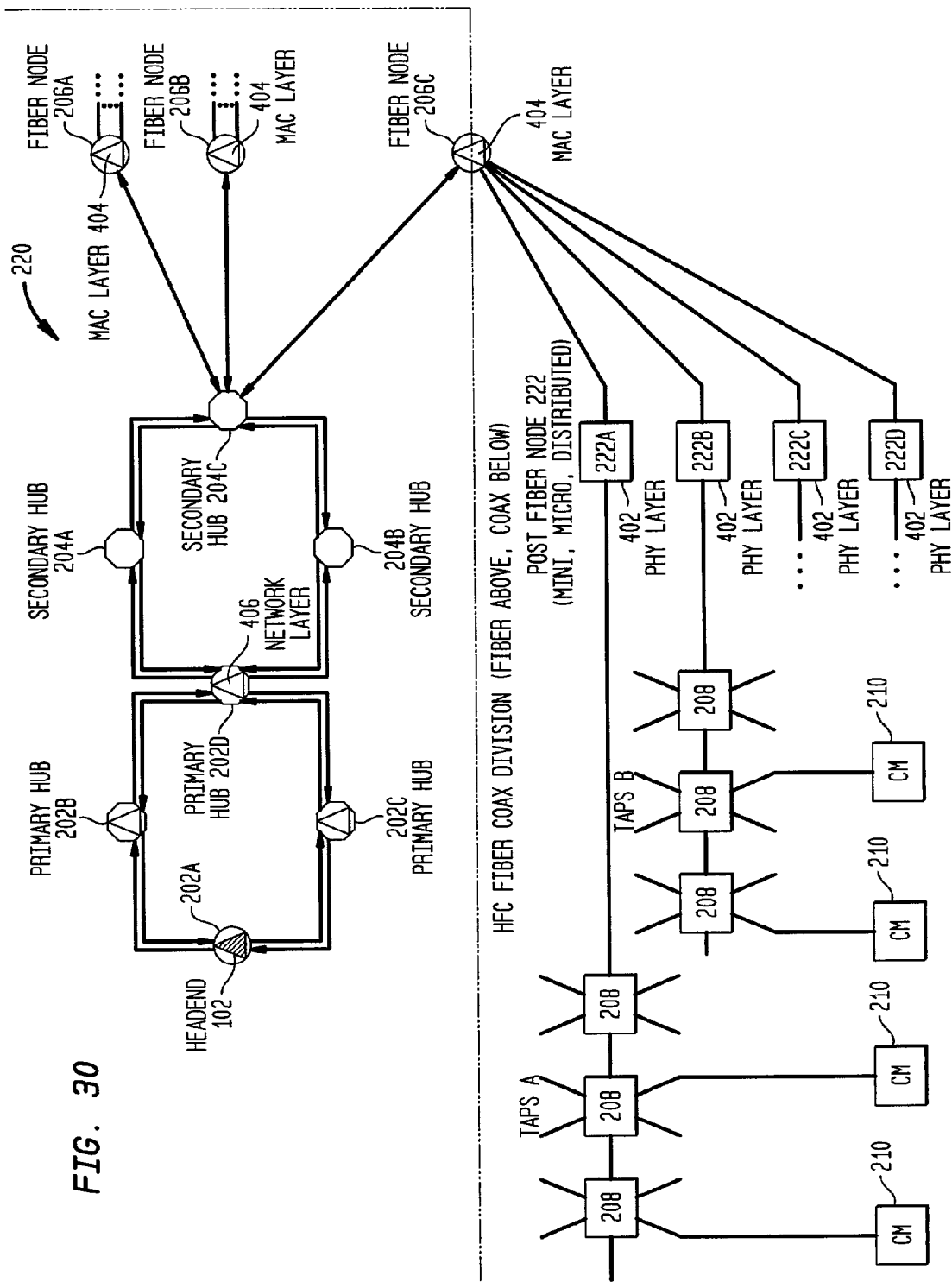

FIGS. 29-30 illustrate distributed CMTS configurations in which network layer 406 resides in primary hub 202D, MAC layer 404 resides in fiber nodes 206, and PHY layer 402 is distributed within the fiber portion of HFC system 220. In FIG. 29, PHY layer 402 is co-located with MAC layer 404 in fiber nodes 206. In this embodiment, one network layer 406 is implemented, and multiple MAC and PHY layers 404 and 402, respectively, are implemented, one MAC layer 404 and one PHY layer 402 for each fiber node 206. This configuration is utilized when one MAC layer 404 cannot adequately handle the number of PHY layers 402 required. Using a plurality of PHY layers 402 at fiber nodes 206 requires each PHY layer 402 to support fewer cable modems 210. For example, each PHY layer 402 shown in FIG. 29 services cable modems 210 attached to one of fiber nodes 206A, 206B, or 206C. This increases system bandwidth and decreases analog noise levels. Digital transmissions in the upstream now begin at fiber nodes 206. This configuration enables RF signals to be transmitted from cable modems 210 to fiber nodes 206 and digital signals to be transmitted therefrom.

In FIG. 30, PHY layer 402 is placed in each post fiber node 222. In this embodiment, one network layer 406 is implemented and multiple MAC and PHY layers 404 and 402, respectively, are implemented. A MAC layer 404 is placed in each fiber node 206 and a PHY layer 402 is placed in each post fiber node 222. In this embodiment, a single MAC layer would be unable to handle the requirements of the required number of PHY layers. Therefore, MAC layers 404 are placed at each fiber node 206 to handle the number of PHY layers 402 placed at each post fiber node 222. This configuration moves PHY layers 402 closer to cable modems 210, thereby enabling each PHY layer 402 to support fewer cable modems 210. For example, each PHY layer 402 shown in FIG. 30 services cable modems 210 attached to one of post fiber nodes 222A, 222B, 222C or 222D. This implementation causes the system bandwidth to increase. Digital transmission in the upstream begins at post fiber node 222, thereby decreasing any analog noise signals resulting from interference sources in the coaxial cables. RF signals are transmitted from cable modems 210 to post fiber nodes 222 and digital signals are transmitted therefrom.

Figure 31:
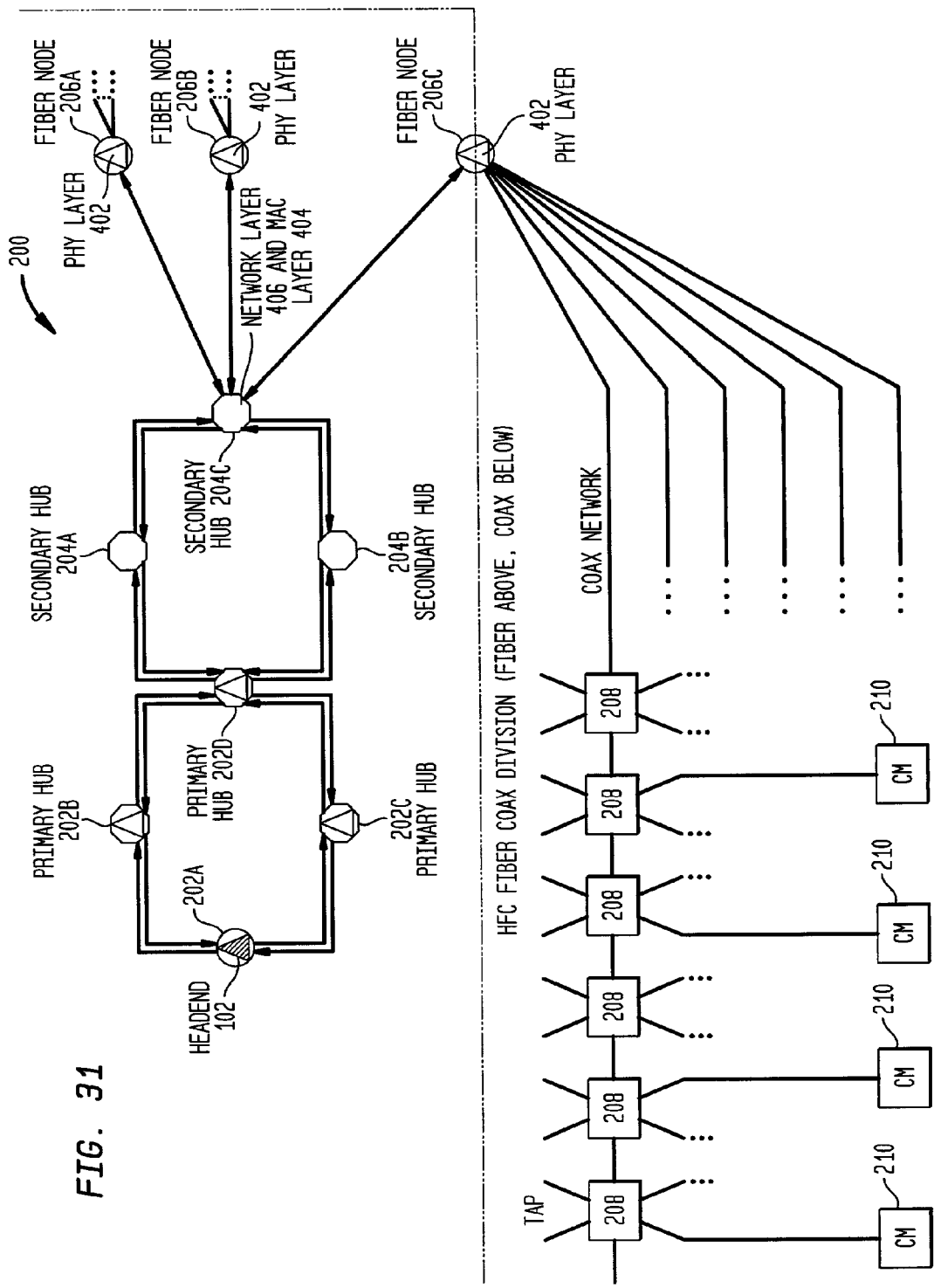
Figure 32:
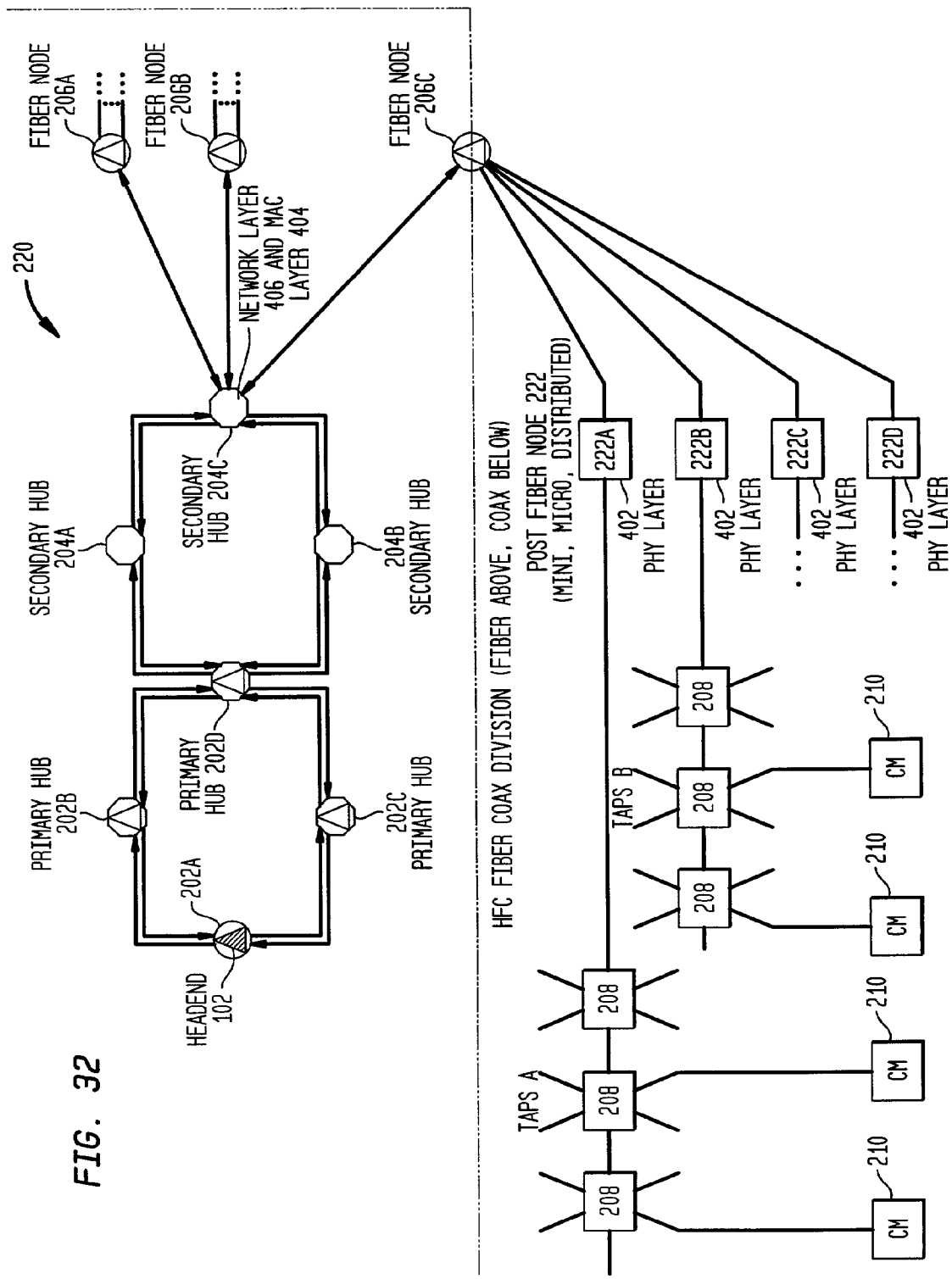

FIGS. 31-32 illustrate distributed CMTS configurations in which network and MAC layers 406 and 404, respectively, reside in secondary hub 204C and PHY layer 402 is distributed further into the fiber portion of HFC system 220. In FIG. 31, a PHY layer is placed in each of fiber nodes 206. In this configuration of distributed CMTS 400, a PHY layer 402 is needed for each fiber node 206 in HFC system 200. This configuration requires one network layer 406, one MAC layer 404, and a PHY layer 402 for each fiber node in the system. As the number of PHY layers 402 increases, each PHY layer 402 supports fewer cable modems 210, causing the system bandwidth to increase. For example, each PHY layer 402 shown in FIG. 31 services cable modems 210 attached to one of fiber nodes 206A, 206B, or 206C. Digital transmissions now begin at fiber nodes 206, causing the analog noise level to decrease. In the upstream, RF signals are transmitted from cable modems 210 to fiber nodes 206 and digital signals are transmitted thereafter.

In FIG. 32, a PHY layer is placed in each of post fiber nodes 222. In this configuration of distributed CMTS 400, a PHY layer 402 is needed for each post fiber node 222 that connects to fiber nodes 206A-C. This configuration requires one network layer 406, one MAC layer 404, and a plurality of PHY layers 402, one for each post fiber node 222 in the system. The configuration shown in FIG. 32 moves PHY layers 402 closer to cable modems 210, thereby enabling each PHY layer 402 to support fewer cable modems 210. For example, each PHY layer 402 shown in FIG. 32 services cable modems 210 attached to one of post fiber nodes 222A, 222B, 222C or 222D. This also causes the system bandwidth to increase. In the upstream, digital transmission begins at post fiber nodes 222, thereby decreasing any analog noise resulting from interference sources in the coaxial cables. RF signals are transmitted from cable modems 210 to post fiber nodes 222 and digital signals are transmitted thereafter.

Figure 33:
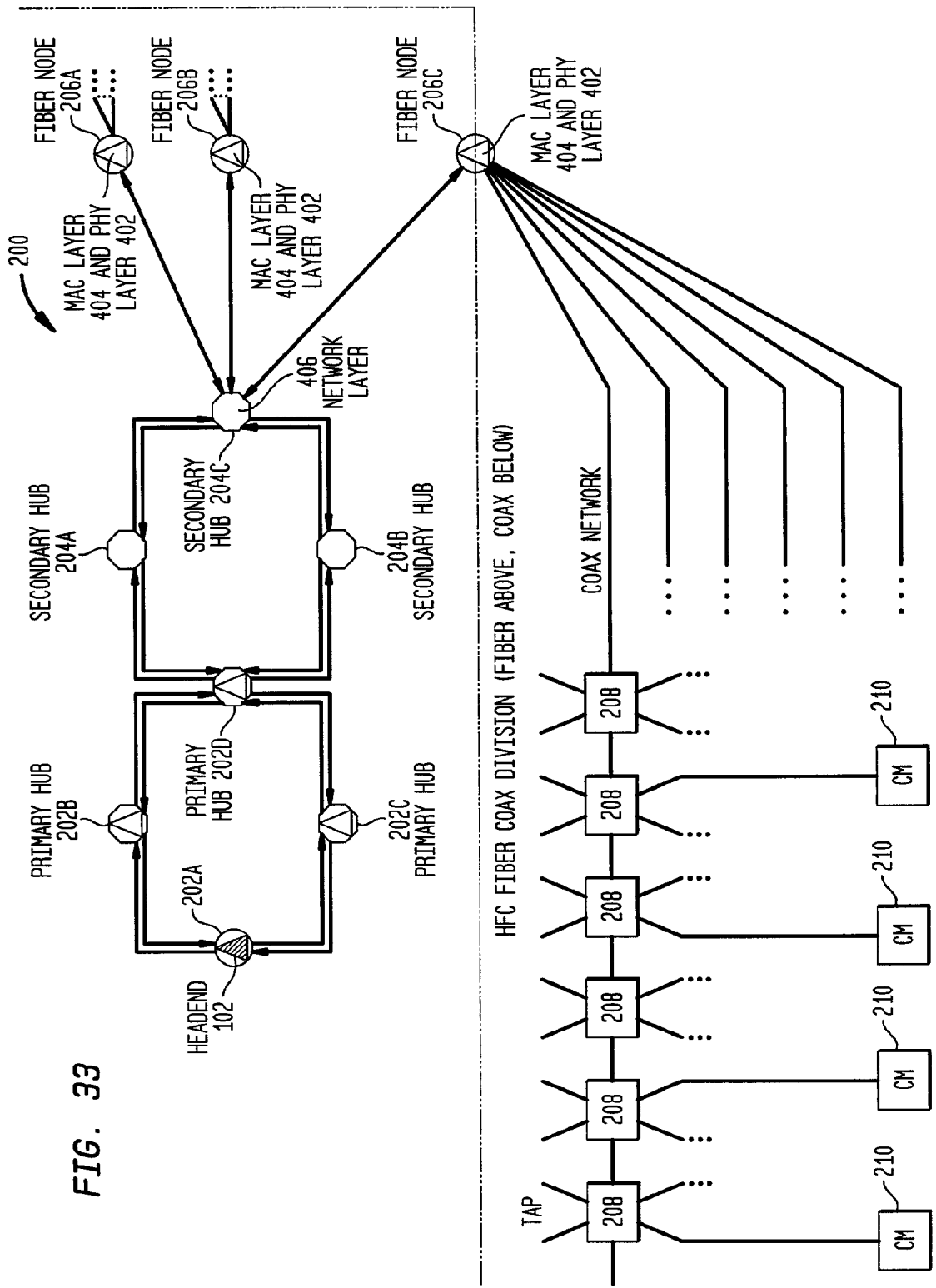
Figure 34:
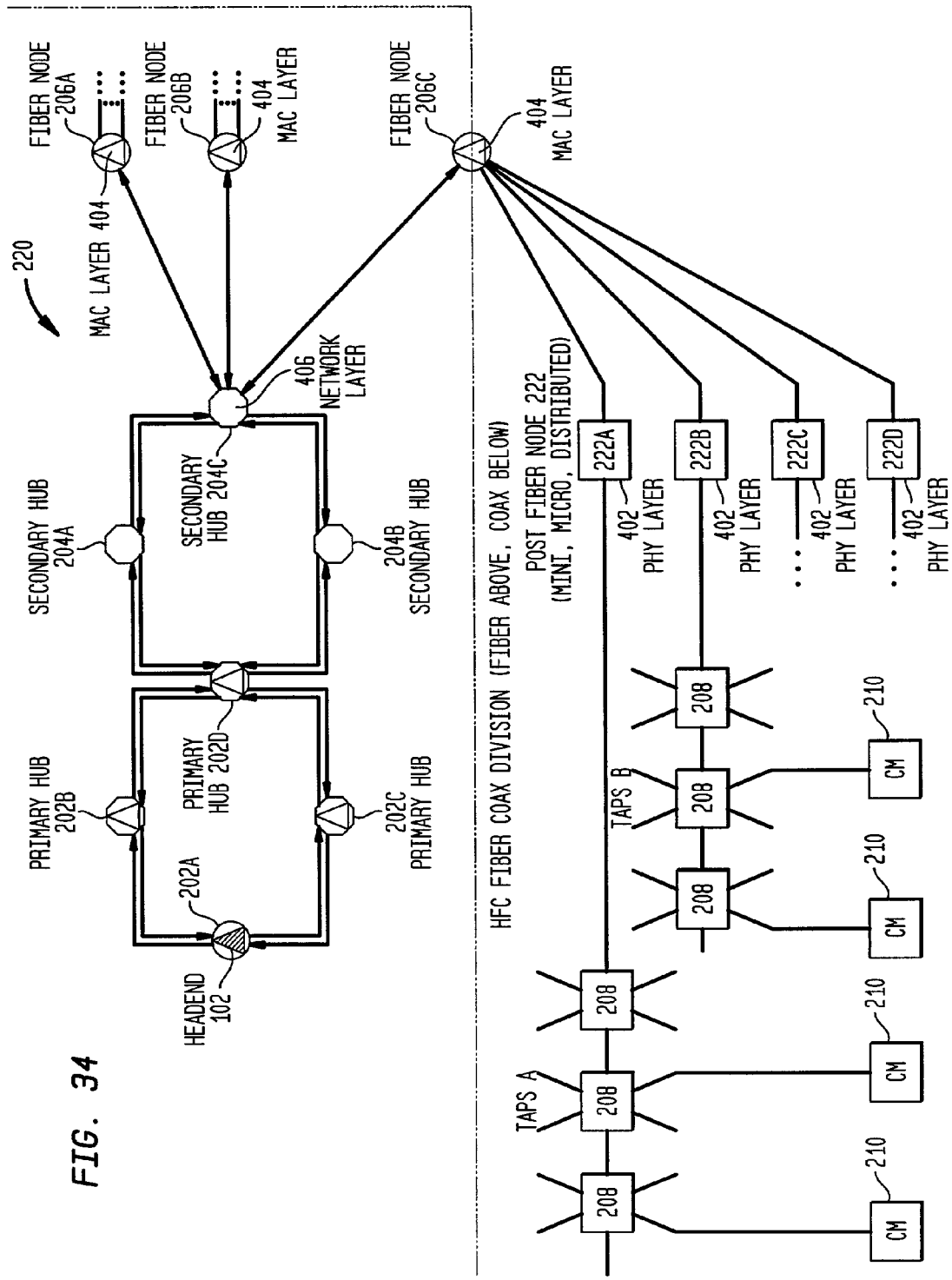

FIGS. 33 and 34 illustrate distributed CMTS configurations in which network layer 406 is placed in secondary hub 204C, MAC layer 404 is placed in fiber nodes 206, and PHY layer 402 is distributed among fiber nodes 206 or post fiber nodes 222. In FIG. 33, PHY layer 402 is co-located with MAC layer 404 in fiber nodes 206. In this embodiment, one network layer 406 is implemented, and multiple MAC and PHY layers, 404 and 402, respectively, are implemented, one MAC layer 404 and one PHY layer 402 for each fiber node 206. This configuration is utilized when one MAC layer 404 cannot adequately handle the number of PHY layers 402 required. Using a plurality of PHY layers 402 at fiber nodes 206 requires each PHY layer 402 to support fewer cable modems 210. For example, each PHY layer 402 shown in FIG. 33 services cable modems 210 attached to one of fiber nodes 206A, 206B, or 206C. This increases system bandwidth and decreases analog noise levels. Digital transmissions in the upstream now begin at fiber nodes 206. This configuration enables RF signals to be transmitted from cable modems 210 to fiber nodes 206 and digital signals to be transmitted therefrom.

In FIG. 34, a PHY layer 402 is placed in each of post fiber nodes 222. In this embodiment, one network layer 406 is implemented and multiple MAC and PHY layers 404 and 402, respectively, are implemented. A MAC layer 404 is placed in each fiber node 206 and a PHY layer 402 is placed in each post fiber node 222. In this embodiment, a single MAC layer would be unable to handle the requirements of the required number of PHY layers. Therefore, MAC layers 404 are placed at each fiber node 206 to handle the number of PHY layers 402 placed at each post fiber node 222. This configuration moves PHY layers 402 closer to cable modems 210, thereby enabling each PHY layer 402 to support fewer cable modems 210. For example, each PHY layer 402 shown in FIG. 34 services cable modems 210 attached to one of post fiber nodes 222A, 222B, 222C or 222D. This implementation causes the system bandwidth to increase. Digital transmission in the upstream begins at post fiber node 222, thereby decreasing any analog noise signals resulting from interference sources in the coaxial cables. RF signals are transmitted from cable modems 210 to post fiber nodes 222 and digital signals are transmitted therefrom.

Figure 35:
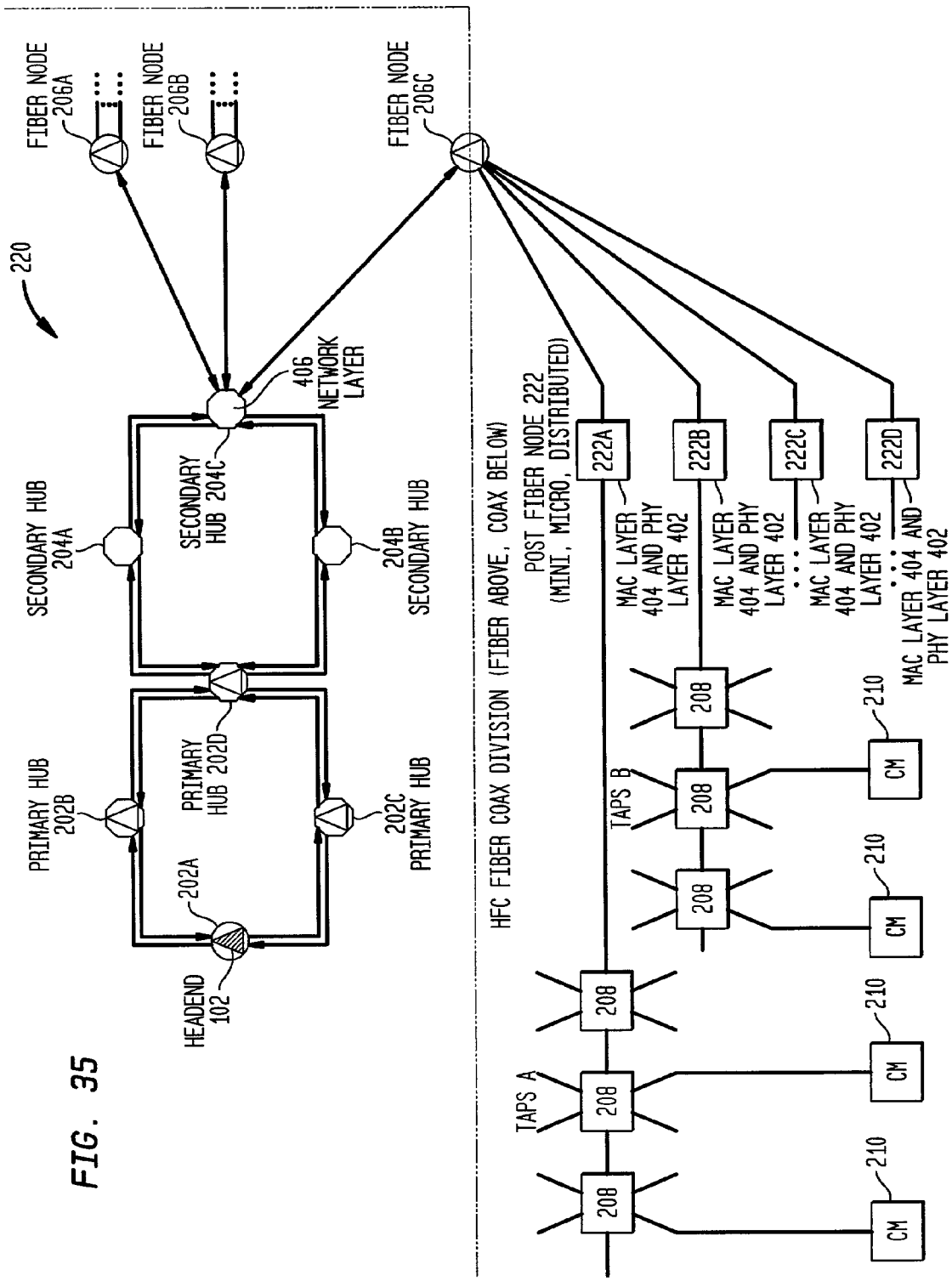

FIG. 35 illustrates a distributed CMTS configuration in which network layer 406 is placed in secondary hub 204C and a MAC and a PHY layer 404 and 402, respectively, are placed in each of post fiber nodes 222. Thus, one MAC layer 404 and one PHY layer 402 are needed for each post fiber node 222. In this embodiment, a single MAC layer would be unable to handle the requirements of the required number of PHY layers. Therefore, MAC layers 404 are placed at each post fiber node 222 to handle each PHY layer 402 placed at each post fiber node 222. This configuration moves PHY layers 402 closer to cable modems 210, thereby enabling each PHY layer 402 to support fewer cable modems 210. For example, each PHY layer 402 shown in FIG. 35 services cable modems 210 attached to one of post fiber nodes 222A, 222B, 222C or 222D. This implementation causes the system bandwidth to increase. Digital transmission in the upstream begins at post fiber node 222, thereby decreasing any analog noise signals resulting from interference sources in the coaxial cables. RF signals are transmitted from cable modems 210 to post fiber nodes 222 and digital signals are transmitted therefrom.

FIGS. 36-39 illustrate configurations of distributed CMTS 400 that require multiple layers of each module of distributed CMTS 400. Although these configurations provide large amounts of additional bandwidth to service the attached cable modems 210 as well as provide reductions in noise, the cost of equipment needed to service the cable modems 210 is expensive.

Figure 36:
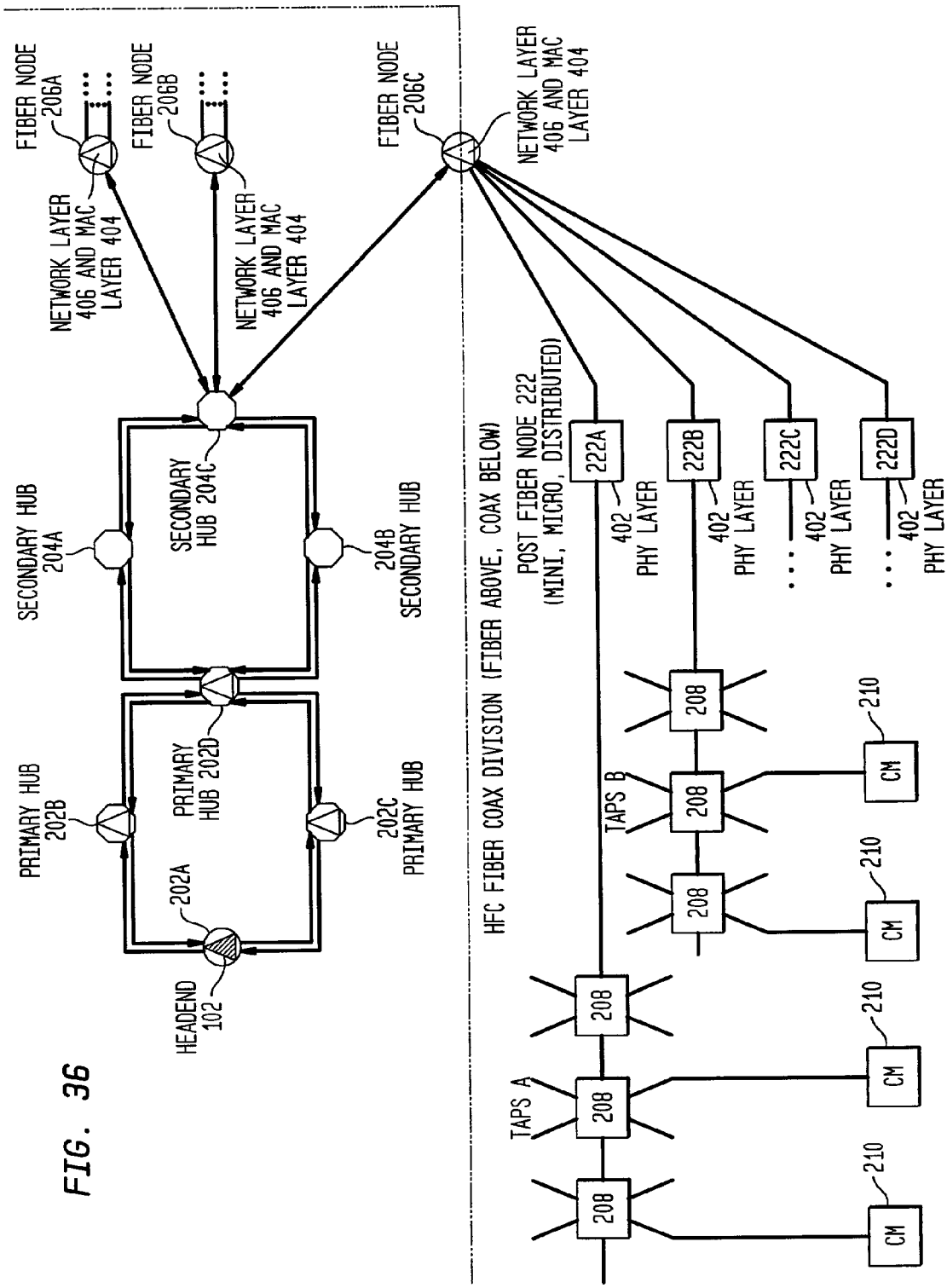

FIG. 36 requires network layer 406 and MAC layer 404 to reside in each fiber node 206 and PHY layer 402 to reside in each post fiber node 222. Thus, one network layer 406 and one MAC layer 404 are required by each of fiber nodes 206A-C and one PHY layer 402 is required for each of post fiber nodes 222A-D. In this embodiment, a single MAC layer would be unable to handle the requirements of the required number of PHY layers. Therefore, MAC layers 404 are placed at each fiber node 206A-C to handle each PHY layer 402 placed at each post fiber node 222. This configuration moves PHY layers 402 closer to cable modems 210, thereby enabling each PHY layer 402 to support fewer cable modems 210. For example, each PHY layer 402 shown in FIG. 36 services cable modems 210 attached to one of post fiber nodes 222A, 222B, 222C or 222D. This implementation causes the system bandwidth to increase. Digital transmission in the upstream begins at post fiber node 222, thereby decreasing any analog noise signals resulting from interference sources in the coaxial cables. RF signals are transmitted from cable modems 210 to post fiber nodes 222 and digital signals are transmitted therefrom.

Figure 37:
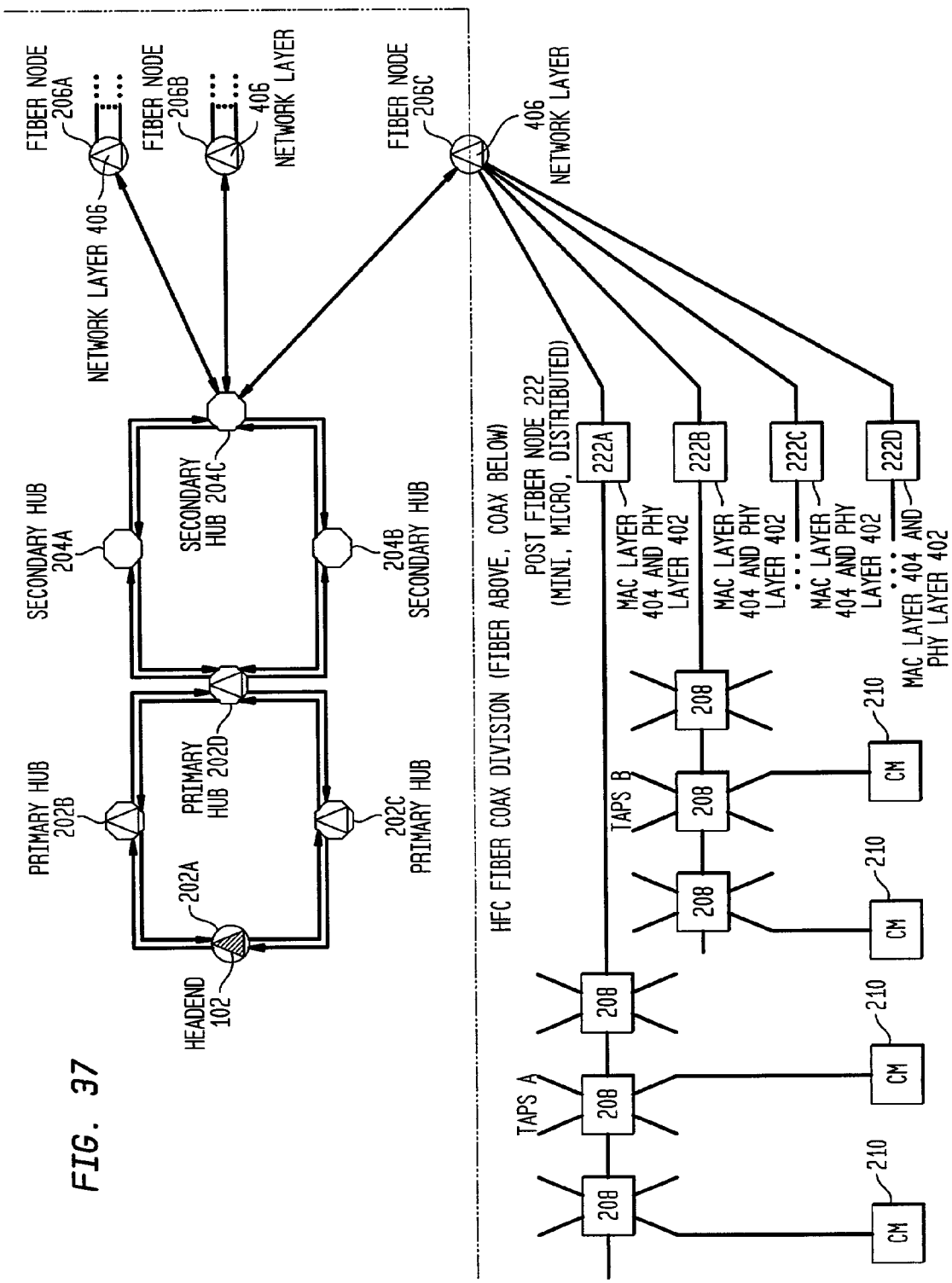

FIG. 37 requires network layer 406 to reside in each fiber node 206 and MAC layer 404 and PHY layer 402 to reside in each post fiber node 222. Thus one network layer 406 is placed in each of fiber nodes 206A-C and one MAC layer 404 and one PHY layer 402 are placed in each of post fiber nodes 222A-D. In this embodiment, a single MAC layer would be unable to handle the requirements of the required number of PHY layers. Therefore, MAC layers 404 are placed at each post fiber node 222 to handle each PHY layer 402 placed at each post fiber node 222. This configuration moves PHY layers 402 closer to cable modems 210, thereby enabling each PHY layer 402 to support fewer cable modems 210. For example, each PHY layer 402 shown in FIG. 37 services cable modems 210 attached to one of post fiber nodes 222A, 222B, 222C or 222D. This implementation causes the system bandwidth to increase. Digital transmission in the upstream begins at post fiber node 222, thereby decreasing any analog noise signals resulting from interference sources in the coaxial cables. RF signals are transmitted from cable modems 210 to post fiber nodes 222 and digital signals are transmitted therefrom.

Figure 38:
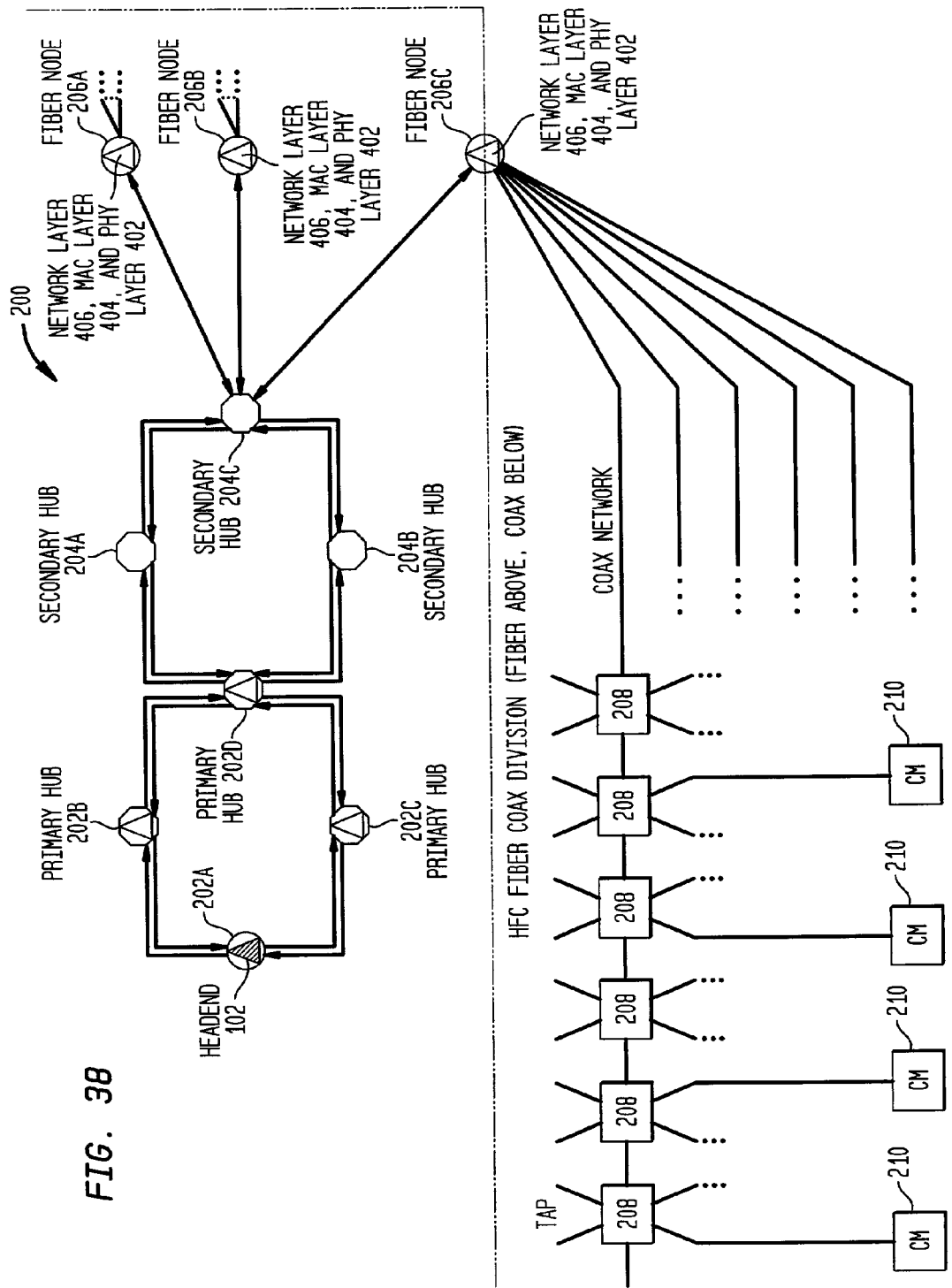

FIG. 38 illustrates a configuration of distributed CMTS 400 wherein distributed CMTS 400 resides solely in each of fiber nodes 206. Thus, one network layer 406, one MAC layer 404 and one PHY layer 402 are placed in each of fiber nodes 206. This configuration may be utilized when one MAC layer 404 cannot adequately handle the number of PHY layers 402 required. Using a plurality of PHY layers 402 at fiber nodes 206 requires each PHY layer 402 to support fewer cable modems 210. For example, each PHY layer 402 shown in FIG. 38 services cable modems 210 attached to one of fiber nodes 206A, 206B, or 206C. This increases system bandwidth and decreases analog noise levels, but at a high cost since multiple layers of each component of distributed CMTS are required. Digital transmissions in the upstream now begin at fiber nodes 206. This configuration enables RF signals to be transmitted from cable modems 210 to fiber nodes 206 and digital signals to be transmitted therefrom.

Figure 39:
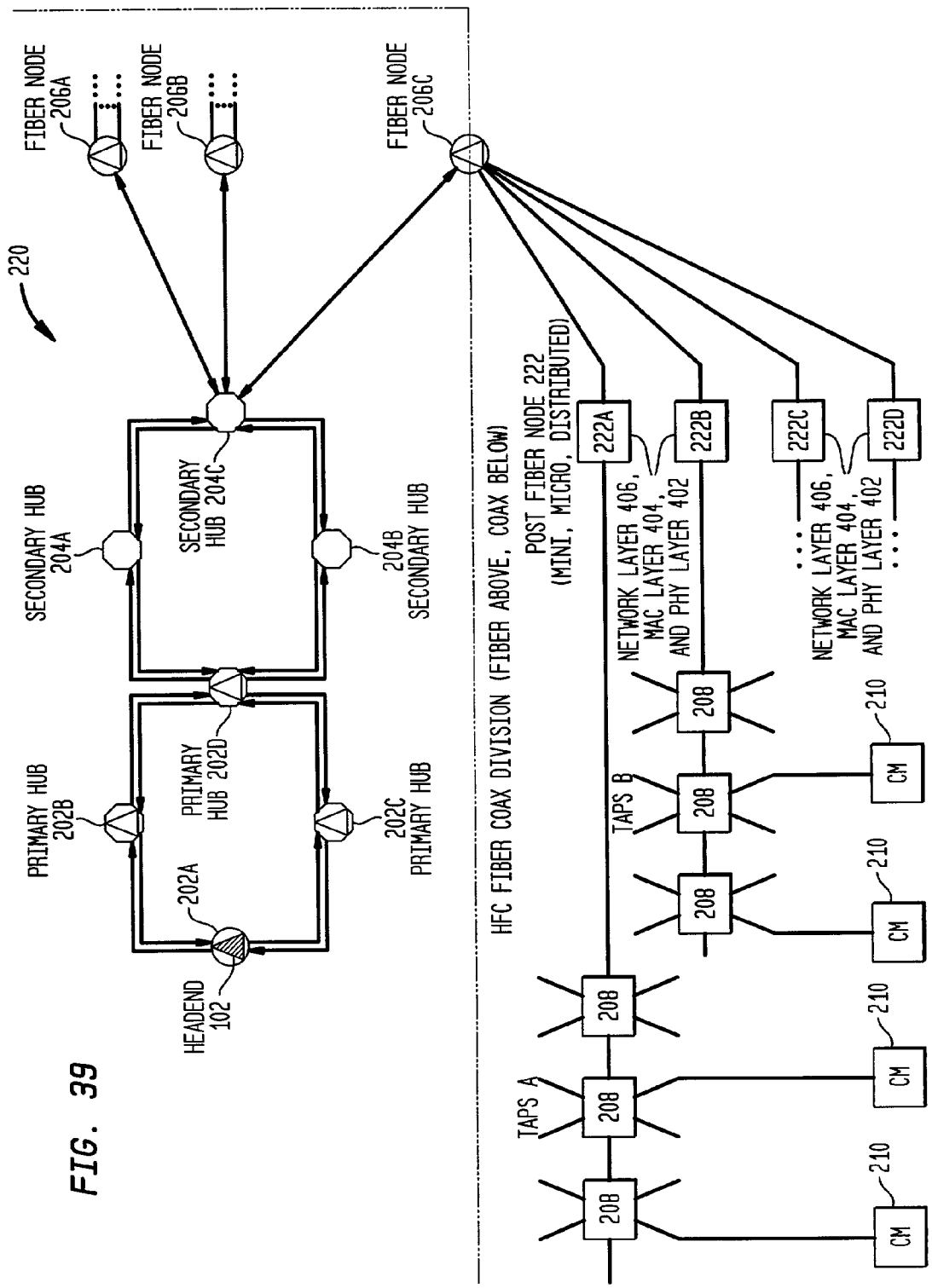

FIG. 39 illustrates a configuration of distributed CMTS 400 wherein distributed CMTS 400 resides solely in post fiber nodes 222. In this embodiment, each of layers 406, 404, and 402 reside in each post fiber node 222. Although this embodiment provides a large amount of additional bandwidth to service the attached cable modems, such an embodiment may be expensive since it requires a distributed CMTS 400 for each post fiber node 222. In this embodiment, a single MAC layer would be unable to handle the requirements of the required number of PHY layers. Therefore, MAC layers 404 are placed at each post fiber node 222 to handle each PHY layer 402 placed at each post fiber node 222. This configuration moves PHY layers 402 closer to cable modems 210, thereby enabling each PHY layer 402 to support fewer cable modems 210. For example, each PHY layer 402 shown in FIG. 39 services cable modems 210 attached to one of post fiber nodes 222A, 222B, 222C or 222D. This implementation causes the system bandwidth to increase. Digital transmission in the upstream begins at post fiber node 222, thereby decreasing any analog noise signals resulting from interference sources in the coaxial cables. RF signals are transmitted from cable modems 210 to post fiber nodes 222 and digital signals are transmitted therefrom.

A MiniMAC in a Distributed CMTS

Figure 40:
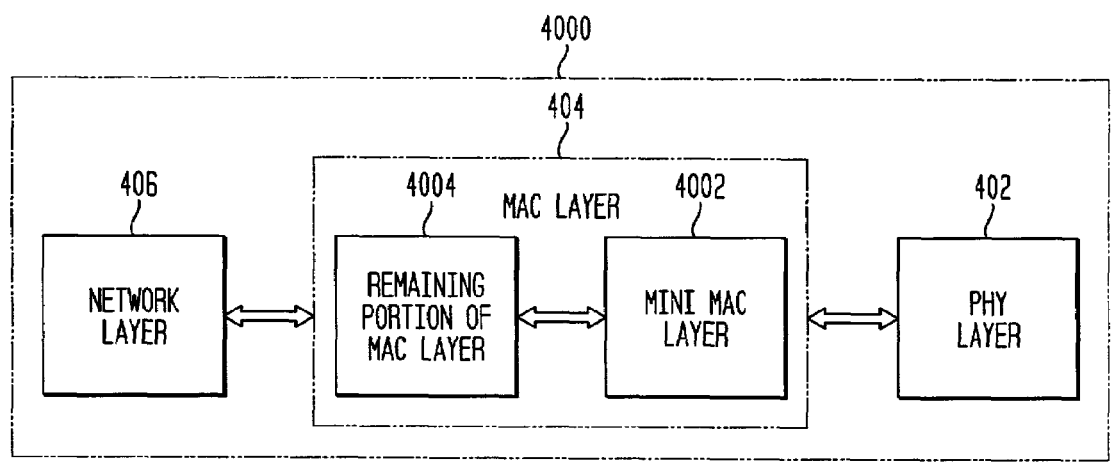
FIG. 40 is a block diagram illustrating another embodiment of a distributed CMTS.

FIG. 40 is a block diagram illustrating an alternative embodiment of a distributed CMTS 4000. Distributed CMTS 4000 comprises PHY layer 402, MAC layer 404 and network layer 406. MAC layer 404 is split into two parts. The first part, referred to as a miniMAC layer 4002, contains the minimum amount of circuitry required to convert digital bit streams into packets and vice versa. This includes the PHY layer interfaces and the circuitry required to maintain the timing of these interfaces. The second part of MAC layer 404 is contained in a remaining portion of MAC layer 4004. PHY layer 402 is coupled to miniMAC layer 4002. MiniMAC layer 4002 is coupled to remaining portion of MAC layer 4004, which is coupled to network layer 406. The combination of miniMAC layer 4002 and remaining portion of MAC layer 4004 are equivalent to MAC layer 404 (described in detail above).

MiniMAC layer 4002 may be remotely located from remaining portion of MAC layer 4004, yet remain physically connected to remaining portion of MAC layer 4004. MiniMAC layer 4002 may therefore be positioned in close proximity to PHY layer 402 in a distributed CMTS configuration. This enables PHY layer 402 to be placed away from headend 102 and deeper into the HFC plant without concern for timing delays that may arise in communications between PHY layer 402 and MAC layer 404 that may result when an entire MAC layer 404 is placed at a distance from PHY layer 402 in an HFC plant. After PHY layer 402 converts the RF signals from cable modems 210 into digital bits, miniMAC layer 4002 converts the bits into packets. Transmitting packets over fiber cables provides a more efficient transport system.

MiniMAC layer 4002 is small in size. In one embodiment, miniMAC layer is implemented as an integrated chip. In another embodiment, miniMAC layer may be implemented in a small black box. Power consumption of miniMAC layer 4002 is a great deal less than an entire MAC layer 4040. The reduced size and reduced power requirements for miniMAC layer 4002 enables its implementation in more locations throughout the HFC plant. By having the freedom to move miniMAC layer 4002 throughout the HFC plant, cable plant operators can place miniMAC layers 4002 to optimize system throughput.

Figure 41:
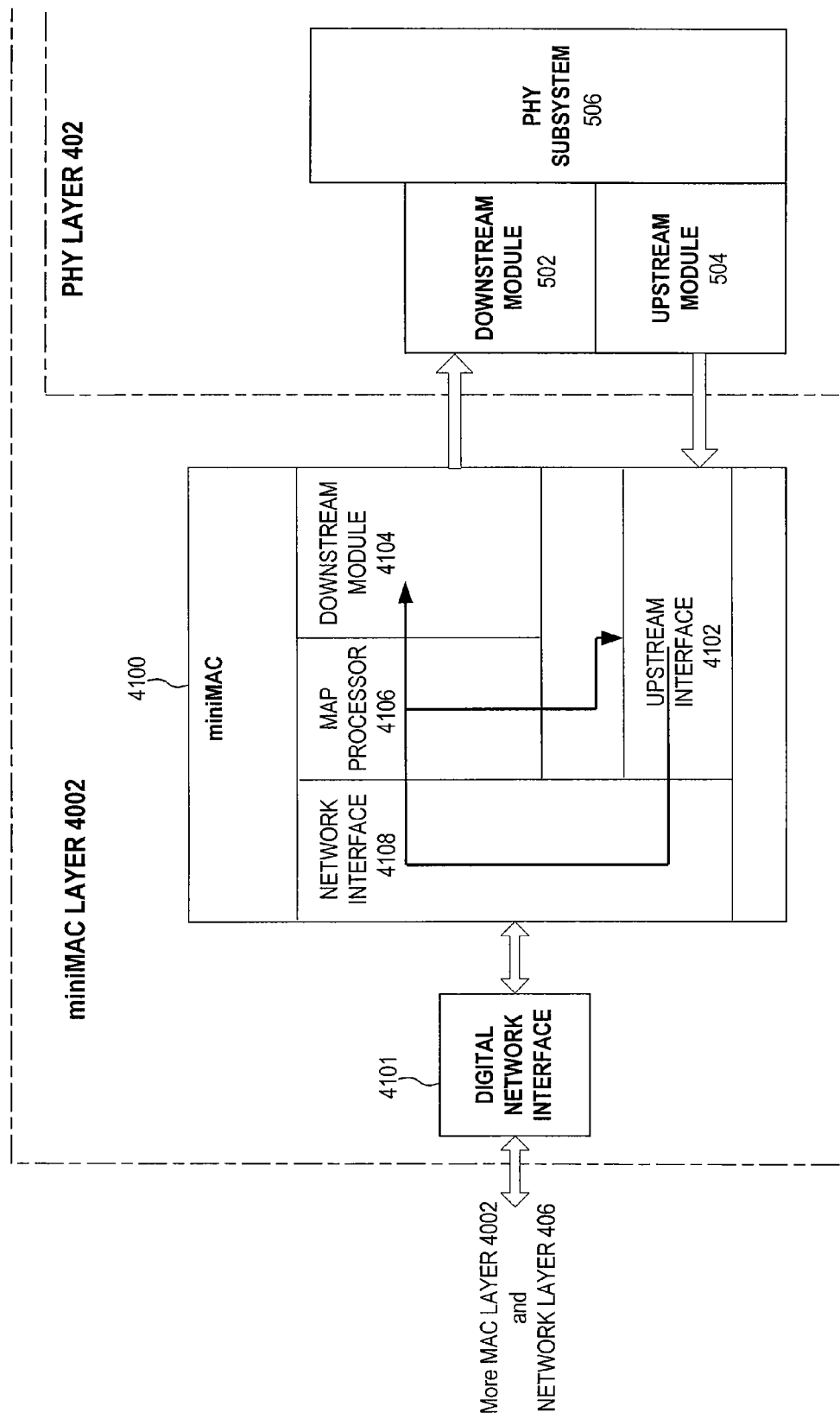
FIG. 41 is a block diagram illustrating an exemplary miniMAC according to an embodiment of the present invention.

FIG. 41 is a more detailed block diagram of miniMAC layer 4002. MiniMAC layer 4002 comprises a miniMAC 4100 coupled to a digital network interface 4101. MiniMAC 4100 comprises an upstream interface 4102, a downstream interface 4104, a map processor 4106, and a network interface 4108.

Upstream interface 4102 receives signals in the form of bits from upstream module 504 in PHY layer 402. In one embodiment, upstream interface 4102 may prioritize the signals based on source and/or service. Upstream interface 4102 performs error detection to ensure that the received bits are good data. Upstream interface 4102 then puts the bits into a buffer and sends the buffer to network interface 4108.

Network interface 4108 receives the buffered data and converts the buffer into a packet interface. In one embodiment, network interface 4108 may convert the buffer into one of a plurality of packet interfaces. Packet interfaces, such as, for example, an Ethernet or an ATM packet interface, are well known to those skilled in the relevant art(s). Other types of packet interfaces may also be used, such as proprietary packet interfaces. The packet then travels to digital network interface 4101.

Digital network interface 4101 converts the packet for acceptance by the network in which the packet is to be sent (such as packet switched network 112) and sends the packet to remaining portion of MAC layer 4004 for further processing.

Packets transmitted from remaining portion of MAC layer 4004 are received by digital network interface 4101 (after being processed by remaining portion of MAC layer 4004). Digital network interface 4101 will convert the packet to the packet interface used by network interface 4108. The converted packet is then sent to network interface 4108.

Network interface 4108 separates the packets. Some of the packets received by network interface 4108 are maps. Maps are a variable length MAC management messages that are transmitted by the CMTS to cable modems to define transmission opportunities for cable modems to transmit data on the upstream channel. In other words, maps are sent to cable modems 210 to instruct cable modems 210 when to transmit. The packets that are maps are sent to map processor 4106. Packets that are not maps are sent to downstream interface 4104.

Map processor 4106 receives the maps and saves a copy of the maps so that when bits are sent upstream to upstream interface 4102, miniMAC 4100 knows which cable modem 210 sent the data. Thus, the maps are communicated to upstream interface 4102. Map processor 4106 then sends the maps to downstream interface 4104.

Downstream interface 4104 receives packets from network interface 4108 and/or map processor 4106 and converts the packets to bits for transmission to downstream module 504 in PHY layer 402.

As previously stated, miniMAC layer 4002 enables PHY layer 402 to be placed away from a headend and closer to the cable modems in a HFC plant. This is accomplished by placing miniMAC layer(s) 4002 in close proximity to PHY layer(s) 402 as PHY layer(s) 402 are moved closer to cable modems.

Hybrid fiber/coaxial (HFC) systems may be arranged using a plurality of configurations. Thus, numerous embodiments of distributed CMTSs that include miniMAC layer 4002 architectures may exist for each configuration of a HFC system. Whether any given embodiment of a distributed CMTS having a miniMAC layer architecture will work with any given HFC system will depend on the configuration of the HFC system and the distance between various components of the HFC system. Various embodiments of distributed CMTS having a miniMAC layer architecture will now be described with reference to exemplary HFC systems 200 and 220 (described above with reference to FIGS. 2A and 2B). Although HFC systems 200 and 220 are used to provide a plurality of miniMAC implementations of distributed CMTS configurations, the miniMAC implementations of distributed CMTS configurations presented are not to be limited by HFC systems 200 and 220. One skilled in the relevant art(s) would know that other miniMAC implementations of distributed CMTS are possible depending on the configuration of the HFC system in which the miniMAC implementation of distributed CMTS is being placed.

Figure 42:
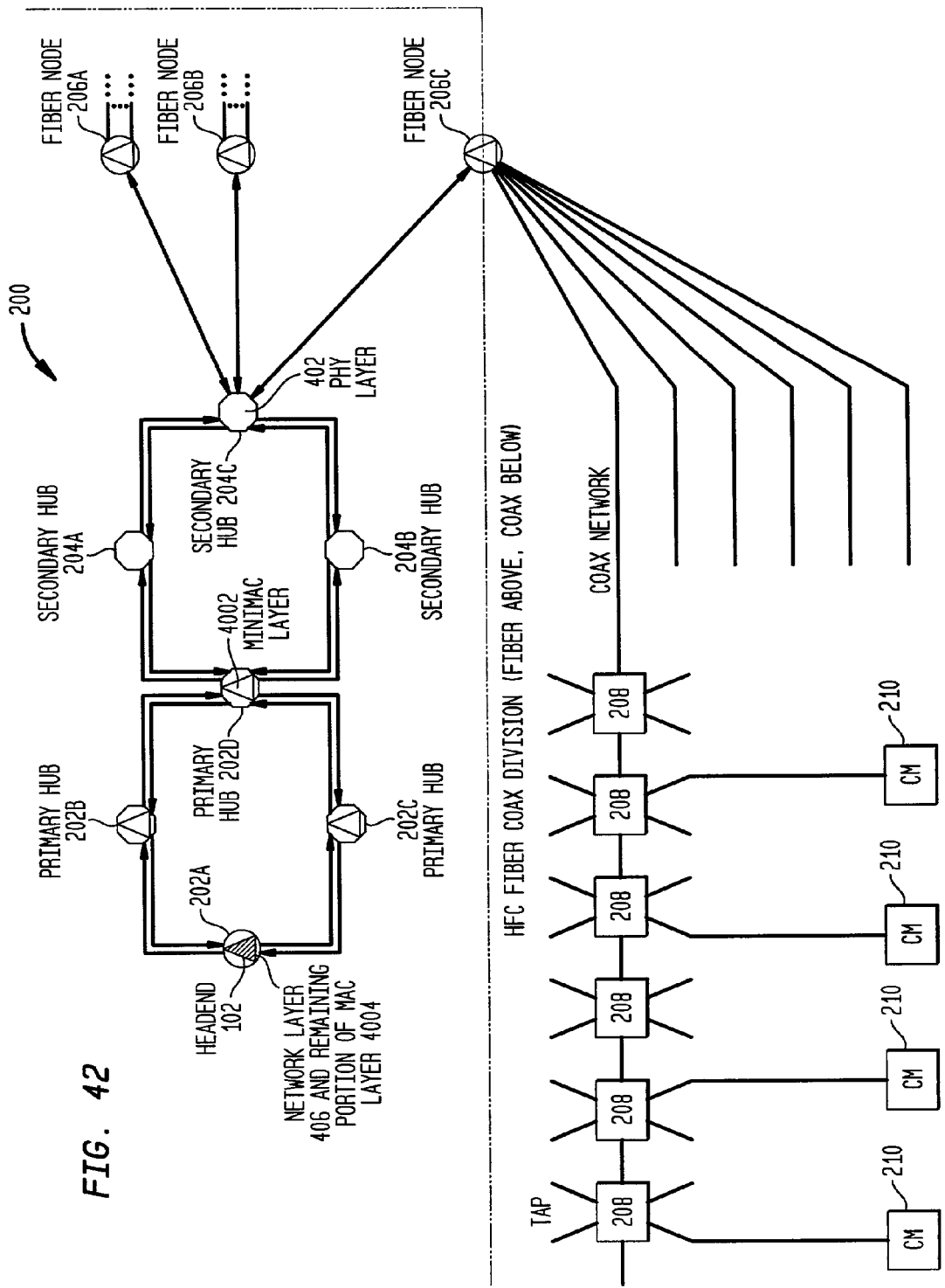
FIGS. 42-64 are block diagrams illustrating exemplary embodiments of miniMAC implementations of distributed CMTS configurations in a hybrid fiber/coaxial (HFC) plant.

FIGS. 42-47 illustrate miniMAC implementations of distributed CMTS configurations in which network layer 406 and the remaining portion of MAC layer 4004 reside in headend 102 and miniMAC layer 4002 and PHY layer 402 are distributed across portions of HFC systems 200 and 220. In FIG. 42, miniMAC layer 4002 is placed in primary hub 202D and PHY layer 402 is placed in secondary hub 204C. In this configuration of distributed CMTS 4000, one network layer 406, one remaining portion of MAC layer 404, one miniMAC layer 4002 and one PHY layer 402 are used. MiniMAC layer 4002 and PHY layer 402 are located in close proximity to each other to adhere to DOCSIS timing constraints. In this embodiment, upstream digital transmission begins at secondary hub 204C. With this embodiment, PHY layer 402 services all cable modems 210 attached to each of fiber nodes 206A-C in system 200, but lessens the analog noise level by enabling digital transmissions in the upstream to occur at an earlier time within the network. Thus, in the upstream, RF signals are transmitted from cable modems 210 to fiber nodes 206, optical signals are transmitted from fiber nodes 206 to secondary hub 204C, and digital signals are transmitted thereafter.

Figure 43:
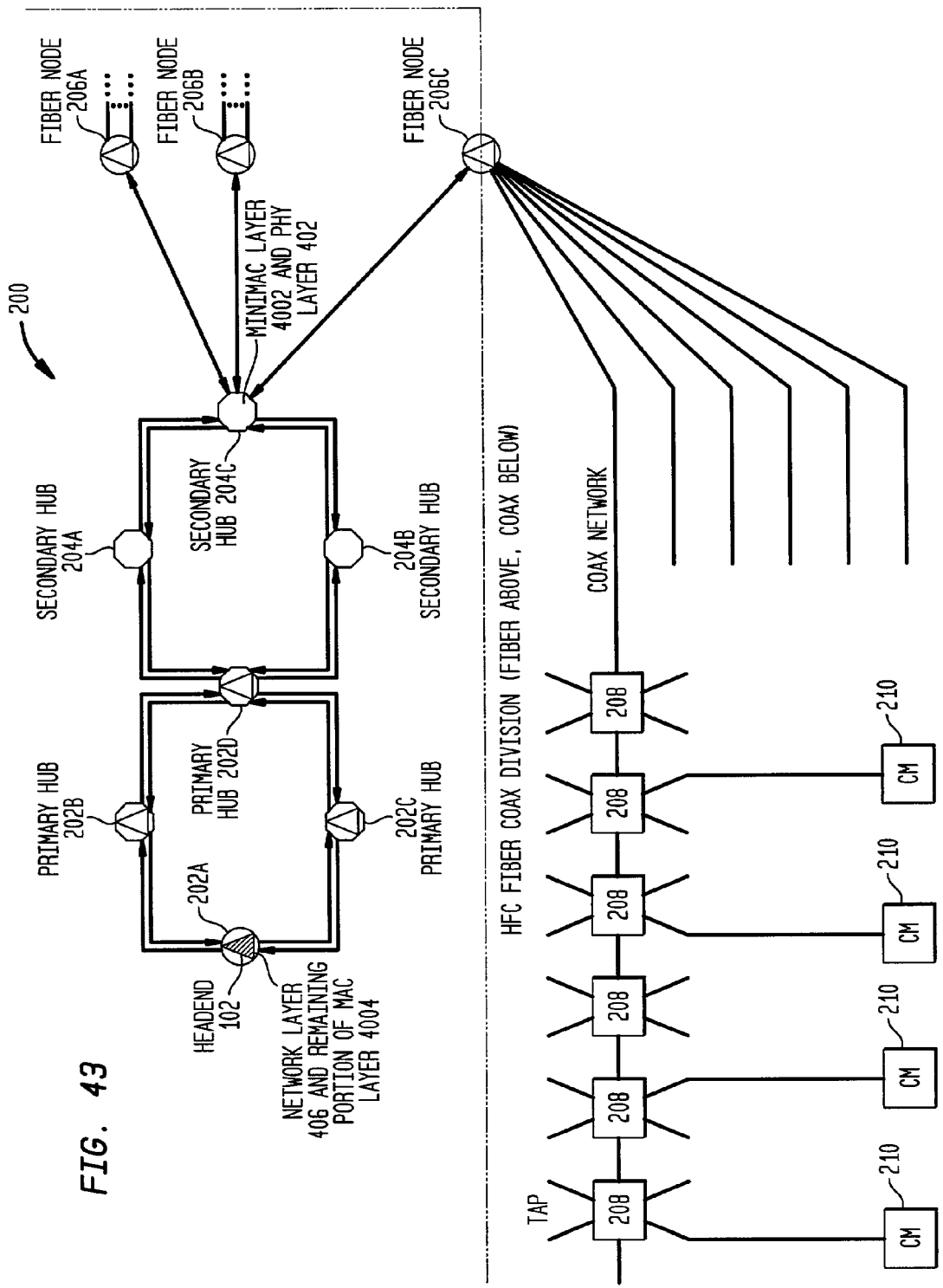

In FIG. 43, miniMAC layer 4002 and PHY layer 402 are co-located in secondary hub 204C. In this configuration of distributed CMTS 4000, one network layer 406, one remaining portion of MAC layer 404, one miniMAC layer 4002 and one PHY layer 402 are used. MiniMAC layer 4002 and PHY layer 402 are located in close proximity to each other to adhere to DOCSIS timing constraints. In this embodiment, upstream digital transmission begins at secondary hub 204C. With this embodiment, PHY layer 402 services all cable modems 210 attached to each of fiber nodes 206A-C in system 200, but lessens the analog noise level by enabling digital transmissions in the upstream to occur at an earlier time within the network. Thus, in the upstream, RF signals are transmitted from cable modems 210 to fiber nodes 206, optical signals are transmitted from fiber nodes 206 to secondary hub 204C, and digital signals are transmitted thereafter.

Figure 44:
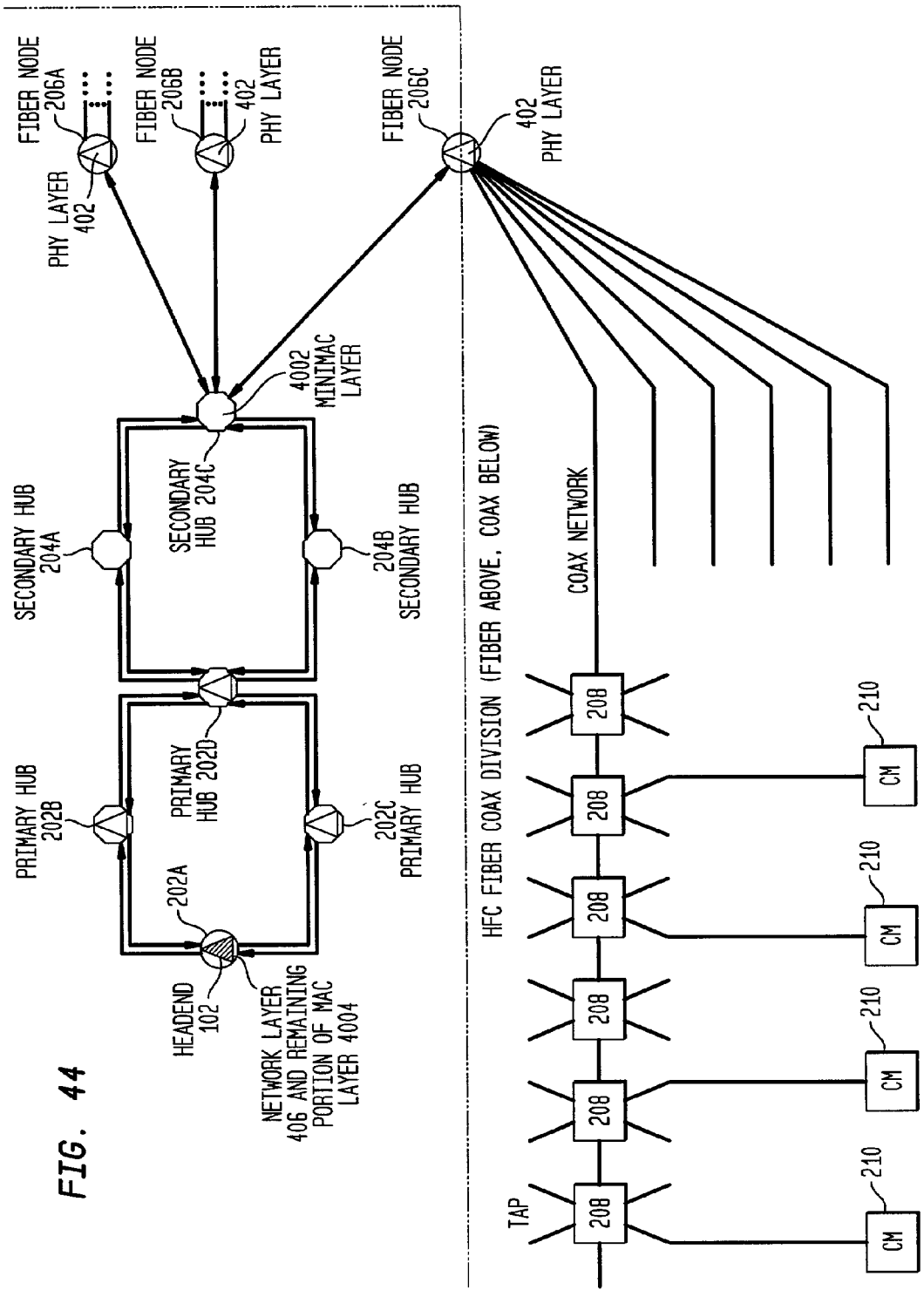

In FIG. 44, miniMAC layer 4002 is placed in secondary hub 204C and PHY layers 402 are placed in fiber nodes 206. In this configuration of distributed CMTS 4000, a PHY layer 402 is needed for each fiber node 206 in HFC system 200. This configuration requires one network layer 406, one remaining portion of MAC layer 4004, one miniMAC layer 4002, and a PHY layer 402 for each fiber node 206 in the system. MiniMAC layer 4002 and PHY layer 402 are located in close proximity to each other to adhere to DOCSIS timing constraints. As the number of PHY layers 402 increases, each PHY layer 402 supports fewer cable modems 210, causing the system bandwidth to increase and the analog noise level to decrease. For example, each PHY layer 402 shown in FIG. 44 services cable modems 210 attached to one of fiber nodes 206A, 206B, or 206C. Digital transmissions now begin at fiber nodes 206. In the upstream, RF signals are transmitted from cable modems 210 to fiber nodes 206 and digital signals are transmitted thereafter.

Figure 45:
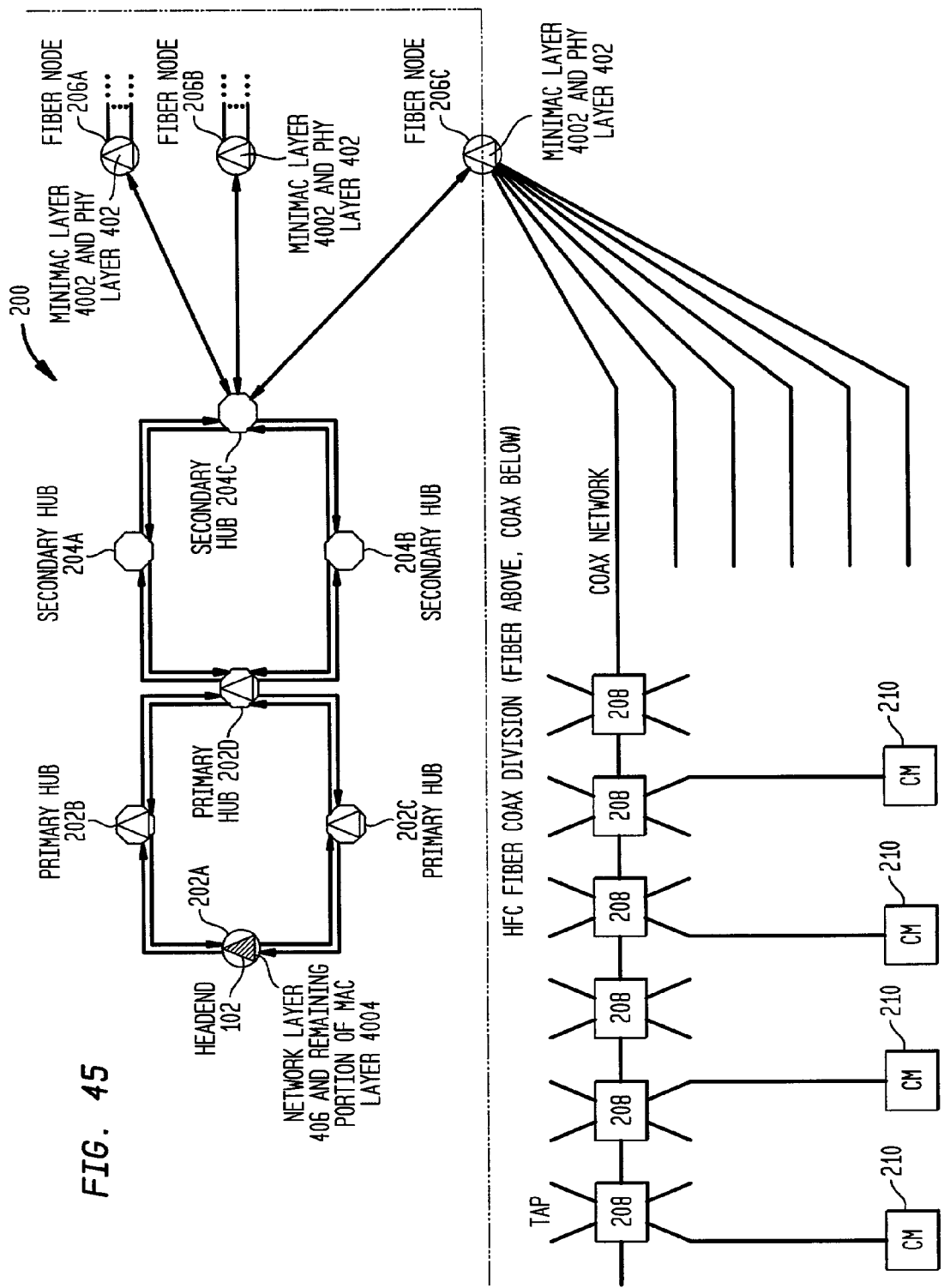

In FIG. 45, miniMAC layers 4002 and PHY layers 402 are placed in fiber nodes 206. In this configuration of distributed CMTS 4000, a miniMAC layer 4002 and a PHY layer 402 are needed for each fiber node 206 in HFC system 200. This configuration requires one network layer 406, one remaining portion of MAC layer 4004, and a miniMAC layer 4002 and a PHY layer 402 for each fiber node 206 in the system. MiniMAC layer 4002 and PHY layer 402 are co-located to adhere to DOCSIS timing constraints. As the number of PHY layers 402 increases, each PHY layer 402 supports fewer cable modems 210, causing the system bandwidth to increase and the analog noise level to decrease. For example, each PHY layer 402 shown in FIG. 45 services cable modems 210 attached to one of fiber nodes 206A, 206B, or 206C. Digital transmissions now begin at fiber nodes 206. In the upstream, RF signals are transmitted from cable modems 210 to fiber nodes 206 and digital signals are transmitted thereafter.

Figure 46:
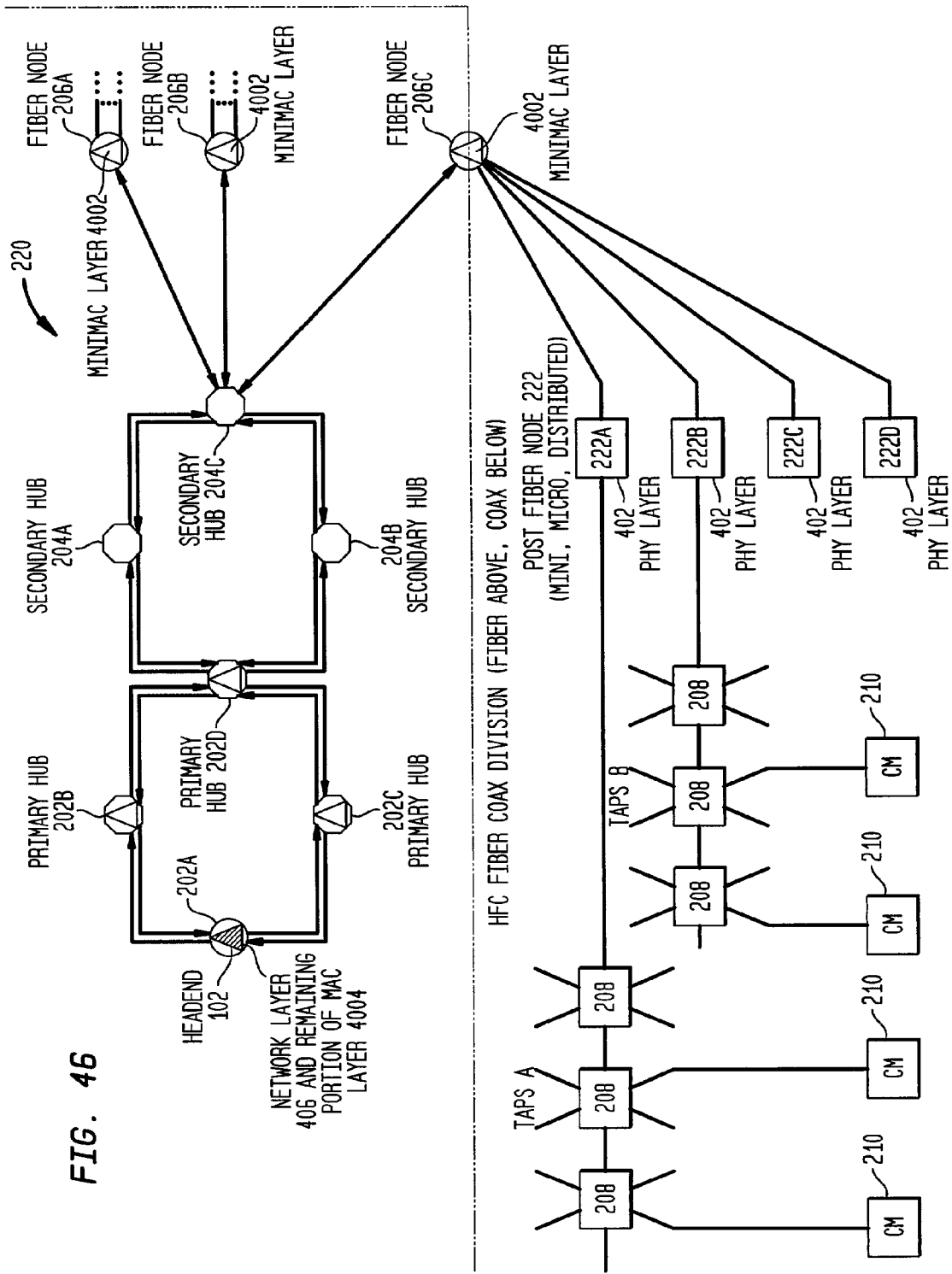

In FIG. 46, miniMAC layers 4002 are placed in fiber nodes 206 and PHY layers 402 are placed in post fiber nodes 222. In this configuration of distributed CMTS 4000, a miniMAC layer 4002 is needed for each fiber node 206 and a PHY layer 402 is needed for each post fiber node 222 that connects to fiber nodes 206A-C. This configuration requires one network layer 406, one remaining portion of MAC layer 4004, a miniMAC layer 4002 for each fiber node 206, and a PHY layer 402 for each post fiber node 222 in the system. The configuration shown in FIG. 46 moves PHY layers 402 closer to cable modems 210, thereby enabling each PHY layer 402 to support fewer cable modems 210. For example, each PHY layer 402 shown in FIG. 46 services cable modems 210 attached to one of post fiber nodes 222A, 222B, 222C or 222D. This also causes the system bandwidth to increase. Also, miniMAC layers 4002 and PHY layers 402 are located in close proximity to each other to adhere to DOCSIS timing constraints. In the upstream, digital transmission begins at post fiber nodes 222, thereby decreasing any analog noise resulting from interference sources in the coaxial cables. RF signals are transmitted from cable modems 210 to post fiber nodes 222 and digital signals are transmitted thereafter.

Figure 47:
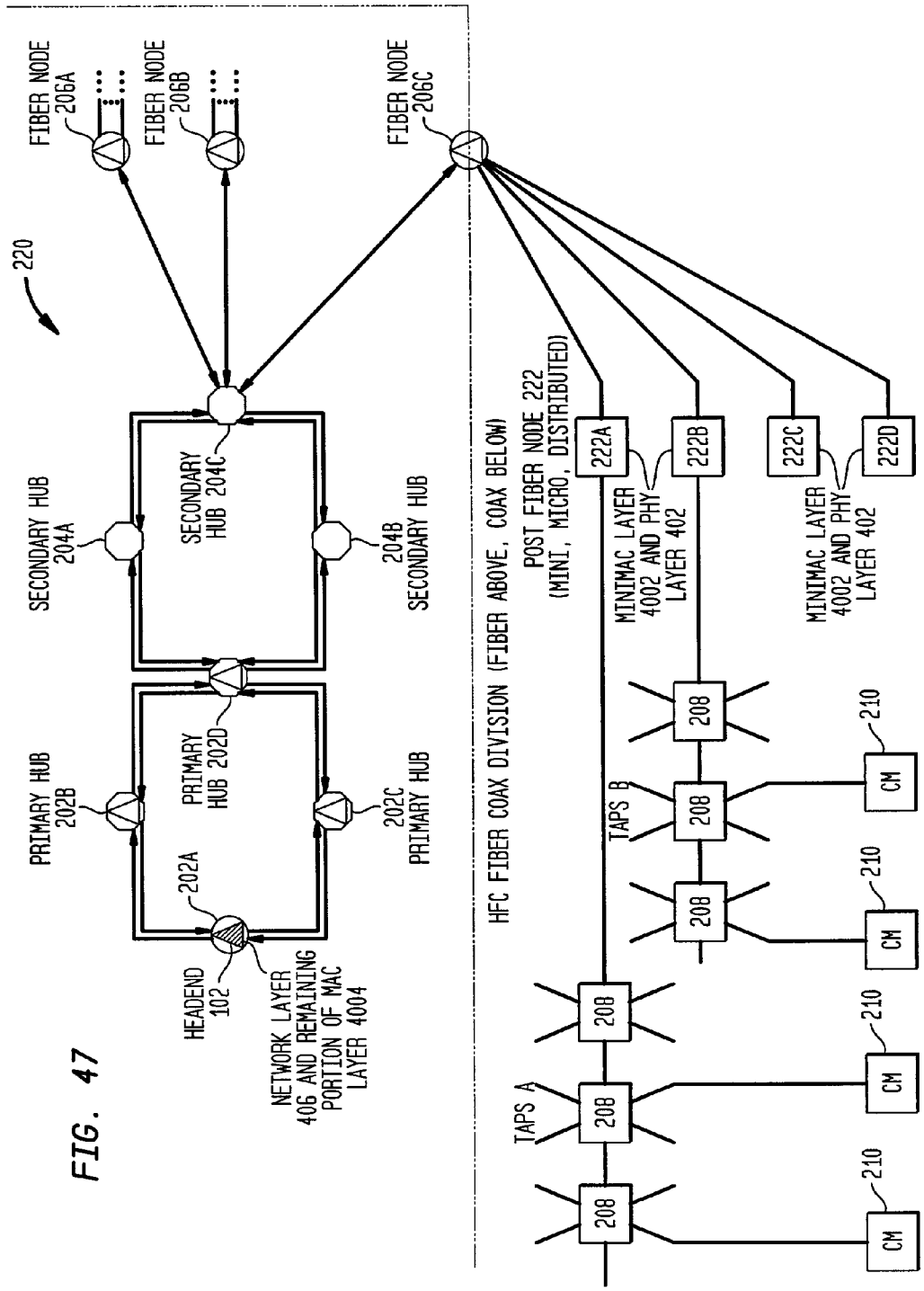

In FIG. 47, miniMAC layers 4002 and PHY layers 402 are placed in post fiber nodes 222. In this configuration of distributed CMTS 4000, a miniMAC layer 4002 and a PHY layer 402 are needed for each post fiber node 222 that connects to fiber nodes 206A-C. This configuration requires one network layer 406, one remaining portion of MAC layer 4004, and a miniMAC layer 4002 and a PHY layer 402 for each post fiber node 222 in the system. The configuration shown in FIG. 47 moves PHY layers 402 closer to cable modems 210, thereby enabling each PHY layer 402 to support fewer cable modems 210. For example, each PHY layer 402 shown in FIG. 47 services cable modems 210 attached to one of post fiber nodes 222A, 222B, 222C or 222D. This also causes the system bandwidth to increase. Also, miniMAC layers 4002 and PHY layers 402 are co-located to adhere to DOCSIS timing constraints. In the upstream, digital transmission begins at post fiber nodes 222, thereby decreasing any analog noise resulting from interference sources in the coaxial cables. RF signals are transmitted from cable modems 210 to post fiber nodes 222 and digital signals are transmitted thereafter.

FIGS. 48-52 illustrate distributed CMTS configurations in which network layer 406 resides in headend 102, remaining part of MAC layer 4004 resides in primary hub 202D, and miniMAC layer 4002 and PHY layer 402 are distributed across portions of hybrid fiber/coaxial systems 200 and 220.

Figure 48:
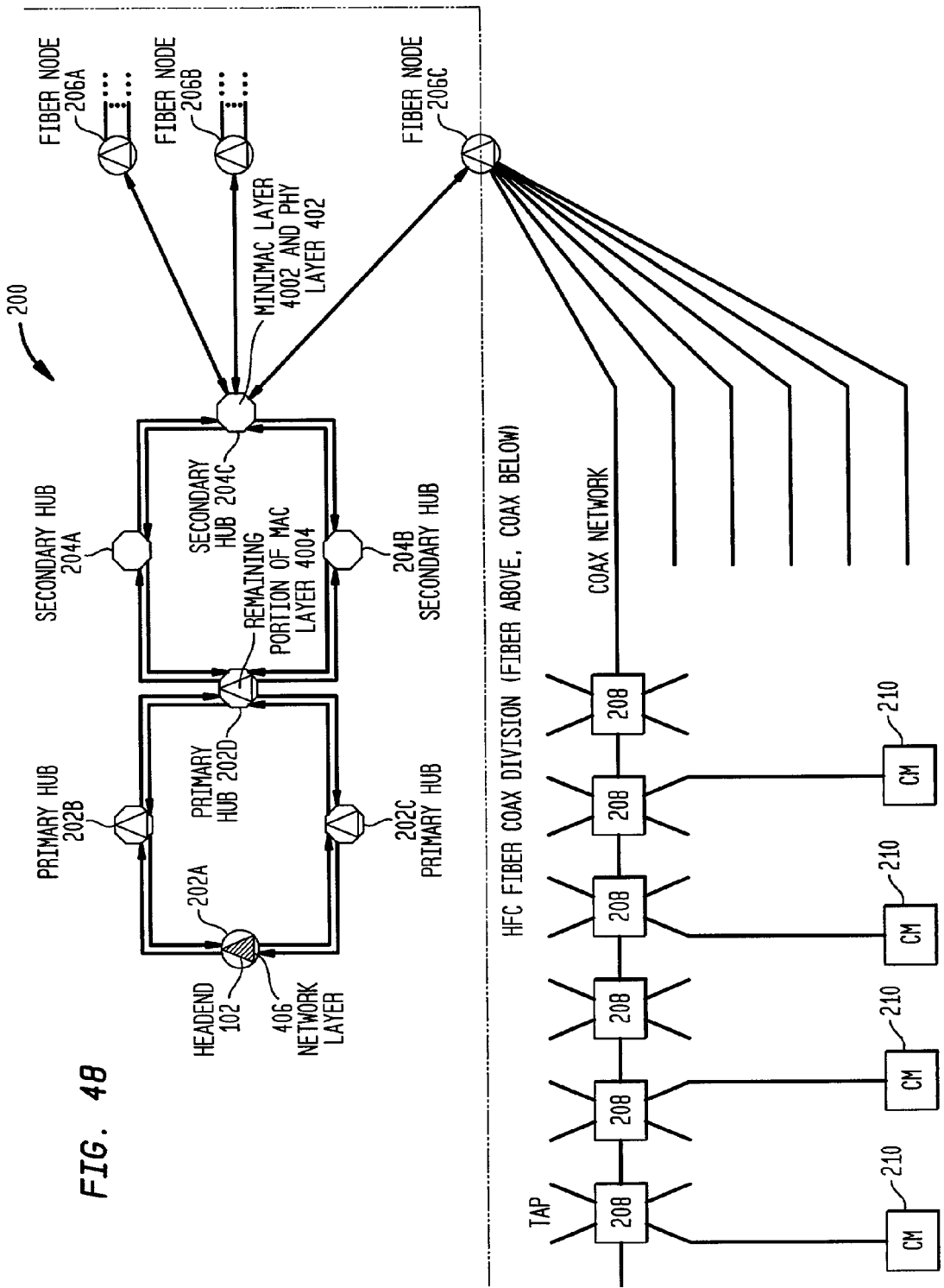

In FIG. 48, miniMAC layer 4002 and PHY layer 402 are co-located in secondary hub 204C. In this configuration of distributed CMTS 4000, one network layer 406, one remaining portion of MAC layer 404, one miniMAC layer 4002 and one PHY layer 402 are used. MiniMAC layer 4002 and PHY layer 402 are co-located to adhere to DOCSIS timing constraints. In this embodiment, upstream digital transmission begins at secondary hub 204C. With this embodiment, PHY layer 402 services all cable modems 210 attached to each of fiber nodes 206A-C in system 200, but lessens the analog noise level by enabling digital transmissions in the upstream to occur at an earlier time within the network. Thus, in the upstream, RF signals are transmitted from cable modems 210 to fiber nodes 206, optical signals are transmitted from fiber nodes 206 to secondary hub 204C, and digital signals are transmitted thereafter.

Figure 49:
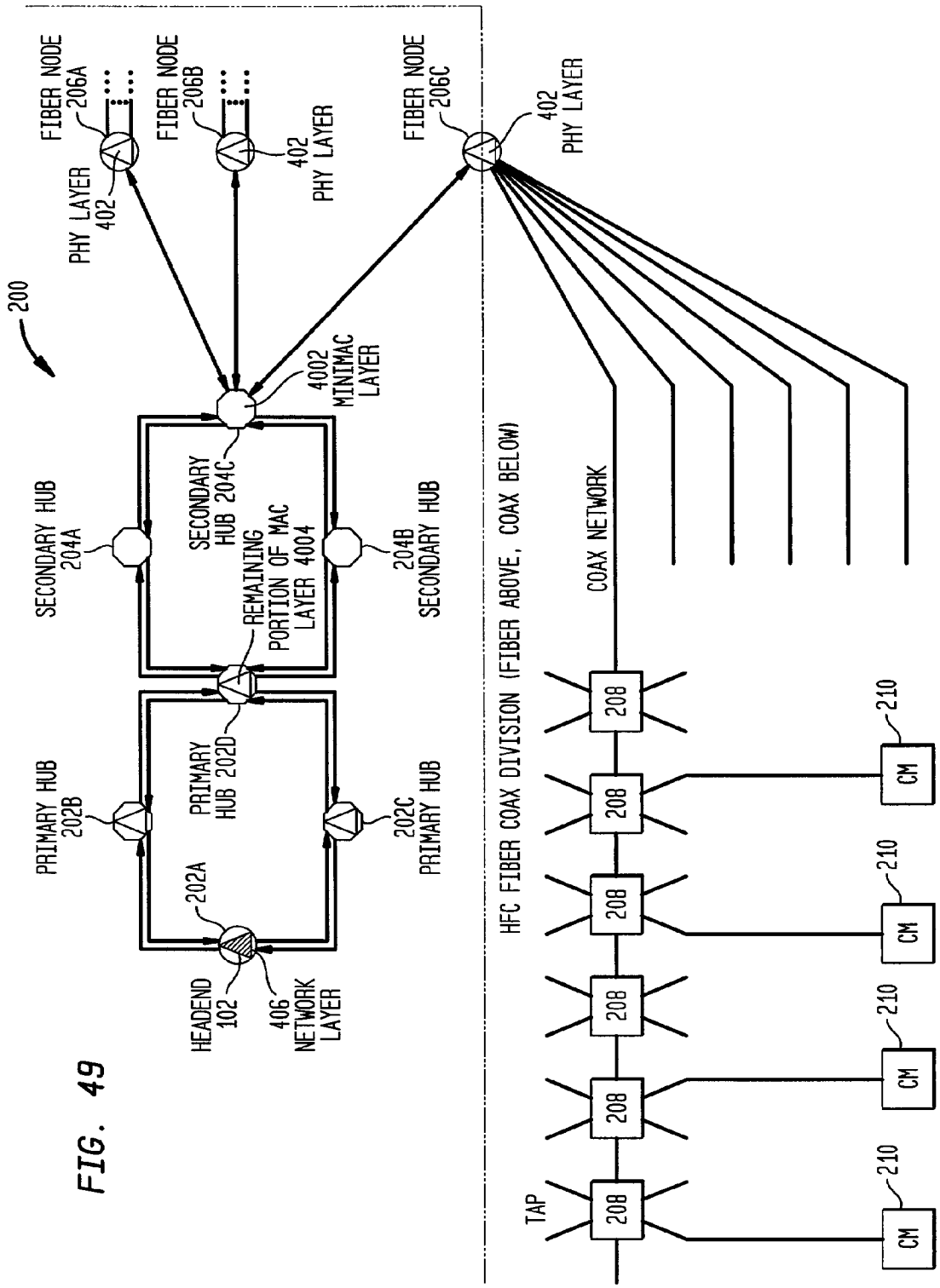

In FIG. 49, miniMAC layer 4002 is placed in secondary hub 204C and PHY layers 402 are placed in fiber nodes 206. In this configuration of distributed CMTS 4000, a PHY layer 402 is needed for each fiber node 206 in HFC system 200. This configuration requires one network layer 406, one remaining portion of MAC layer 4004, one miniMAC layer 4002, and a PHY layer 402 for each fiber node 206 in the system. MiniMAC layer 4002 and PHY layer 402 are located in close proximity to each other to adhere to DOCSIS timing constraints. As the number of PHY layers 402 increases, each PHY layer 402 supports fewer cable modems 210, causing the system bandwidth to increase and the analog noise level to decrease. For example, each PHY layer 402 shown in FIG. 49 services cable modems 210 attached to one of fiber nodes 206A, 206B, or 206C. Digital transmissions now begin at fiber nodes 206. In the upstream, RF signals are transmitted from cable modems 210 to fiber nodes 206 and digital signals are transmitted thereafter.

Figure 50:
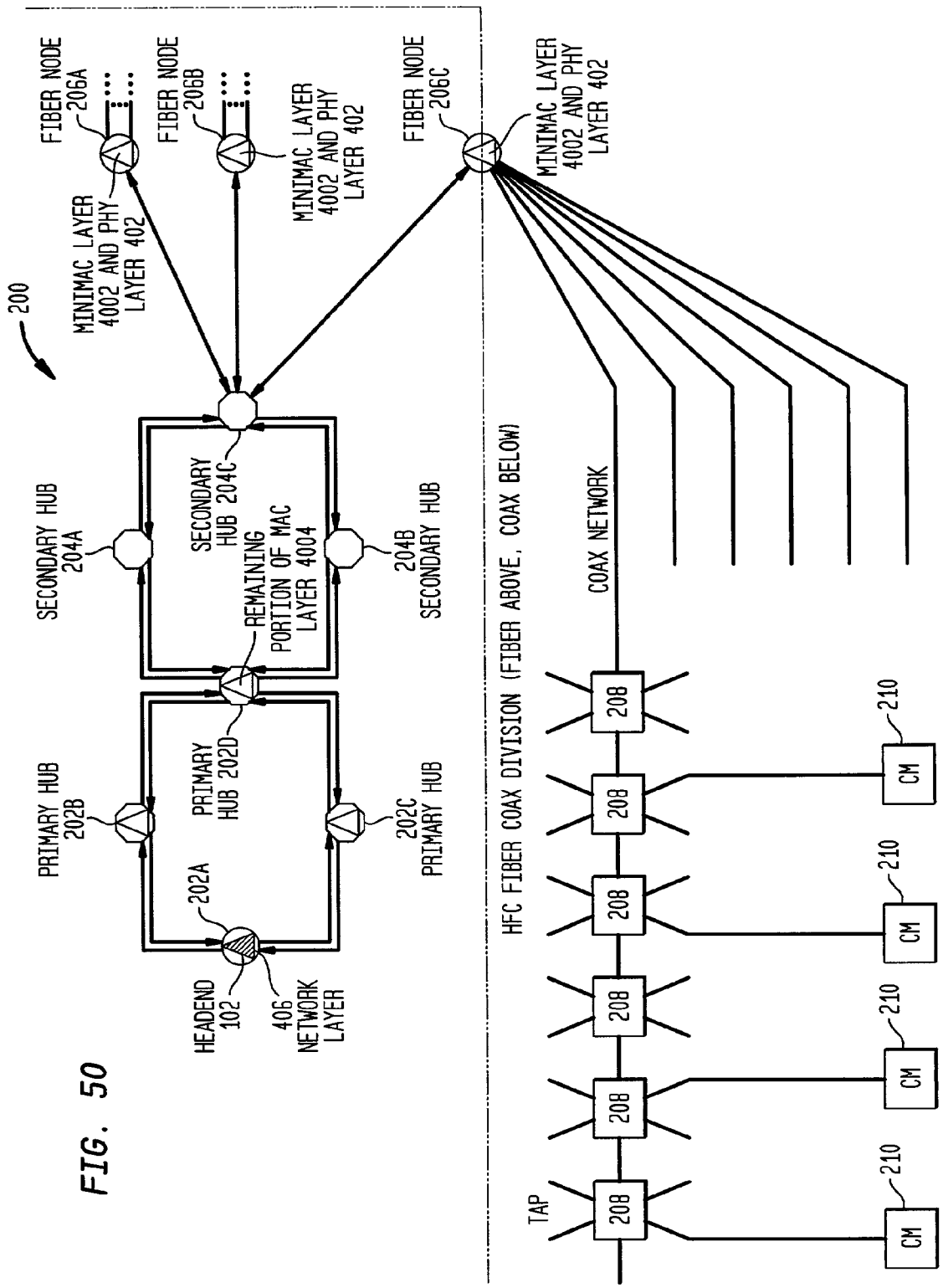

In FIG. 50, miniMAC layers 4002 and PHY layers 402 are placed in fiber nodes 206. In this configuration of distributed CMTS 4000, a miniMAC layer 4002 and a PHY layer 402 are needed for each fiber node 206 in HFC system 200. This configuration requires one network layer 406, one remaining portion of MAC layer 4004, and a miniMAC layer 4002 and a PHY layer 402 for each fiber node 206 in the system. MiniMAC layer 4002 and PHY layer 402 are co-located to adhere to DOCSIS timing constraints. As the number of PHY layers 402 increases, each PHY layer 402 supports fewer cable modems 210, causing the system bandwidth to increase and the analog noise level to decrease. For example, each PHY layer 402 shown in FIG. 50 services cable modems 210 attached to one of fiber nodes 206A, 206B, or 206C. Digital transmissions now begin at fiber nodes 206. In the upstream, RF signals are transmitted from cable modems 210 to fiber nodes 206 and digital signals are transmitted thereafter.

Figure 51:
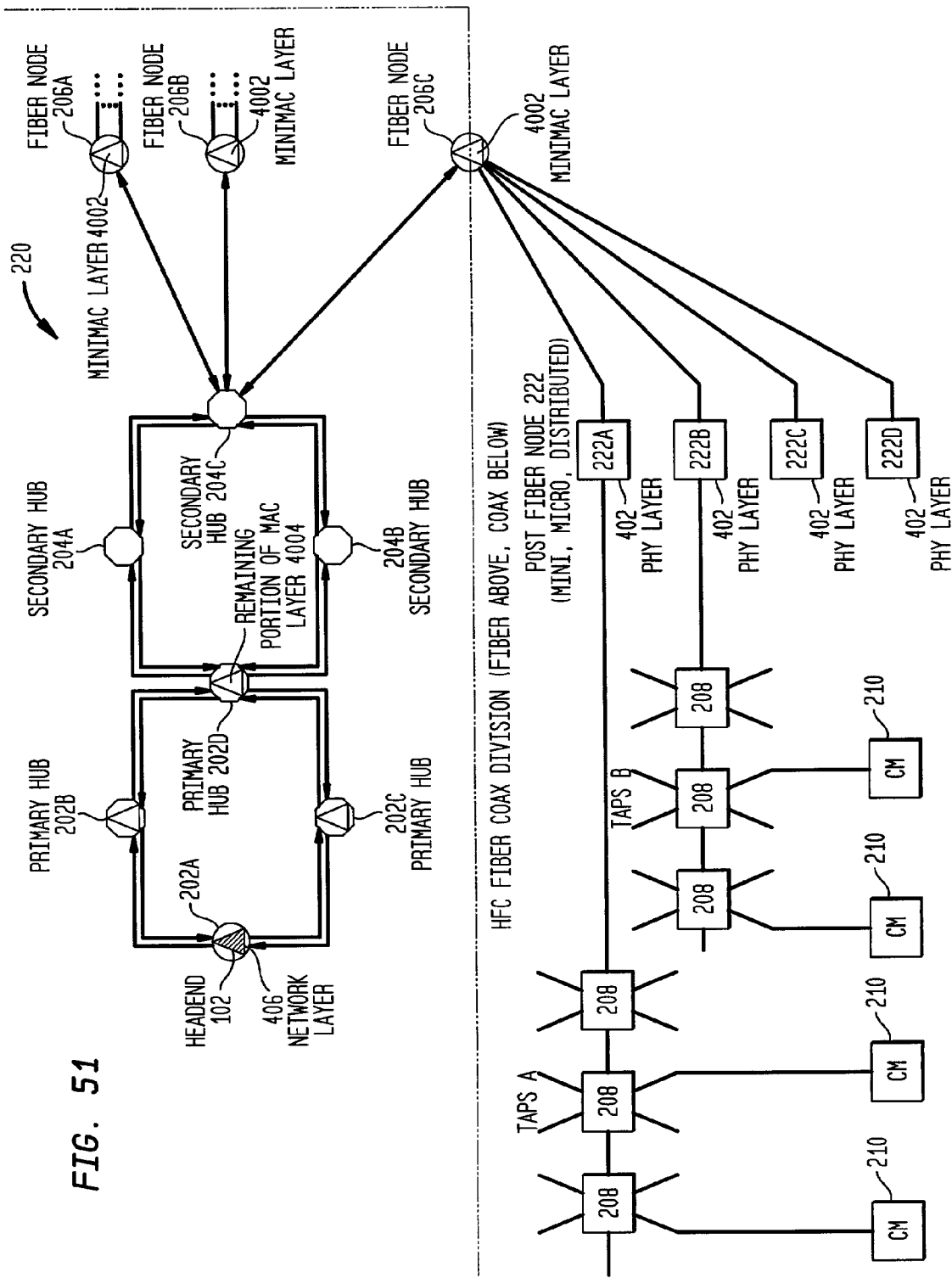

In FIG. 51, miniMAC layers 4002 are placed in fiber nodes 206 and PHY layers 402 are placed in post fiber nodes 222. In this configuration of distributed CMTS 4000, a miniMAC layer 4002 is needed for each fiber node 206 and a PHY layer 402 is needed for each post fiber node 222 that connects to fiber nodes 206A-C. This configuration requires one network layer 406, one remaining portion of MAC layer 4004, a miniMAC layer 4002 for each fiber node 206, and a PHY layer 402 for each post fiber node 222 in the system. The configuration shown in FIG. 51 moves PHY layers 402 closer to cable modems 210, thereby enabling each PHY layer 402 to support fewer cable modems 210. For example, each PHY layer 402 shown in FIG. 51 services cable modems 210 attached to one of post fiber nodes 222A, 222B, 222C or 222D. This also causes the system bandwidth to increase. Also, miniMAC layers 4002 and PHY layers 402 are located in close proximity to each other to adhere to DOCSIS timing constraints. In the upstream, digital transmission begins at post fiber nodes 222, thereby decreasing any analog noise resulting from interference sources in the coaxial cables. RF signals are transmitted from cable modems 210 to post fiber nodes 222 and digital signals are transmitted thereafter.

Figure 52:
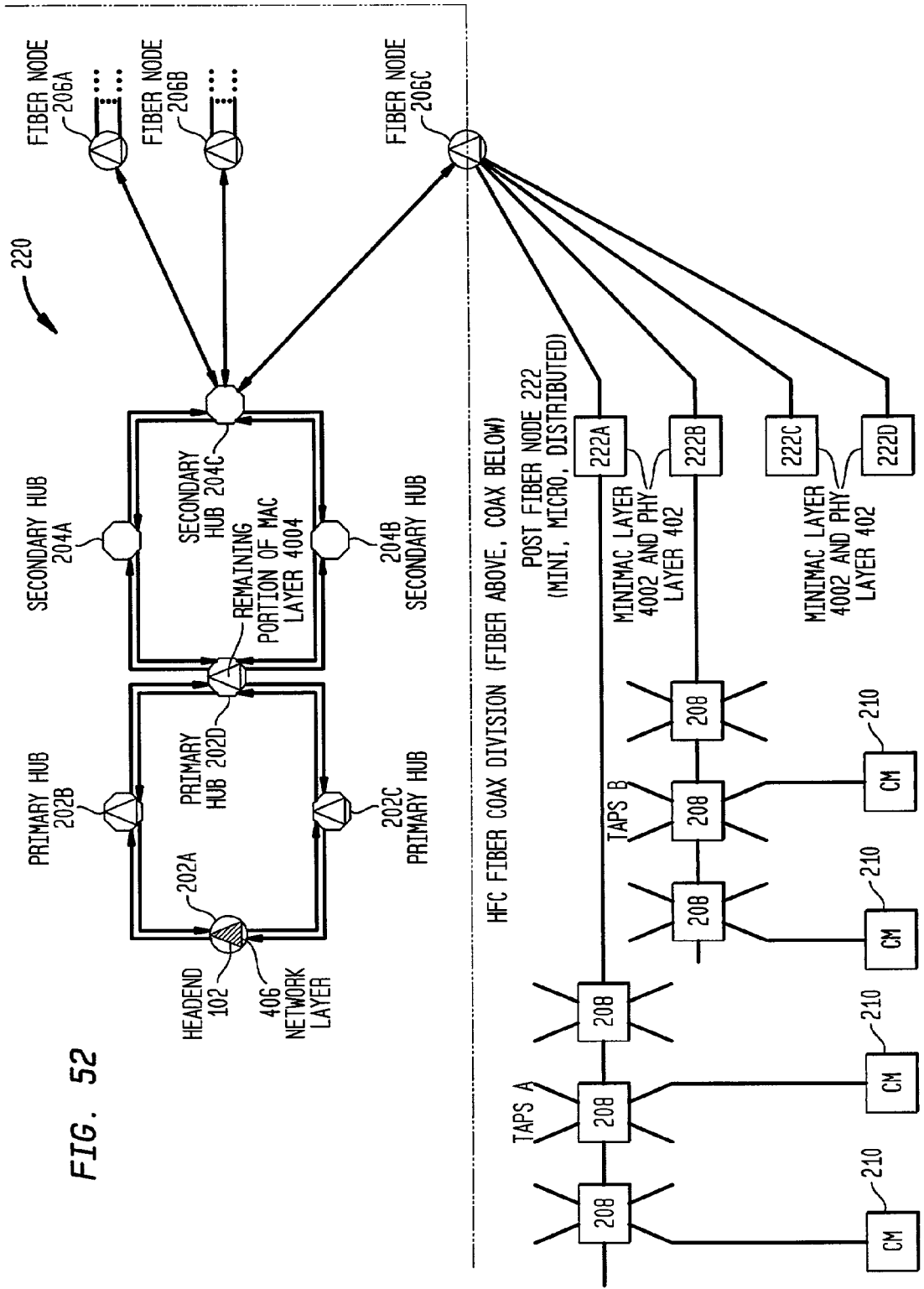

In FIG. 52, miniMAC layers 4002 and PHY layers 402 are placed in post fiber nodes 222. In this configuration of distributed CMTS 4000, a miniMAC layer 4002 and a PHY layer 402 are needed for each post fiber node 222 that connects to fiber nodes 206A-C. This configuration requires one network layer 406, one remaining portion of MAC layer 4004, and a miniMAC layer 4002 and a PHY layer 402 for each post fiber node 222 in the system. The configuration shown in FIG. 52 moves PHY layers 402 closer to cable modems 210, thereby enabling each PHY layer 402 to support fewer cable modems 210. For example, each PHY layer 402 shown in FIG. 52 services cable modems 210 attached to one of post fiber nodes 222A, 222B, 222C or 222D. This also causes the system bandwidth to increase. Also, miniMAC layers 4002 and PHY layers 402 are co-located to adhere to DOCSIS timing constraints. In the upstream, digital transmission begins at post fiber nodes 222, thereby decreasing any analog noise resulting from interference sources in the coaxial cables. RF signals are transmitted from cable modems 210 to post fiber nodes 222 and digital signals are transmitted thereafter.

Figure 53:
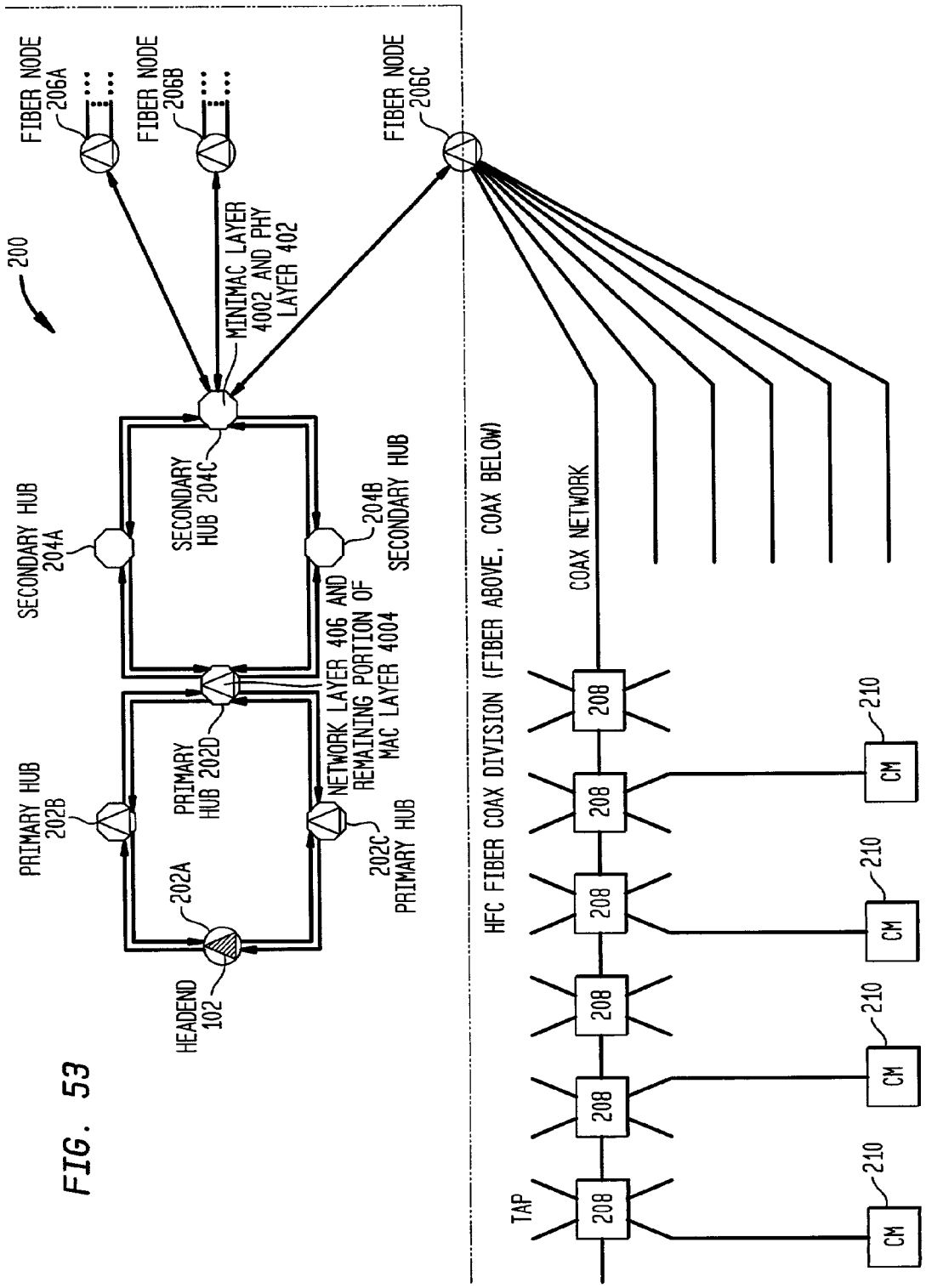

FIGS. 53-57 illustrate distributed CMTS 4000 configurations in which network layer 406 and remaining portion of MAC layer 4004 both reside in primary hub 202D while miniMAC layer 4002 and PHY layer 402 are distributed across the hybrid fiber/coaxial systems 200 and 220. In FIG. 53, miniMAC layer 4002 and PHY layer 402 are co-located in secondary hub 204C. In this configuration of distributed CMTS 4000, one network layer 406, one remaining portion of MAC layer 404, one miniMAC layer 4002 and one PHY layer 402 are used. MiniMAC layer 4002 and PHY layer 402 are co-located to adhere to DOCSIS timing constraints. In this embodiment, upstream digital transmission begins at secondary hub 204C. With this embodiment, PHY layer 402 services all cable modems 210 attached to each of fiber nodes 206A-C in system 200, but lessens the analog noise level by enabling digital transmissions in the upstream to occur at an earlier time within the network. Thus, in the upstream, RF signals are transmitted from cable modems 210 to fiber nodes 206, optical signals are transmitted from fiber nodes 206 to secondary hub 204C, and digital signals are transmitted thereafter.

Figure 54:
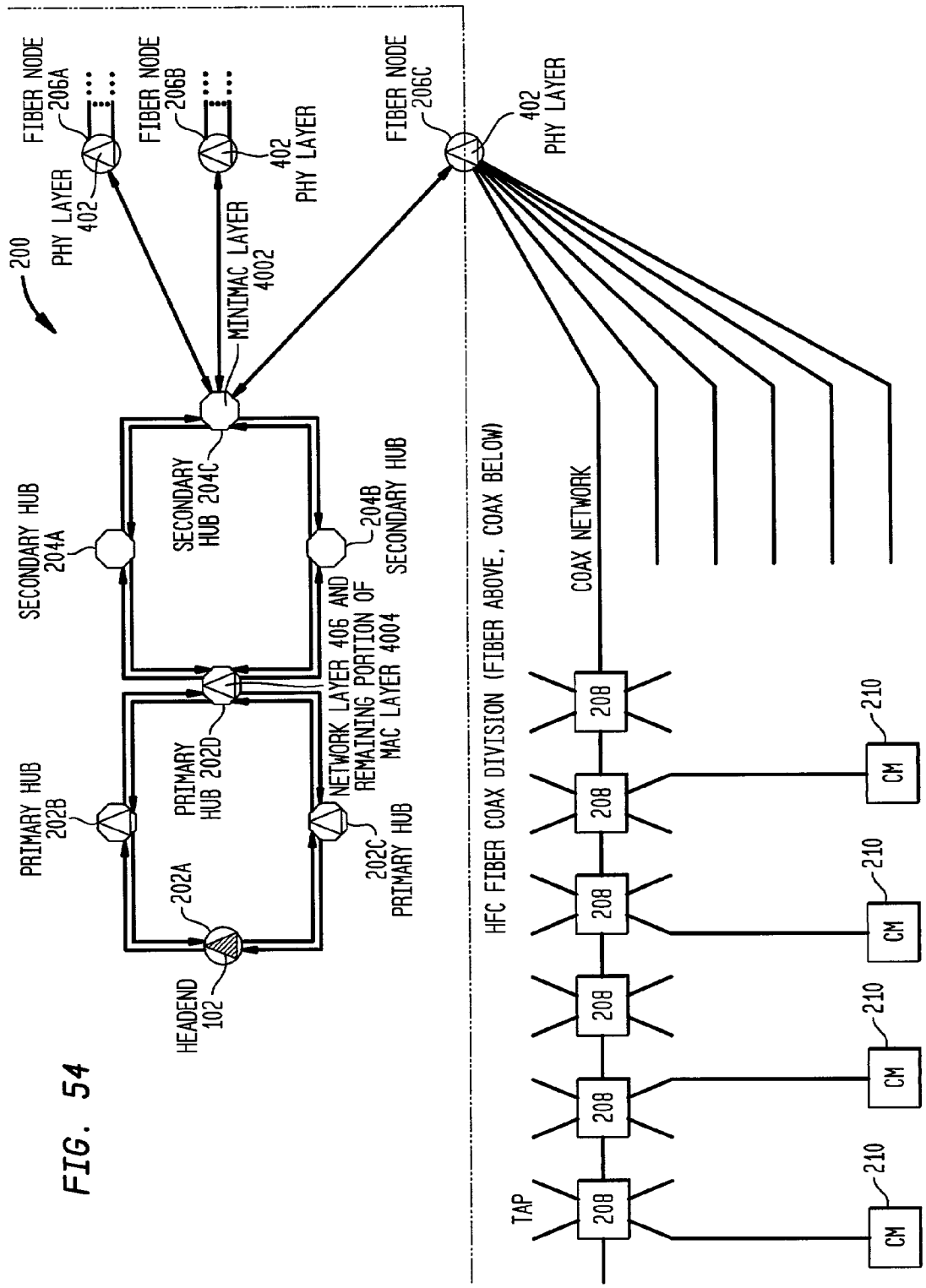

In FIG. 54, miniMAC layer 4002 is placed in secondary hub 204C and PHY layers 402 are placed in fiber nodes 206. In this configuration of distributed CMTS 4000, a PHY layer 402 is needed for each fiber node 206 in HFC system 200. This configuration requires one network layer 406, one remaining portion of MAC layer 4004, one miniMAC layer 4002, and a PHY layer 402 for each fiber node 206 in the system. MiniMAC layer 4002 and PHY layer 402 are located in close proximity to each other to adhere to DOCSIS timing constraints. As the number of PHY layers 402 increases, each PHY layer 402 supports fewer cable modems 210, causing the system bandwidth to increase and the analog noise level to decrease. For example, each PHY layer 402 shown in FIG. 54 services cable modems 210 attached to one of fiber nodes 206A, 206B, or 206C. Digital transmissions now begin at fiber nodes 206. In the upstream, RF signals are transmitted from cable modems 210 to fiber nodes 206 and digital signals are transmitted thereafter.

Figure 55:
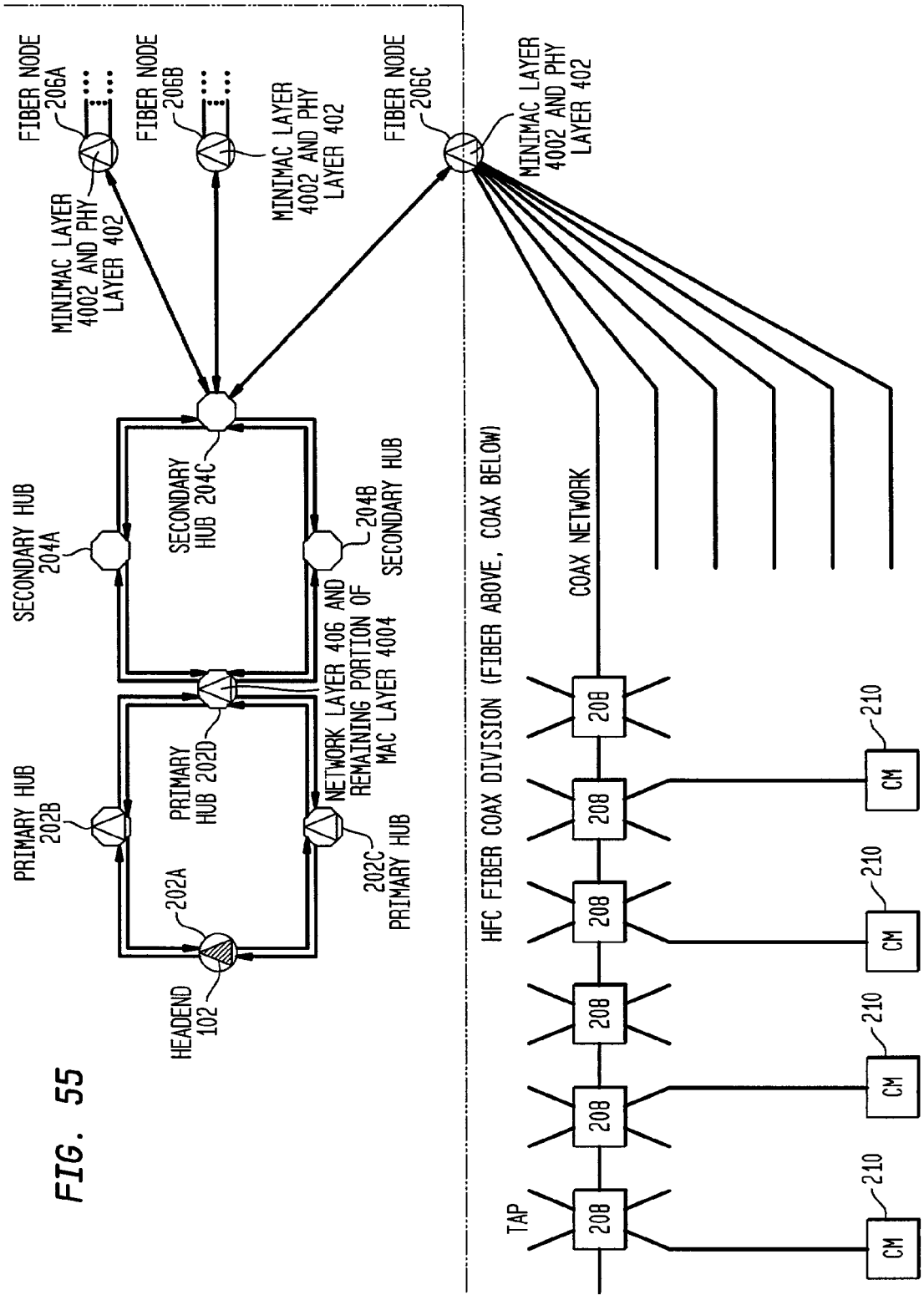

In FIG. 55, miniMAC layers 4002 and PHY layers 402 are placed in fiber nodes 206. In this configuration of distributed CMTS 4000, a miniMAC layer 4002 and a PHY layer 402 are needed for each fiber node 206 in HFC system 200. This configuration requires one network layer 406, one remaining portion of MAC layer 4004, and a miniMAC layer 4002 and a PHY layer 402 for each fiber node 206 in the system. MiniMAC layer 4002 and PHY layer 402 are co-located to adhere to DOCSIS timing constraints. As the number of PHY layers 402 increases, each PHY layer 402 supports fewer cable modems 210, causing the system bandwidth to increase and the analog noise level to decrease. For example, each PHY layer 402 shown in FIG. 55 services cable modems 210 attached to one of fiber nodes 206A, 206B, or 206C. Digital transmissions now begin at fiber nodes 206. In the upstream, RF signals are transmitted from cable modems 210 to fiber nodes 206 and digital signals are transmitted thereafter.

Figure 56:
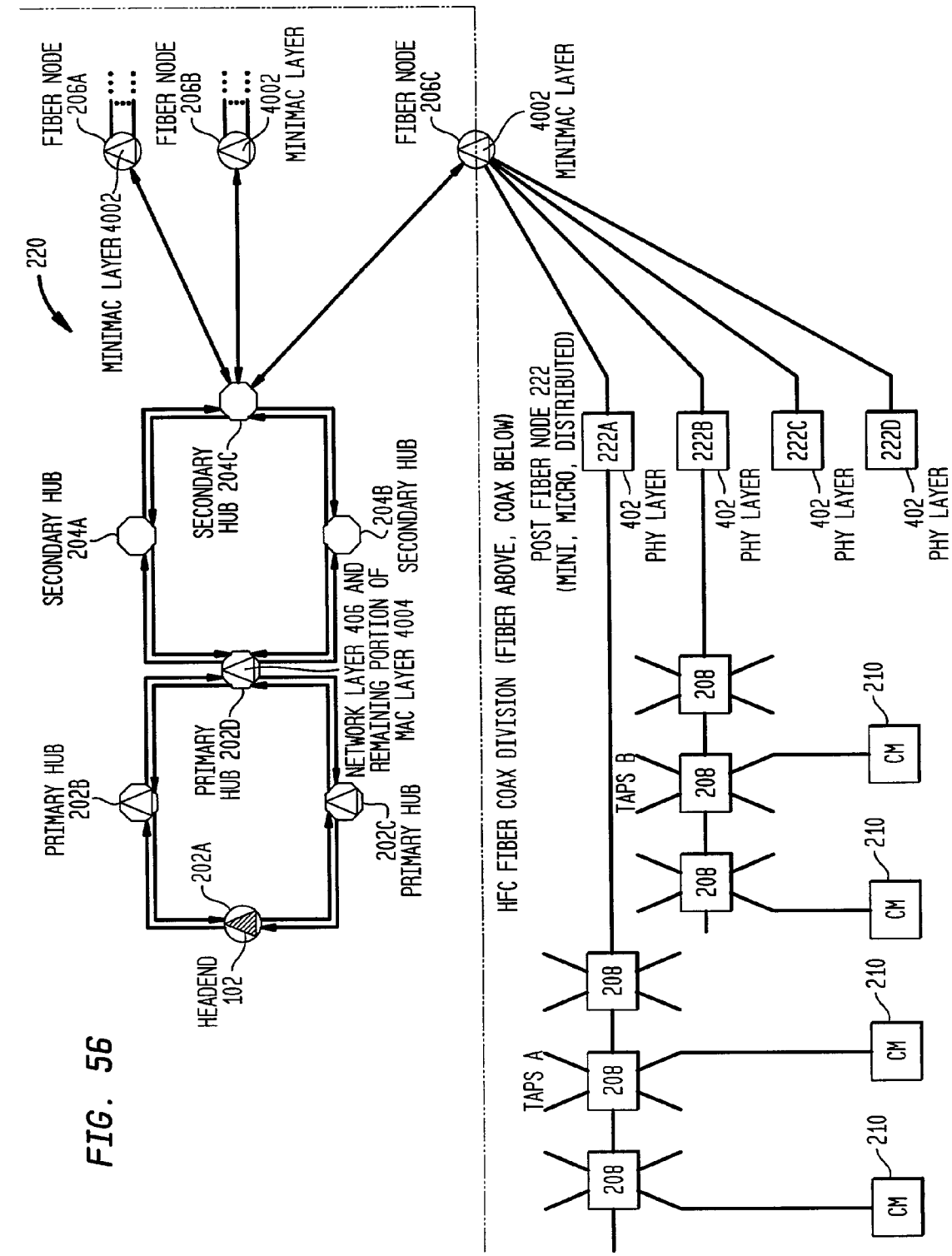

In FIG. 56, miniMAC layers 4002 are placed in fiber nodes 206 and PHY layers 402 are placed in post fiber nodes 222. In this configuration of distributed CMTS 4000, a miniMAC layer 4002 is needed for each fiber node 206 and a PHY layer 402 is needed for each post fiber node 222 that connects to fiber nodes 206A-C. This configuration requires one network layer 406, one remaining portion of MAC layer 4004, a miniMAC layer 4002 for each fiber node 206, and a PHY layer 402 for each post fiber node 222 in the system. The configuration shown in FIG. 56 moves PHY layers 402 closer to cable modems 210, thereby enabling each PHY layer 402 to support fewer cable modems 210. For example, each PHY layer 402 shown in FIG. 56 services cable modems 210 attached to one of post fiber nodes 222A, 222B, 222C or 222D. This also causes the system bandwidth to increase. Also, miniMAC layers 4002 and PHY layers 402 are located in close proximity to each other to adhere to DOCSIS timing constraints. In the upstream, digital transmission begins at post fiber nodes 222, thereby decreasing any analog noise resulting from interference sources in the coaxial cables. RF signals are transmitted from cable modems 210 to post fiber nodes 222 and digital signals are transmitted thereafter.

Figure 57:
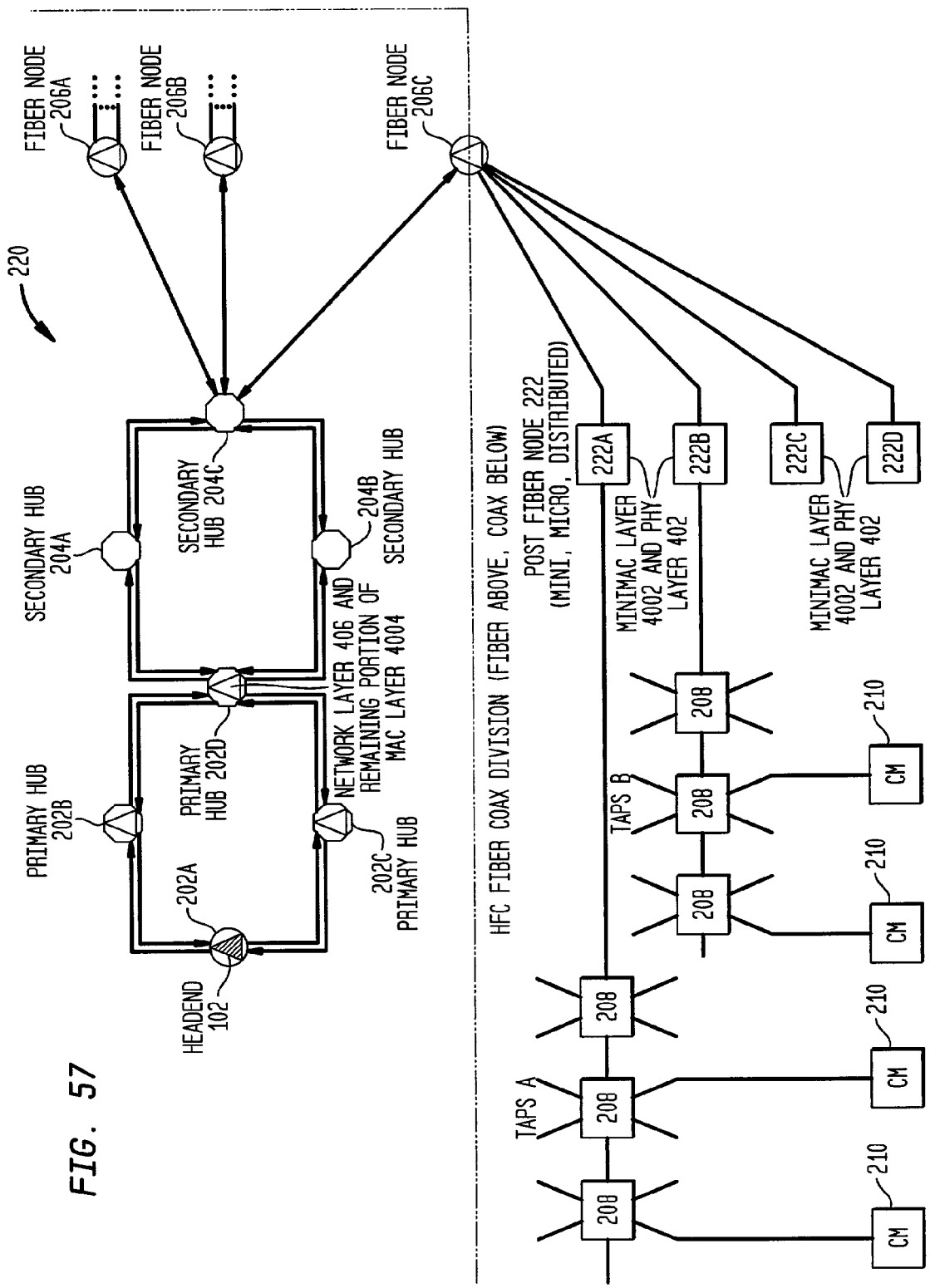

In FIG. 57, miniMAC layers 4002 and PHY layers 402 are placed in post fiber nodes 222. In this configuration of distributed CMTS 4000, a miniMAC layer 4002 and a PHY layer 402 are needed for each post fiber node 222 that connects to fiber nodes 206A-C. This configuration requires one network layer 406, one remaining portion of MAC layer 4004, and a miniMAC layer 4002 and a PHY layer 402 for each post fiber node 222 in the system. The configuration shown in FIG. 57 moves PHY layers 402 closer to cable modems 210, thereby enabling each PHY layer 402 to support fewer cable modems 210. For example, each PHY layer 402 shown in FIG. 57 services cable modems 210 attached to one of post fiber nodes 222A, 222B, 222C or 222D. This also causes the system bandwidth to increase. Also, miniMAC layers 4002 and PHY layers 402 are co-located to adhere to DOCSIS timing constraints. In the upstream, digital transmission begins at post fiber nodes 222, thereby decreasing any analog noise resulting from interference sources in the coaxial cables. RF signals are transmitted from cable modems 210 to post fiber nodes 222 and digital signals are transmitted thereafter.

Figure 58:
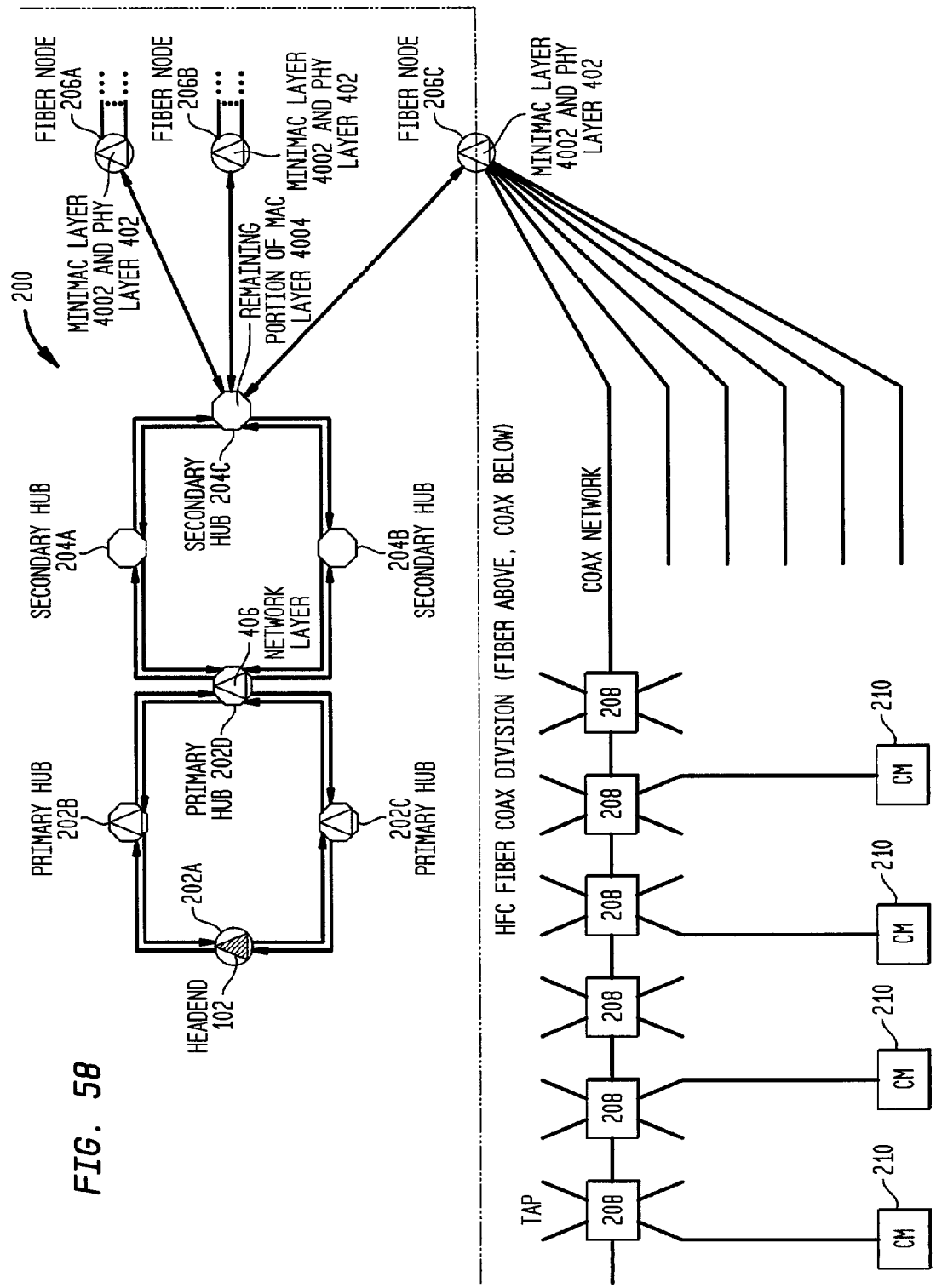
Figure 59:
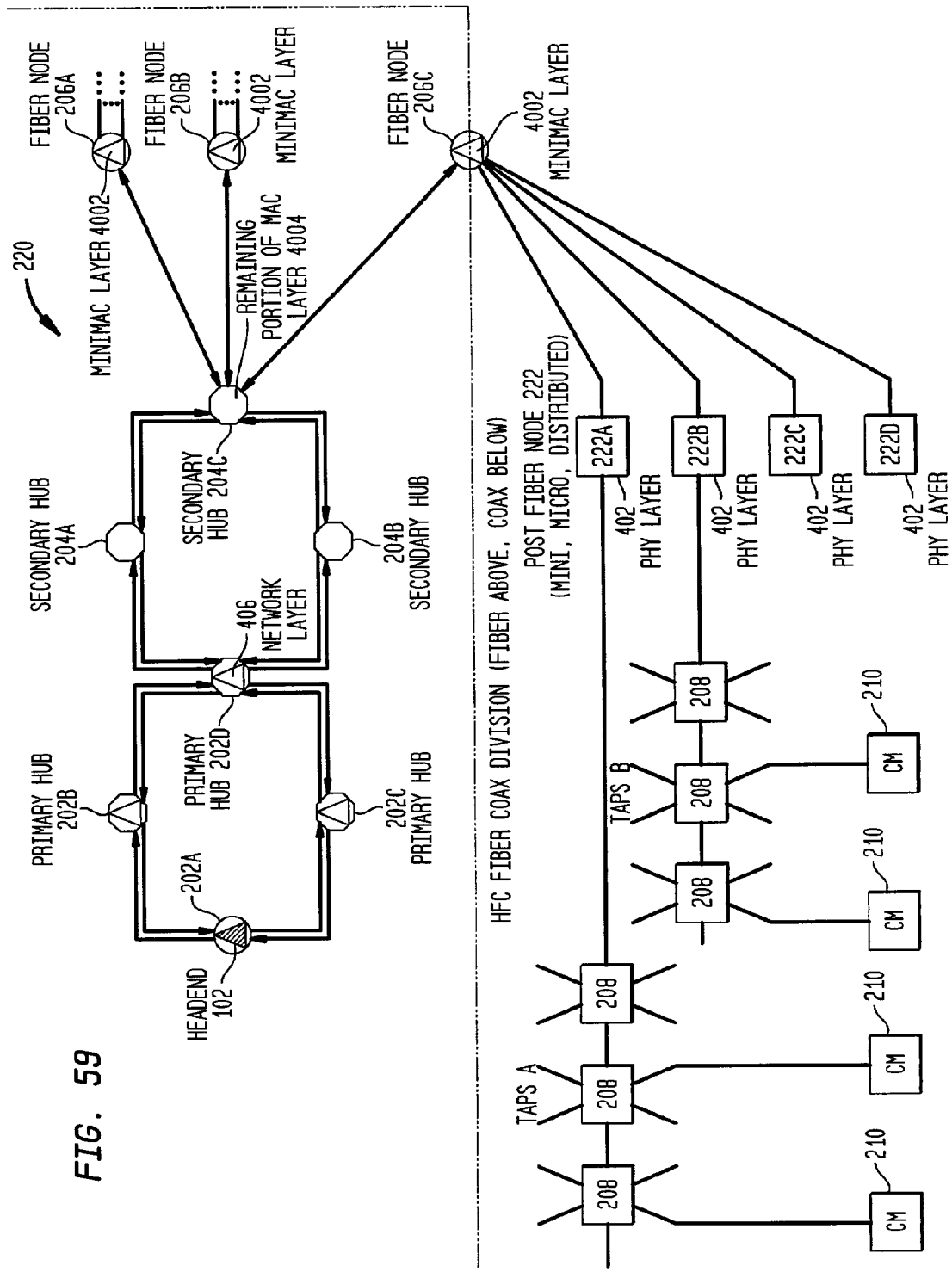
Figure 60:
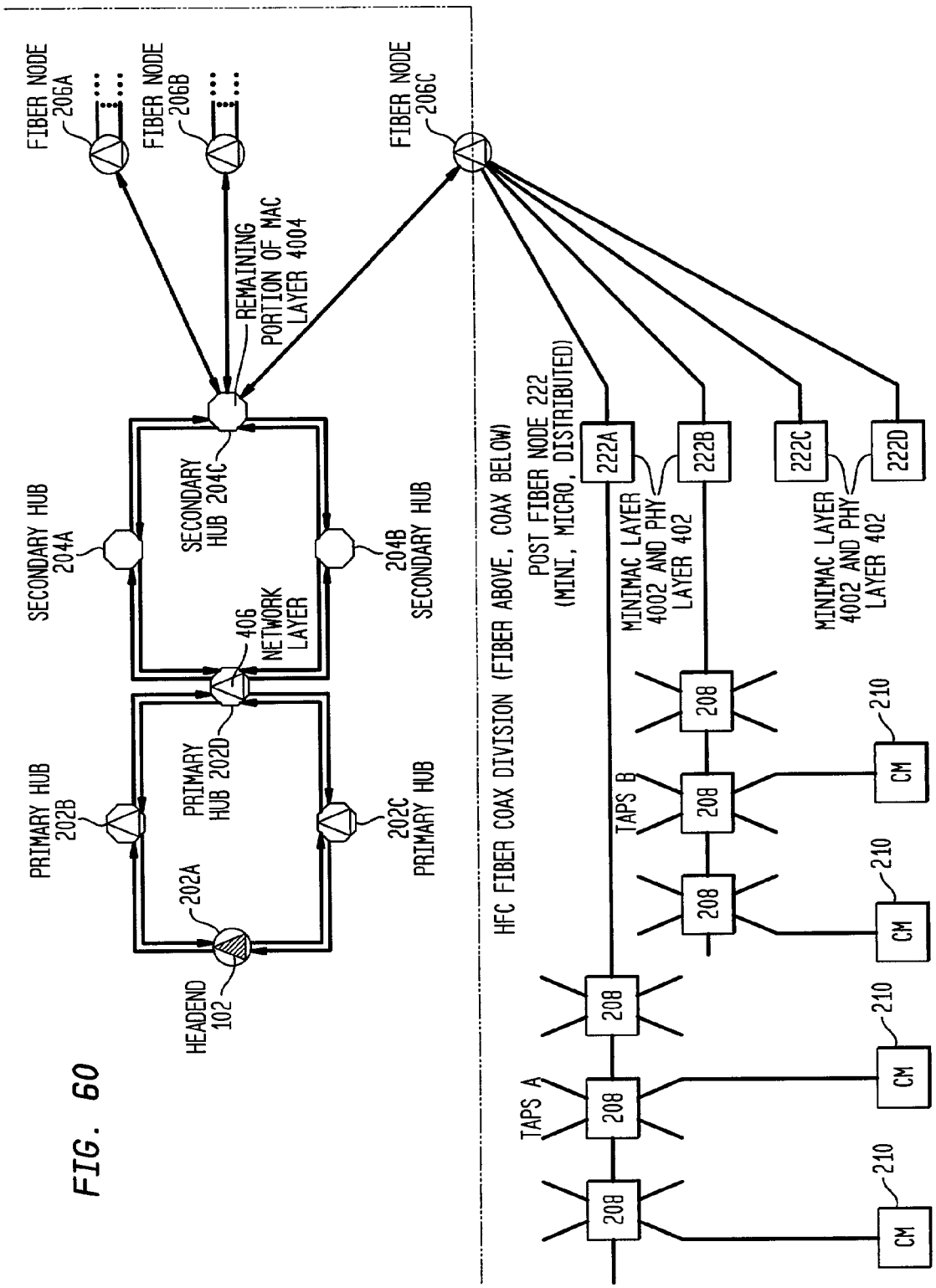

FIGS. 58-60 illustrate distributed CMTS 4000 configurations in which network layer 406 resides in primary hub 202D, remaining portion of MAC layer 4004 resides in secondary hub 204C, and miniMAC layer 4002 and PHY layer 402 are distributed across portions of hybrid fiber/coaxial systems 200 and 220. In FIG. 58, miniMAC layers 4002 and PHY layers 402 are placed in fiber nodes 206. In this configuration of distributed CMTS 4000, a miniMAC layer 4002 and a PHY layer 402 are needed for each fiber node 206 in HFC system 200. This configuration requires one network layer 406, one remaining portion of MAC layer 4004, and a miniMAC layer 4002 and a PHY layer 402 for each fiber node 206 in the system. MiniMAC layer 4002 and PHY layer 402 are co-located to adhere to DOCSIS timing constraints. As the number of PHY layers 402 increases, each PHY layer 402 supports fewer cable modems 210, causing the system bandwidth to increase and the analog noise level to decrease. For example, each PHY layer 402 shown in FIG. 58 services cable modems 210 attached to one of fiber nodes 206A, 206B, or 206C. Digital transmissions now begin at fiber nodes 206. In the upstream, RF signals are transmitted from cable modems 210 to fiber nodes 206 and digital signals are transmitted thereafter.

In FIG. 59, miniMAC layers 4002 are placed in fiber nodes 206 and PHY layers 402 are placed in post fiber nodes 222. In this configuration of distributed CMTS 4000, a miniMAC layer 4002 is needed for each fiber node 206 and a PHY layer 402 is needed for each post fiber node 222 that connects to fiber nodes 206A-C. This configuration requires one network layer 406, one remaining portion of MAC layer 4004, a miniMAC layer 4002 for each fiber node 206, and a PHY layer 402 for each post fiber node 222 in the system. The configuration shown in FIG. 59 moves PHY layers 402 closer to cable modems 210, thereby enabling each PHY layer 402 to support fewer cable modems 210. For example, each PHY layer 402 shown in FIG. 59 services cable modems 210 attached to one of post fiber nodes 222A, 222B, 222C or 222D. This also causes the system bandwidth to increase. Also, miniMAC layers 4002 and PHY layers 402 are located in close proximity to each other to adhere to DOCSIS timing constraints. In the upstream, digital transmission begins at post fiber nodes 222, thereby decreasing any analog noise resulting from interference sources in the coaxial cables. RF signals are transmitted from cable modems 210 to post fiber nodes 222 and digital signals are transmitted thereafter.

In FIG. 60, miniMAC layers 4002 and PHY layers 402 are placed in post fiber nodes 222. In this configuration of distributed CMTS 4000, a miniMAC layer 4002 and a PHY layer 402 are needed for each post fiber node 222 that connects to fiber nodes 206A-C. This configuration requires one network layer 406, one remaining portion of MAC layer 4004, and a miniMAC layer 4002 and a PHY layer 402 for each post fiber node 222 in the system. The configuration shown in FIG. 60 moves PHY layers 402 closer to cable modems 210, thereby enabling each PHY layer 402 to support fewer cable modems 210. For example, each PHY layer 402 shown in FIG. 60 services cable modems 210 attached to one of post fiber nodes 222A, 222B, 222C or 222D. This also causes the system bandwidth to increase. Also, miniMAC layers 4002 and PHY layers 402 are co-located to adhere to DOCSIS timing constraints. In the upstream, digital transmission begins at post fiber nodes 222, thereby decreasing any analog noise resulting from interference sources in the coaxial cables. RF signals are transmitted from cable modems 210 to post fiber nodes 222 and digital signals are transmitted thereafter.

Figure 61:
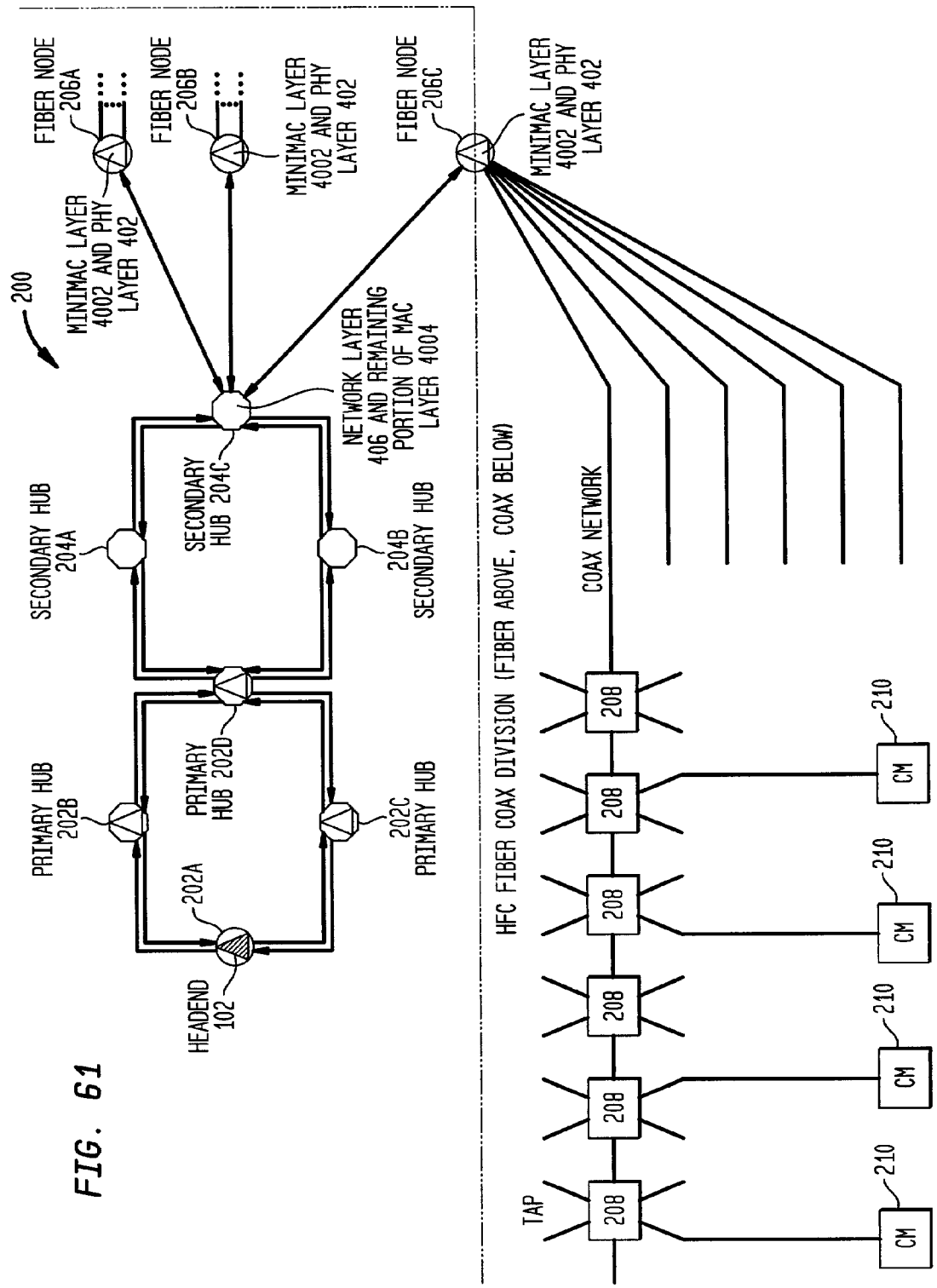
Figure 62:
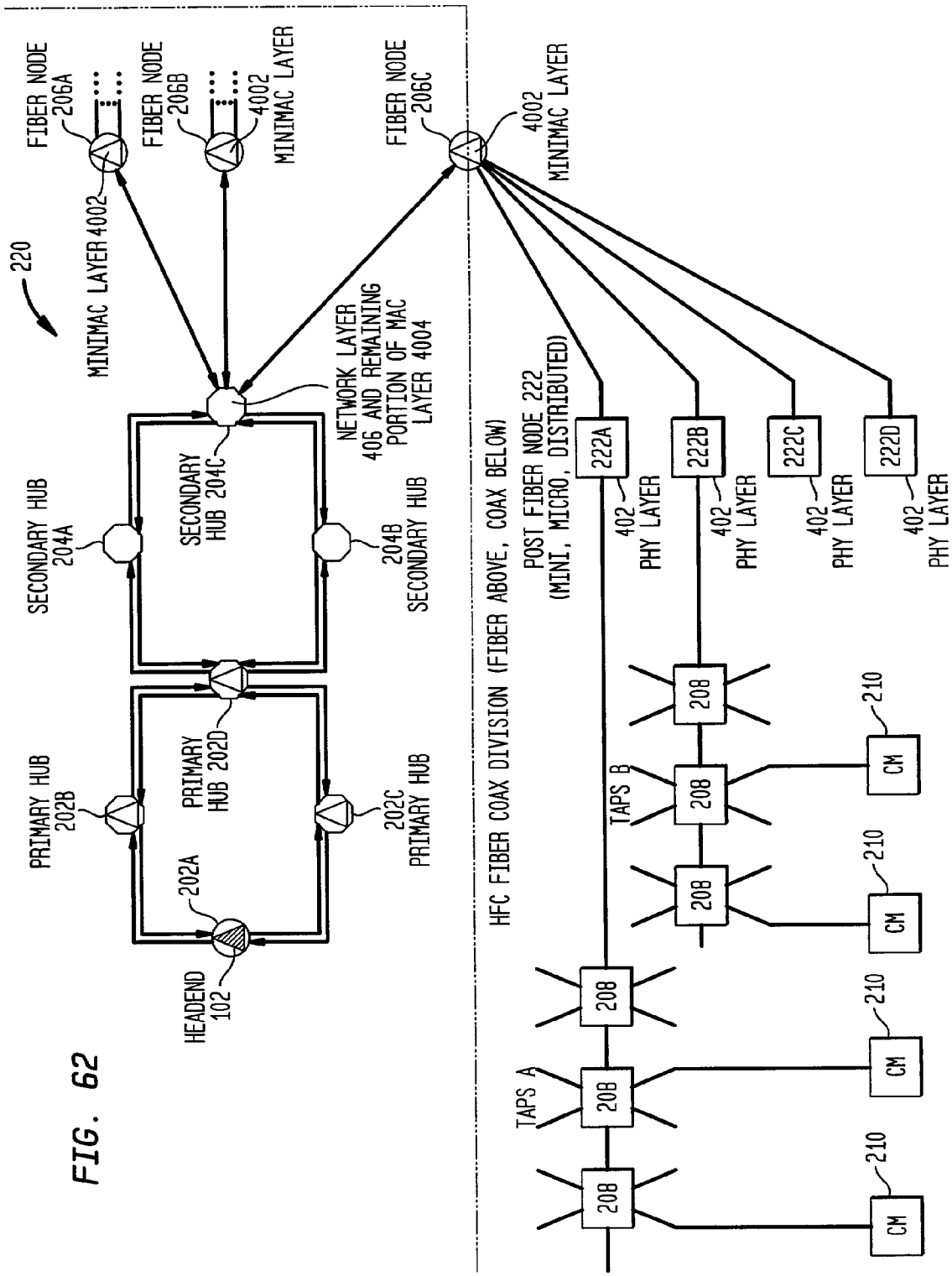
Figure 63:
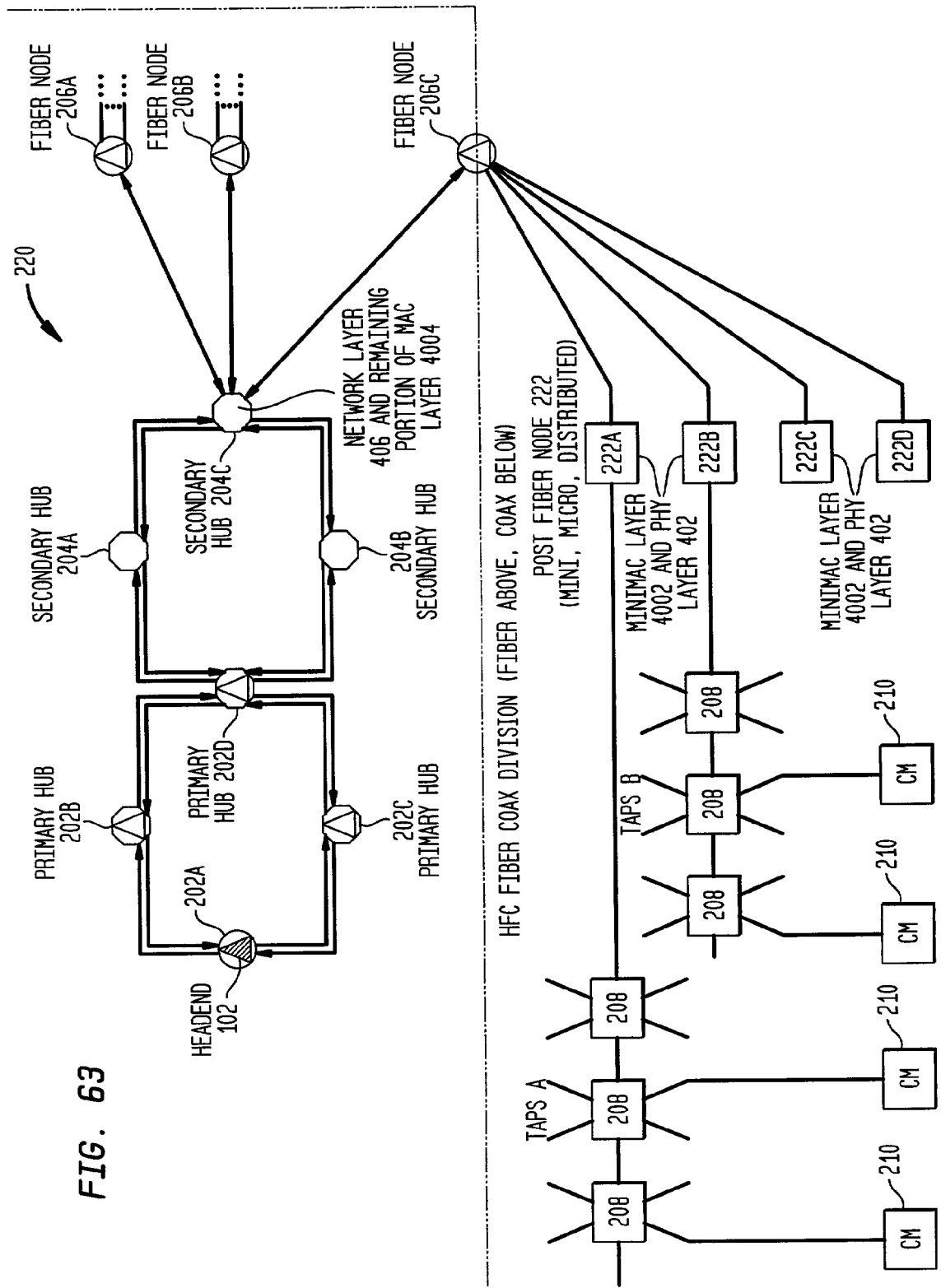

FIGS. 61-63 illustrate distributed CMTS 4000 configurations in which network layer 406 and remaining portion of MAC layer 4004 both reside in secondary hub 204C and miniMAC layer 4004 and PHY layer 402 are distributed across portions of hybrid fiber/coaxial systems 200 and 220. In FIG. 61, miniMAC layers 4002 and PHY layers 402 are placed in fiber nodes 206. In this configuration of distributed CMTS 4000, a miniMAC layer 4002 and a PHY layer 402 are needed for each fiber node 206 in HFC system 200. This configuration requires one network layer 406, one remaining portion of MAC layer 4004, and a miniMAC layer 4002 and a PHY layer 402 for each fiber node 206 in the system.

MiniMAC layer 4002 and PHY layer 402 are co-located to adhere to DOCSIS timing constraints. As the number of PHY layers 402 increases, each PHY layer 402 supports fewer cable modems 210, causing the system bandwidth to increase and the analog noise level to decrease. For example, each PHY layer 402 shown in FIG. 61 services cable modems 210 attached to one of fiber nodes 206A, 206B, or 206C. Digital transmissions now begin at fiber nodes 206. In the upstream, RF signals are transmitted from cable modems 210 to fiber nodes 206 and digital signals are transmitted thereafter.

In FIG. 62, miniMAC layers 4002 are placed in fiber nodes 206 and PHY layers 402 are placed in post fiber nodes 222. In this configuration of distributed CMTS 4000, a miniMAC layer 4002 is needed for each fiber node 206 and a PHY layer 402 is needed for each post fiber node 222 that connects to fiber nodes 206A-C. This configuration requires one network layer 406, one remaining portion of MAC layer 4004, a miniMAC layer 4002 for each fiber node 206, and a PHY layer 402 for each post fiber node 222 in the system. The configuration shown in FIG. 62 moves PHY layers 402 closer to cable modems 210, thereby enabling each PHY layer 402 to support fewer cable modems 210. For example, each PHY layer 402 shown in FIG. 62 services cable modems 210 attached to one of post fiber nodes 222A, 222B, 222C or 222D. This also causes the system bandwidth to increase. Also, miniMAC layers 4002 and PHY layers 402 are located in close proximity to each other to adhere to DOCSIS timing constraints. In the upstream, digital transmission begins at post fiber nodes 222, thereby decreasing any analog noise resulting from interference sources in the coaxial cables. RF signals are transmitted from cable modems 210 to post fiber nodes 222 and digital signals are transmitted thereafter.

In FIG. 63, miniMAC layers 4002 and PHY layers 402 are placed in post fiber nodes 222. In this configuration of distributed CMTS 4000, a miniMAC layer 4002 and a PHY layer 402 are needed for each post fiber node 222 that connects to fiber nodes 206A-C. This configuration requires one network layer 406, one remaining portion of MAC layer 4004, and a miniMAC layer 4002 and a PHY layer 402 for each post fiber node 222 in the system. The configuration shown in FIG. 63 moves PHY layers 402 closer to cable modems 210, thereby enabling each PHY layer 402 to support fewer cable modems 210. For example, each PHY layer 402 shown in FIG. 63 services cable modems 210 attached to one of post fiber nodes 222A, 222B, 222C or 222D. This also causes the system bandwidth to increase. Also, miniMAC layers 4002 and PHY layers 402 are co-located to adhere to DOCSIS timing constraints. In the upstream, digital transmission begins at post fiber nodes 222, thereby decreasing any analog noise resulting from interference sources in the coaxial cables. RF signals are transmitted from cable modems 210 to post fiber nodes 222 and digital signals are transmitted thereafter.

Figure 64:
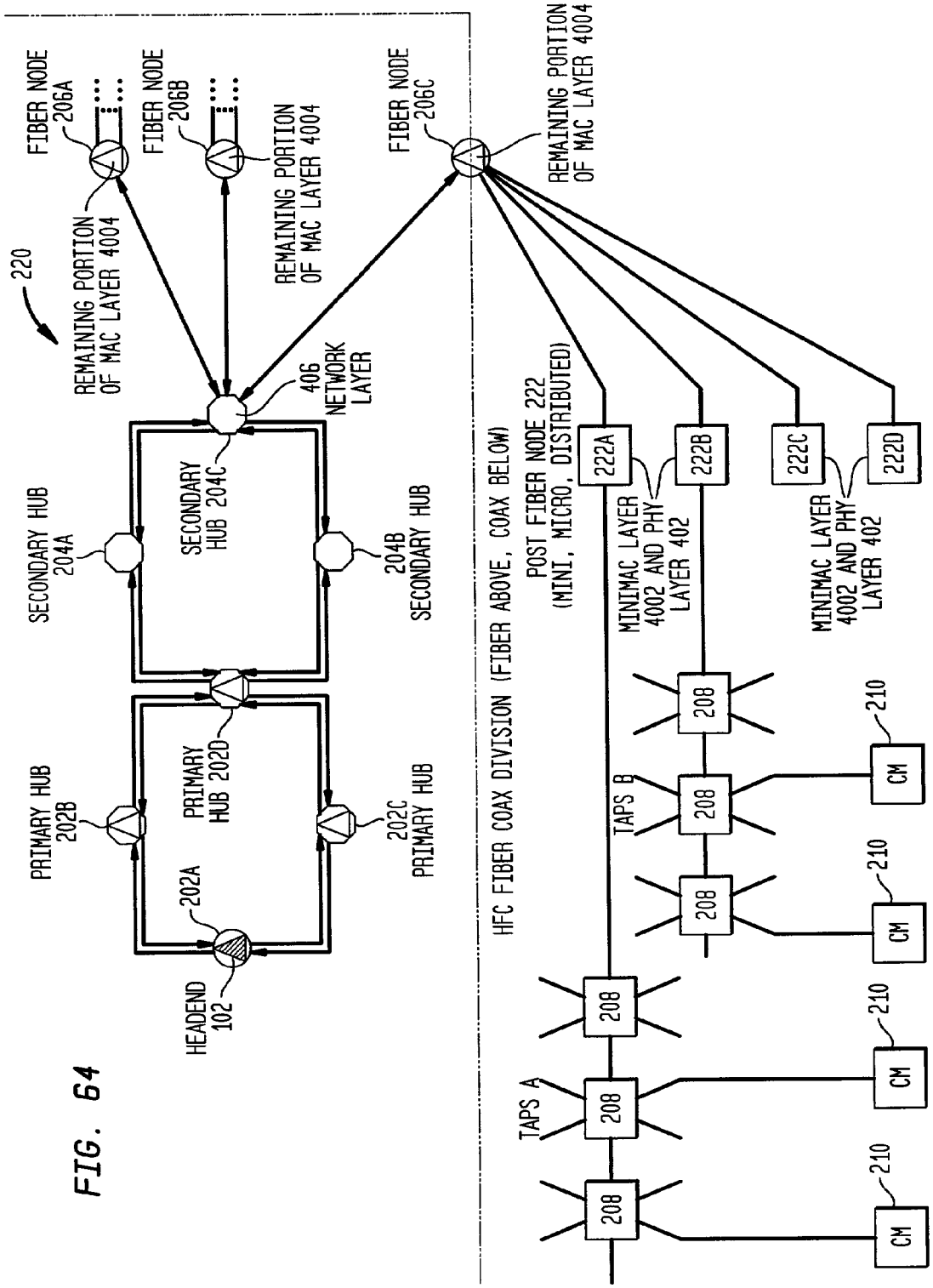

FIG. 64 illustrates a distributed CMTS 4000 configuration in which network layer 406 resides in secondary hub 204C, remaining portion of MAC layer 4004 resides in fiber nodes 206, and miniMAC layer 4002 and PHY layer 402 reside in post fiber nodes 222. In this embodiment, one network layer 406 is implemented and multiple remaining portion of MAC layers 4004, miniMAC layers 4002, and PHY layers 402 are implemented. A remaining MAC layer 4004 is placed in each fiber node 206 and a miniMAC layer 4002 and a PHY layer 402 are placed in each post fiber node 222. In this embodiment, a single remaining portion of MAC layer 4004 would be unable to handle the requirements of the required number of co-located miniMAC layers 4002 and PHY layers 402. Therefore, remaining portion MAC layers 4004 are placed at each fiber node 206 to handle the number of co-located mini-MAC layers 4002 and PHY layers 402 placed at each post fiber node 222. This configuration moves PHY layers 402 closer to cable modems 210, thereby enabling each PHY layer 402 to support fewer cable modems 210. For example, each PHY layer 402 shown in FIG. 64 services cable modems 210 attached to one of post fiber nodes 222A, 222B, 222C or 222D. This implementation causes the system bandwidth to increase. Digital transmission in the upstream begins at post fiber node 222, thereby decreasing any analog noise signals resulting from interference sources in the coaxial cables. RF signals are transmitted from cable modems 210 to post fiber nodes 222 and digital signals are transmitted therefrom.

Although a plurality of different distributed CMTS configurations have been shown above for both distributed CMTS 400 and distributed CMTS 4000, these configurations are not exhaustive. One skilled in the relevant art(s) would know that various other configurations may be utilized without departing from the scope and spirit of the present invention.

Conclusion

The previous description of the preferred embodiments is provided to enable any person skilled in the art to make or use the present invention. While the invention has been particularly shown and described with reference to preferred embodiments thereof, it will be understood by those skilled in the art that various changes in form and detail may be made therein without departing from the spirit and scope of the invention.

What is claimed is:

1. A distributed cable modem termination system in a hybrid fiber/coaxial (HFC) plant, comprising:
   at least one network layer;
   one or more physical layers,
   at least one media access layer, wherein said at least one media access layer comprises:
      one or more miniMAC layers comprising (i) circuitry required to convert digital bit streams into packets and vice versa, and (ii) means for remotely coupling to a remaining part of said at least one media access layer which is structurally separate from said one or more miniMAC layers; and
      the remaining part of said at least one media access layer which is structurally separate from said one or more miniMAC layers;
   wherein:
   said one or more miniMAC layers are remotely located from the remaining part of said at least one media access layer;
   said one or more miniMAC layers are remotely coupled to the remaining part of the at least one media access layer; and
   said one or more miniMAC layers and the remaining part of the at least one media access layer are configured to jointly operate as the at least one media access layer;
   wherein said at least one network layer, said remaining part of said at least one media access layer, said one or more miniMAC layers, and said one or more physical layers are dispersed throughout said HFC plant in a modular fashion, enabling each dispersed layer to be in separate locations of said HFC plant, yet having said at least one network layer connected to said remaining part of said at least one media access layer, said at least one dispersed remaining part of said at least one dispersed media access layer connected to each of said one or more dispersed miniMAC layers, and each of said one or more dispersed physical layers connected to each of said one or more dispersed miniMAC layers;

wherein said one or more dispersed miniMAC layers are located in close proximity to said one or more dispersed physical layers in said HFC plant, said one or more dispersed miniMAC layers maintaining timing constraints between said one or more dispersed miniMAC layers and said one or more dispersed physical layers;

wherein each dispersed layer is isolated from at least one other layer; and wherein said at least one dispersed network layer, said at least one dispersed remaining part of said dispersed media access control layer, said one or more dispersed miniMAC layers, and said one or more dispersed physical layers are configured to operate collectively as a cable modem termination system.

2. The distributed cable modem termination system of claim 1, wherein said at least one dispersed network layer and said dispersed remaining part of said at least one dispersed media access layer are located in a fiber portion of said HFC plant and said one or more dispersed miniMAC layers and said one or more dispersed physical layers are located in a coaxial portion of said HFC plant to increase bandwidth allocations to one or more cable modems.

3. The distributed cable modem termination system of claim 1, wherein said at least one dispersed network layer and said dispersed remaining part of said at least one dispersed media access layer are located in a headend of said HFC plant and said one or more dispersed miniMAC layers and said one or more dispersed physical layers are located in a coaxial portion of said HFC plant to increase bandwidth allocations to one or more cable modems.

4. The distributed cable modem termination system of claim 1, wherein each of said one or more dispersed miniMAC layers and each of said one or more dispersed physical layers are co-located in said HFC plant.

5. The distributed cable modem termination system of claim 1, wherein said at least one dispersed network layer and said dispersed remaining part of said at least one dispersed media access layer are placed in hubs of said fiber portion of said HFC plant and said one or more dispersed miniMAC layers and said one or more dispersed physical layers are placed in one or more fiber nodes of said HFC plant to increase bandwidth allocations to one or more cable modems.

6. The distributed cable modem termination system of claim 1, wherein said at least one dispersed network layer and said dispersed remaining part of said at least one dispersed media access layer are placed in hubs of said fiber portion of said HFC plant, said one or more dispersed miniMAC layers are placed in said fiber nodes of said HFC plant, and said one or more dispersed physical layers are placed in one or more post fiber nodes of said HFC plant to increase bandwidth allocations to one or more cable modems.

7. The distributed cable modem termination system of claim 1, wherein said at least one dispersed network layer is placed in a headend and said dispersed remaining part of said at least one dispersed media access layer is placed in a hub of said fiber portion of said HFC plant, and said one or more dispersed miniMAC layers and said one or more dispersed physical layers are co-located in one or more fiber nodes or in one or more post fiber nodes of said HFC plant to increase bandwidth allocations to one or more cable modems.

8. The distributed cable modem termination system of claim 1, wherein said at least one dispersed network layer and said dispersed remaining part of said at least one dispersed media access layer are co-located in a headend or a hub of said fiber portion of said HFC plant and said one or more dispersed miniMAC layers and said one or more dispersed physical layers are co-located in one or more fiber nodes or in one or more post fiber nodes of said HFC plant to increase bandwidth allocations to one or more cable modems.

9. The distributed cable modem termination system of claim 1, wherein said at least one dispersed network layer is placed in one of said headend and said hub in a fiber portion of said HFC plant.

10. The distributed cable modem termination system of claim 1, wherein one of said one or more dispersed miniMAC layers are co-located with one of said one or more physical layers in each fiber node of said HFC plant.

11. The distributed cable modem termination system of claim 1, wherein one of said one or more dispersed miniMAC layers are co-located with one of said one or more physical layers in each post fiber node of said HFC plant.

12. The distributed cable modem termination system of claim 1, wherein one of said one or more dispersed miniMAC layers are placed in each fiber node of said HFC plant and each of said dispersed physical layers is placed in each post fiber node of said HFC plant.

13. The distributed cable modem termination system of claim 1, wherein said dispersed remaining part of said at least one dispersed media access layer is placed in one of said headend and said hub in a fiber portion of said HFC plant.

14. A miniMAC layer of a media access control (MAC) layer in a distributed cable modem termination system (CMTS), comprising:

circuitry required to convert digital bit streams into packets and vice versa; and means for remotely coupling to a remaining part of the MAC layer which is structurally separate from said miniMAC layer and in a dispersed location from said miniMAC layer;

wherein:

the miniMAC layer is configured to operate while structurally isolated from the remaining part of the MAC layer; and while remotely coupled to the remaining part of the MAC layer, the miniMAC layer is configured to jointly operate with the remaining part of the MAC layer, wherein the combination of the miniMAC layer and the remaining part of the MAC layer function equivalently to a MAC layer.

15. The miniMAC layer of claim 14, wherein the circuitry required to convert digital bit streams into packets and vice versa comprises:

an upstream interface for buffering bit streams received from a physical layer of the CMTS;

a network interface for converting the buffered bit streams from the upstream interface into a packet interface;

a map processor configured to receive packets categorized as maps from the network interface, wherein the maps are used to allocate bandwidth to cable modems in the CMTS for upstream transmissions; and a downstream interface for receiving the packets categorized as maps from the map processor and for receiving all remaining packets from the network interface, wherein the downstream interface converts each packet into bit streams for transmission to the physical layer.

16. The miniMAC layer of claim 14, wherein the means for coupling the circuitry required to convert digital bit streams into packets and vice versa to the remaining part of the MAC layer comprises a digital network interface.

17. The miniMAC layer of claim 16, wherein the digital network interface is configured to:

receive a packet from the circuitry required to convert digital bit streams into packets and vice versa in a packet format used by the circuitry required to convert digital bit streams into packets and vice versa, and convert the packet into a packet format used by an exterior network coupled to the distributed CMTS; and receive a packet in the packet format used by the exterior network and convert the packet to the packet format used by the circuitry required to convert digital bit streams into packets and vice versa.

18. The miniMAC layer of claim 15, wherein said map processor sends said maps to said upstream interface to enable said upstream interface to identify which of said cable modems in said cable modem system sent said stream of bits.

19. The miniMAC layer of claim 14, wherein said miniMAC layer further comprises interfacing circuitry to maintain timing constraints between said miniMAC layer and a physical layer in said distributed CMTS.

20. The miniMAC layer of claim 14, wherein said miniMAC layer is in close proximity to a physical layer in said distributed CMTS.

21. The miniMAC layer of claim 14, wherein said miniMAC layer enables a physical layer to be positioned deep into a hybrid fiber/coax plant, closer to a plurality of cable modems to increase bandwidth allocations to said plurality of cable modems.

* * * * *